US009325764B2

(12) United States Patent
Barreto et al.

(10) Patent No.: US 9,325,764 B2
(45) Date of Patent: Apr. 26, 2016

(54) APPARATUS AND METHOD FOR TRANSPARENT COMMUNICATION ARCHITECTURE IN REMOTE COMMUNICATION

(71) Applicants: Daniel Ernesto Barreto, Los Altos, CA (US); Siddhartha Kasivajhula, San Jose, CA (US); Ankur Kumar, Bangalore (IN)

(72) Inventors: Daniel Ernesto Barreto, Los Altos, CA (US); Siddhartha Kasivajhula, San Jose, CA (US); Ankur Kumar, Bangalore (IN)

(73) Assignee: Wyse Technology L.L.C., San Jose, CA (US)

( * ) Notice: Subject to any disclaimer, the term of this patent is extended or adjusted under 35 U.S.C. 154(b) by 23 days.

(21) Appl. No.: 14/260,043

(22) Filed: Apr. 23, 2014

(65) Prior Publication Data

US 2014/0325087 A1  Oct. 30, 2014

Related U.S. Application Data

(63) Continuation of application No. 12/484,126, filed on Jun. 12, 2009, now Pat. No. 8,775,658.

(60) Provisional application No. 61/164,376, filed on Mar. 27, 2009.

(51) Int. Cl.
*H04L 29/06* (2006.01)
*H04L 29/08* (2006.01)
*H04L 12/861* (2013.01)

(52) U.S. Cl.
CPC .............. *H04L 65/608* (2013.01); *H04L 49/90* (2013.01); *H04L 67/28* (2013.01);

(Continued)

(58) Field of Classification Search
CPC ....... H04L 65/608; H04L 49/90; H04L 67/28; H04L 69/10; H04L 69/18; H04L 67/2804; H04L 69/04; H04L 69/161; H04L 67/2876; H04L 69/16; H04L 69/169
See application file for complete search history.

(56) References Cited

U.S. PATENT DOCUMENTS

| 6,449,647 | B1 | 9/2002 | Colby et al. |
| 6,862,624 | B2 | 3/2005 | Colby et al. |

(Continued)

FOREIGN PATENT DOCUMENTS

WO         00/77999      12/2000      ............. H04L 29/00

OTHER PUBLICATIONS

European Search Report for Application No. 10756673.9 (PCT/US2010/028184) dated Nov. 10, 2014, 6 pages.

(Continued)

*Primary Examiner* — Michael C Lai
(74) *Attorney, Agent, or Firm* — Baker Botts L.L.P.

(57) ABSTRACT

A communication apparatus for remote communication may include a local communication proxy module configured to receive streams from a local communication application module. The streams may be in a form utilizing a first transmission protocol and destined to a remote destination. The local communication proxy module may be configured to facilitate sending, utilizing a second transmission protocol, the streams in real-time over a network to a remote communication proxy module. The local communication proxy module may be configured to conceal characteristics of the network from the local communication application module. The local communication proxy module may also be configured to be transparent to the local communication application module. A machine-readable medium and a method are also disclosed.

17 Claims, 16 Drawing Sheets

(52) U.S. Cl.
CPC ....... *H04L 67/2804* (2013.01); *H04L 67/2876* (2013.01); *H04L 69/04* (2013.01); *H04L 69/10* (2013.01); *H04L 69/161* (2013.01); *H04L 69/18* (2013.01)

(56) References Cited

U.S. PATENT DOCUMENTS

| | | | |
|---|---|---|---|
| 6,996,624 | B1 | 2/2006 | LeCroy et al. |
| 7,260,644 | B1 | 8/2007 | Shah et al. |
| 7,406,087 | B1 | 7/2008 | Quach et al. |
| 7,447,242 | B2 | 11/2008 | Geagan et al. |
| 7,451,251 | B2 | 11/2008 | Shur et al. |
| 7,756,044 | B2 | 7/2010 | Padhye et al. |
| 7,788,354 | B2* | 8/2010 | Nag ............... 709/223 |
| 7,817,631 | B1 | 10/2010 | Qian |
| 7,831,747 | B2 | 11/2010 | Bury et al. |
| 2001/0009554 | A1 | 7/2001 | Katseff et al. |
| 2002/0010758 | A1* | 1/2002 | Chan ............... 709/218 |
| 2002/0018477 | A1* | 2/2002 | Katz ............... 370/401 |
| 2003/0021291 | A1 | 1/2003 | White et al. |
| 2003/0141093 | A1 | 7/2003 | Tirosh et al. |
| 2003/0149792 | A1 | 8/2003 | Goldstein |
| 2003/0235151 | A1 | 12/2003 | McClellan |
| 2004/0128396 | A1 | 7/2004 | Patrick et al. |
| 2004/0192312 | A1* | 9/2004 | Li et al. ............... 455/445 |
| 2004/0264441 | A1* | 12/2004 | Jalkanen et al. ............ 370/352 |
| 2005/0021804 | A1 | 1/2005 | Hameleers et al. |
| 2005/0165931 | A1 | 7/2005 | Shur et al. |
| 2005/0213586 | A1* | 9/2005 | Cyganski et al. ........ 370/395.41 |
| 2006/0182139 | A1 | 8/2006 | Bugajski et al. |
| 2006/0224687 | A1 | 10/2006 | Popkin et al. |
| 2006/0274769 | A1 | 12/2006 | Gardner et al. |
| 2006/0293049 | A1 | 12/2006 | Jensen |
| 2007/0076714 | A1 | 4/2007 | Ananthakrishnan et al. |
| 2007/0156850 | A1* | 7/2007 | Corrion ............... 709/219 |
| 2007/0239886 | A1* | 10/2007 | Montemayor et al. ........ 709/232 |
| 2007/0291767 | A1* | 12/2007 | Smith et al. ............. 370/395.21 |
| 2008/0091812 | A1 | 4/2008 | Lev-Ran et al. |
| 2008/0144660 | A1 | 6/2008 | Godlewski |
| 2008/0198787 | A1* | 8/2008 | Nguyen ............... 370/315 |
| 2008/0205308 | A1 | 8/2008 | Prehofer et al. |
| 2008/0229024 | A1* | 9/2008 | Plamondon ............... 711/126 |
| 2008/0320151 | A1 | 12/2008 | McCanne et al. |
| 2009/0003600 | A1* | 1/2009 | Chen et al. ............... 380/217 |
| 2009/0073884 | A1 | 3/2009 | Kodama et al. |
| 2009/0109849 | A1* | 4/2009 | Wood et al. ............... 370/235 |
| 2009/0217266 | A1 | 8/2009 | Krishnamurthy et al. |
| 2010/0150161 | A1 | 6/2010 | Saksena et al. |
| 2010/0246602 | A1 | 9/2010 | Barreto et al. |
| 2010/0250769 | A1 | 9/2010 | Barreto et al. |
| 2010/0250770 | A1* | 9/2010 | Barreto et al. ............... 709/231 |

OTHER PUBLICATIONS

Christian Hoene et al., "Voice Over IP: Improving the Quality Over Wireless LAN by Adopting a Booster Mechanism—An Experimental Approach", Proceedings of SPIE vol. 4522 (2001).

Bryan Ford, et al., "Peer-to-Peer Communication Across Network Address Translators," Feb. 17, 2005, htt:www.brynosaurus.com/pub/nct/p2pnat/, Feb. 17, 2005.

Wei-Hua-et al., "Unraveling the Mysteries of Writing a Winsock 2 Layered Service Provider," May 1999, http://www.microsoft.com/msj/0599/LayeredService/LayeredService.aspx, Microsoft.

"Forward Error Correction in IP Video Networks," Mar. 2008, http://www.harmonicinc.com/FEC_WP_v08-03_RP.PDF, Harmonic Inc.

Tam Do, "Video Over IP with Forward Error Correction (FEC)," Jun. 1, 2007, http://www.videsignline.com/showArticle.jhtml?printableArticle=true &articleId=199900110, video/Imaging DesignLine.

Zhihua Chen, et al., "Hybrid and Forward Error Correction Transmission Techniques for Unreliable Transport of 3D Geometry," Multimedia Systems, 2005.

Jari Korhonen, et al., "Generic Forward Error Correction of Short Frames for IP Streaming Applications," Multimed Tools Appl, Jun. 16, 2006, pp. 305-323, vol. 29, Spring Science + Business Media, LLC.

Haitao Zheng, et al., "An Improved UDP Protocol for Video Transmission Over Internet-to-Wireless networks," IEEE Transactions on Multimedia, Sep. 2001, pp. 356-365, vol. 3, No. 3.

"Appliance Link Protocol," Wikipedia, Nov. 2009, http://en.wikipedia.org/wiki/Applicance_Link_Protocol.

European Office Action for Application No. 10756673.9 (PCT/US2010/028184) dated Dec. 21, 2015, 4 pages.

* cited by examiner

APPARATUS AND METHOD FOR TRANSPARENT COMMUNICATION ARCHITECTURE IN REMOTE COMMUNICATION

CROSS-REFERENCE TO RELATED APPLICATION

The present application is a continuation application of U.S. patent application Ser. No. 12/484,126 filed Jun. 12, 2009, now U.S. Pat. No. 8,775,658; which claims the benefit of priority under 35 U.S.C. §119 from U.S. Provisional Patent Application Ser. No. 61/164,376, entitled "RELIABLE, IN-ORDER NETWORK PROTOCOL TO ACCELERATE REAL-TIME APPLICATIONS THROUGH USE OF A TRANSPARENT PROXY ARCHITECTURE," filed on Mar. 27, 2009, which are hereby incorporated by reference in its entirety for all purposes.

BACKGROUND

The transmission control protocol (TCP) is the standard communications protocol for the internet, and virtually all internet traffic is TCP-based. In networks that have high latency and/or packet-loss, TCP exhibits poor bandwidth utilization. When based on TCP, real-time applications therefore become progressively less usable as latency and/or packet loss increases. For example, the delay between a computer in the United Stated and another in India is approximately 250 milliseconds, and, at this latency, real-time applications are essentially unusable on TCP.

SUMMARY

In one aspect of the disclosure, a communication apparatus for remote communication may include a local transparent communication proxy module configured to intercept a first stream destined to a remote destination and configured to make a first determination whether to accelerate communication associated with the first stream. The communication apparatus may include a local communication proxy module configured to receive the first stream based on the first determination and configured to make a second determination whether a connection to a remote communication proxy module is established. If the connection is established, then the local communication proxy module may receive one or more additional streams and may direct the one or more additional streams to the remote communication proxy module utilizing an accelerated mode. If the connection is not established, then the local transparent communication proxy module may direct the first stream to the remote destination utilizing a non-accelerated mode.

In another aspect of the disclosure, a communication apparatus for remote communication may include a first local module configured to intercept a first stream. The first stream may utilize a first transmission protocol and may be destined to a remote destination over a network. The first local module may be configured to make a determination whether to direct the first stream over a first connection to a first destination utilizing the first transmission protocol or to direct the first stream over a second connection to a second destination utilizing a second transmission protocol. The determination may be based on one or more of the following factors: a configuration or a network condition. The first local module may be also configured to direct the first stream to the first destination or the second destination based on the determination. The second transmission protocol is different from the first transmission protocol.

In another aspect of the disclosure, a communication apparatus for remote communication may include a local communication proxy module configured to receive streams from a local communication application module. The streams may be in a form utilizing a first transmission protocol and destined to a remote destination. The local communication proxy module may be configured to facilitate sending, utilizing a second transmission protocol, the streams in real-time over a network to a remote communication proxy module. The local communication proxy module may be also configured to adjust an amount of bandwidth used by the streams.

In another aspect of the disclosure, a communication apparatus for remote communication may include a local communication proxy module configured to receive streams from a local communication application module. The streams may be in a form utilizing a first transmission protocol and destined to a remote destination. The local communication proxy module may be configured to facilitate sending, utilizing a second transmission protocol, the streams in real-time over a network to a remote communication proxy module. The local communication proxy module may be configured to conceal characteristics of the network from the local communication application module. The local communication proxy module may also be configured to be transparent to the local communication application module.

In yet another aspect of the disclosure, a communication apparatus for remote communication may include a local communication proxy module configured to receive streams from a local communication application module. The streams may be in a form utilizing a first transmission protocol and destined to a remote destination. The local communication proxy module may be configured to add first header information including one or more of the following: a packet sequence identifier, a packet size, a packet type identifier, and additional information related to a packet type identifier. The local communication proxy module may be configured to add second header information. The local communication proxy module may be also configured to form packets and to facilitate sending, utilizing a second transmission protocol, the packets in real-time over a network to a remote communication proxy module.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
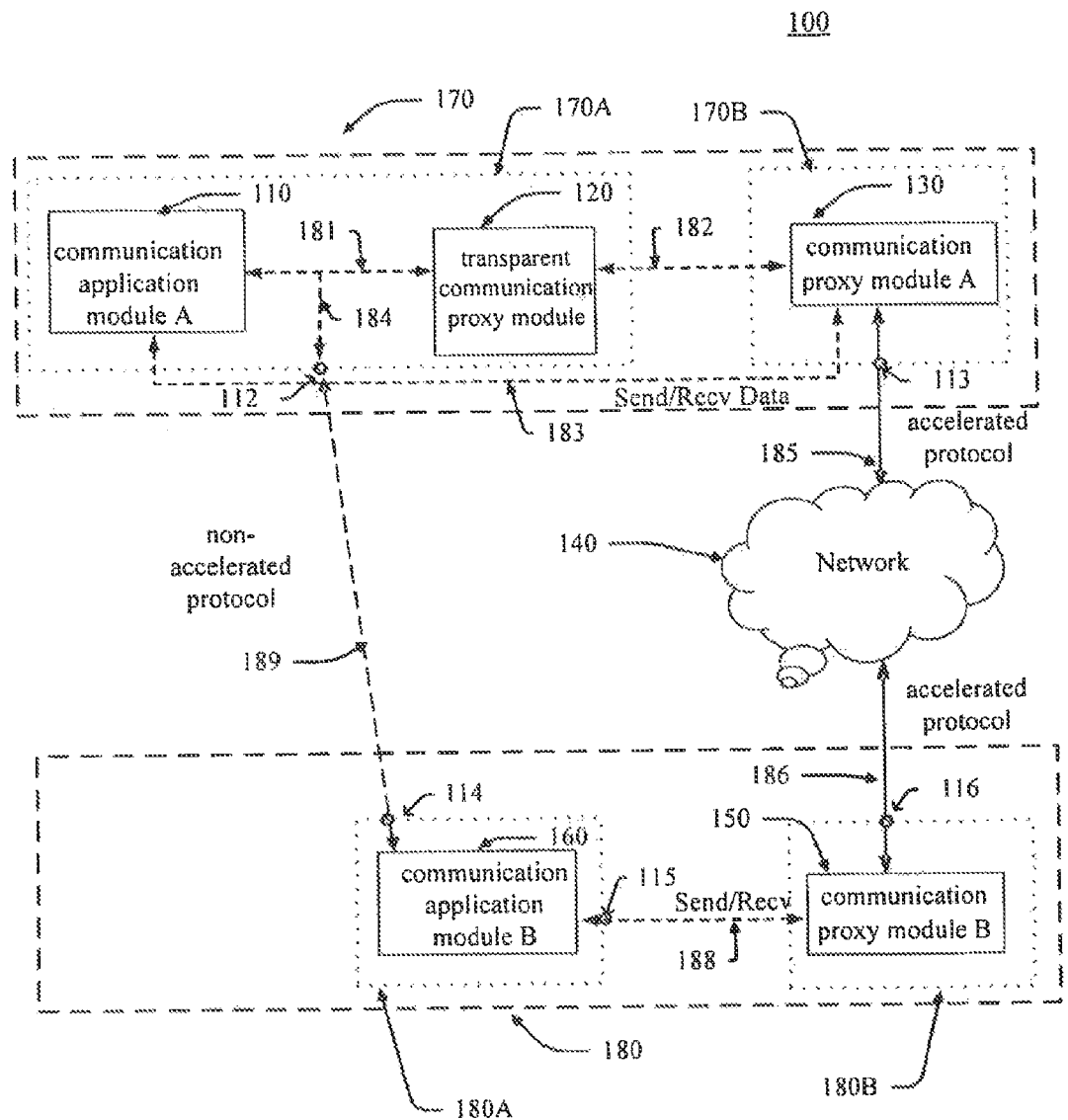
FIG. 1 is a conceptual block diagram illustrating an example of a communication apparatus in accordance with one aspect of the disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In accordance with one aspect of the subject technology, a novel communication protocol (sometimes referred to as an accelerated protocol or UDP+) can overcome the problems inherent in the transmission control protocol (TCP), and exhibit maximum bandwidth utilization for networks utilizing TCP. As a result, real-time applications are usable even at delays exceeding 250 ms, in the presence of packet loss.

Microsoft's Remote Desktop Protocol (RDP) uses TCP. If a user in the United States connects remotely to a server in India over Microsoft's RDP, the user may find that the session is almost unusable. Irrespective of the amount of bandwidth available, TCP may use only a small portion of it, with the result that the session is extremely sluggish, and simple mouse clicks can take several seconds to effect a response from the server. However, in accordance with one aspect of the disclosure, when using an accelerated protocol of the subject technology, a session can use as much of the available bandwidth as possible (or specified), and the experience can be much closer to the experience the user would have if he/she were using the application locally.

Various communication approaches are described below, but these are inferior to the communication systems and methods of the subject technology.

1. One approach requires the use of a server, and all internet traffic must first be routed through this server. Therefore, this solution is not as portable as the subject technology and demands that the customer use a specific hardware infrastructure. In addition, this technique operates in layers 4, 5, and 6 in the Open Systems Interconnection Reference model (OSI model), and is a replacement for desktop remote protocols such as RDP, and cannot accelerate real-time applications in general.

The OSI model is an abstract description for layered communications and computer network protocol design. In its most basic form, it divides network architecture into seven layers which, from top to bottom, are the application layer (layer 7), presentation layer (layer 6), session layer (layer 5), transport layer (layer 4), network layer (layer 3), data-link layer (layer 2), and physical layer (layer 1).

2. A second approach is to provide reliable delivery but not in-order delivery. Since this approach does not provide in-order delivery, it is inferior to the subject technology.

3. A third approach is to accelerate file transfer across Long Fat Networks (high latency, high bandwidth networks) as opposed to for real-time applications.

4. A fourth approach is to provide reliability. However, neither of the third or fourth approach offers application transparency, and both must be specifically invoked from within the applications in order to be used. Therefore, they cannot be used by existing applications unless these applications are changed to incorporate these protocols.

In one aspect of the disclosure, the subject technology does not have the constraints imposed by the other approaches described above.

In one aspect of the disclosure, the subject technology is, for example, essentially software-only, and application-agnostic. In one aspect, any TCP stream can theoretically be accelerated by an accelerated protocol of the subject technology, and is independent of layer 6 and above (e.g., independent of layers 6 and 7, which are the presentation layer and application layer) in the OSI model.

In one aspect of the disclosure, the subject technology is able to achieve application transparency through the use of, for example, proxies. In one aspect, the subject technology can achieve transfer of streams across Long Fat Networks for a real-time application without invoking the transfer within the application.

A bandwidth-delay product (BDP) may refer to the product of a data link's capacity (in bits per second) and its end-to-end delay (in seconds). The result, an amount of data measured in bits (or bytes), is equivalent to the maximum amount of data "on the air" at any given time, i.e., data that has been transmitted but not yet received. Sometimes it is calculated as the data link's capacity times its round-trip time (RTT). A network with a large bandwidth-delay product is commonly known as a Long Fat Network (LFN). As described in RFC 1072, which is incorporated herein by reference, a network may be considered an LFN if its bandwidth-delay product is significantly larger than 105 bits (about 12 kB).

According to another approach, techniques such as packet coalescing, compression, caching, and flow-control optimization may be utilized in wide area network \WAN) accelerators to improve data transfer over WANs. Some of the shortcomings of these solutions are that they require hardware (HW) appliances be deployed between end points (as opposed to the transparent peer-to-peer architecture of the subject technology according to one aspect of the disclosure); they are optimized for bulk data transfers (as opposed to being focused on real-time applications); they are not as highly optimized to deal with packet-loss recovery. According to one aspect, the subject technology provides a tight integration between the novel packet loss recovery, error correction and congestion control techniques.

In accordance with various aspects of the disclosure, examples of advantages and benefits of the subject technology are provided below.

In one aspect, a communication apparatus of the subject technology can accelerate any stream (e.g., any TCP stream) to use maximum bandwidth for the current latency and packet loss conditions with particular emphasis on optimizing for real-time applications.

In one aspect, a communication apparatus of the subject technology can dynamically adjust itself to changing latency and packet loss conditions to maintain optimal usage of bandwidth and user experience.

According to one aspect, the phrase "dynamically adjust" may refer to, for example, making a determination, making an adjustment or the like when (or as soon as) one or more real-time conditions are detected or altered, or making a determination, an adjustment or the like in response to one or more real-time conditions. According to one aspect, the term "real-time conditions" may refer to, for example, conditions that exist or occur approximately in real-time, at the present time, or at the current time.

In one aspect, an architecture of the subject technology is transparent to applications. For example, any application running on supported platforms can have its stream (e.g., TCP stream or output) sent over an accelerated protocol of the subject technology, and this requires no changes to the application source code.

In one aspect, a transparent architecture of the subject technology can be leveraged for peer-to-peer communications even in the presence of firewalls and network address translations (NATs), with or without.

FIG. 1 is a conceptual block diagram illustrating an example of a communication apparatus in accordance with one aspect of the disclosure.

In accordance with one aspect of the disclosure, communication apparatus 100 may include communication apparatus A 170 and communication apparatus B 180. Communication apparatus A 170 may include communication application module A 110, transparent communication proxy module 120, and communication proxy module A 130. In another configuration, module 130 may be placed outside communication apparatus A 170. Communication apparatus B 180 may include communication application module B 160 and communication proxy module B 150.

Communication application module A 110, transparent communication proxy module 120, communication proxy module A 130, communication proxy module B 150, and communication application module B 160 are sometimes referred to as module 110, module 120, module 130, module 150, and module 160, respectively, or modules 110, 120, 130, 150 and 160.

In one configuration, communication apparatus A 170 includes two computers 170A and 170B (e.g., clients), where communication application module A 110 and transparent communication proxy module 120 are on computer 170A, and communication proxy module A 130 is on computer 170B. In another configuration, communication apparatus A 170 may include one or more computers, and communication application module A 110, transparent communication proxy module 120, and communication proxy module A 130 may be on the same one computer, each of the modules can be on a separate computer, or some of the modules can be on one computer while the other module(s) is(are) on another computer. In one aspect, it is advantageous to have both communication application module A 110 and transparent communication proxy module 120 located on a first computer (e.g., one client), and to have communication proxy module A 130 located on the same first computer or on another computer proximate to the first computer.

In one configuration, communication apparatus B 180 includes two computers 180A and 180B (e.g., servers), where communication application module B 160 is on computer 180A, and communication proxy module B 150 is on computer 180B. In another configuration, communication apparatus B 180 may include one or more computers, and communication application module B 160 and communication proxy module B 150 may be on the same one computer (e.g., one server), or each of the modules can be on a separate computer. In one aspect, it is advantageous to have both communication application module B 160 and communication proxy module B 130 be located on the same one computer or to have communication application module B 160 on a first computer and communication proxy module B 130 on another computer proximate to the first computer.

In one aspect, communication application module A 110 may include one or more applications, and communication application module B 160 may include one or more applications. In one aspect, the one or more applications on communication application module A 110 may communicate with the one or more applications on communication application module B 160. An application in module 110 or 160 may be an application of any type. In one aspect, each of transparent communication proxy module 120, communication proxy module 130, and communication proxy module 150 may include one or more applications or instructions comprising software code.

In one aspect, transparent communication proxy module 120 may monitor outgoing streams from communication application module A 110. Transparent communication proxy module 120 may intercept a stream (e.g., a connection request or a TCP stream) from communication application module A 110 via a communication channel (e.g., 181) and forward it to communication proxy module A 130 via a communication channel (e.g., 182). Communication proxy module A 130 may take the stream, add headers (so that it conforms to an accelerated protocol of the subject technology), and send it to communication proxy module B 150 over a communication channel utilizing the accelerated protocol of the subject technology. This communication channel may comprise, for example, communication channel 185, network 140 and communication channel 186. Communication proxy module B 150 may then take the stream conforming to the accelerated protocol, remove the headers and send the stream to communication application module B 160 over a communication channel (e.g., 188). Each of communication channels 181, 182, 183 and 188 may utilize a non-accelerated protocol (e.g., TCP). In one aspect, a stream traveling on channels 181, 182 and 183 may conform to a non-accelerated protocol, and a stream traveling on channels 185 and 186 and network 140 may conform to an accelerated protocol.

In one aspect of the disclosure, communications in an accelerated mode may occur concurrently with communications in a non-accelerated mode. For example, while one or more applications on module 110 may communicate remotely with one or more applications on module 160 (or other module(s)) in an accelerated mode (e.g., via communication channels 181, 182, 183, 185, 140, 186 and 188), one or more other applications on module 110 may concurrently communicate with one or more other applications on module 160 (or other module(s)) in a non-accelerated mode (e.g., via a communication channel 189). In one aspect, streams from an application utilizing a non-accelerated mode are not intercepted by module 120.

In one aspect of the disclosure, the term "stream" may generally refer to any transmission (incoming or outgoing) or any signal(s) or packet(s). In one aspect, a stream may be from communication application module A 110 or communication application module B 160. In another aspect, a stream may be a connection request. In yet another aspect, a stream may be a network request (e.g., a connection request or another type of network request). In yet another aspect, a stream may be a data stream (e.g., data or packet(s)). In one aspect, a data stream may include data, control/format information, or data as well as control/format information. In one aspect, a stream may be a TCP stream.

In one aspect of the disclosure, communication application modules A and B 110 and 160 (e.g., client and server applications) may be perceived as communicating as they normally would, over a communication channel utilizing a non-accelerated protocol (e.g., TCP), and are not aware of the stream being intercepted. In one aspect, each of communication application modules A and B 110 and 160 is not aware of the existence of transparent communication proxy module 120, communication proxy module A 130, and communication proxy module B 150. In other words, the operation and existence of modules 120, 130 and 150 are transparent to modules 110 and 160, and communication can be accelerated without invoking the acceleration within module 110 or 160. In one aspect, this allows an accelerated protocol of the subject technology to be application-agnostic. In one aspect, this allows transparent communication proxy module 120, communication proxy module A 130, and communication proxy module B 150 to be application-agnostic.

In one aspect of the disclosure, communication application module A 110, transparent communication proxy module 120, and communication proxy module A 130 are "local" with respect to one another and "remote" with respect to each of communication application module B 160 and communication proxy module B 150. Communication application module B 160 and communication proxy module B 150 are "local" with respect to each other and "remote" with respect to each of communication application module A 110, transparent communication proxy module 120, and communication proxy module A 130.

In one aspect, a communication application module (e.g., 110) may be configured to connect to one or more other communication application modules (e.g., one or more modules 160) at any IP address or any port. In one aspect, a transparent communication proxy module may be configured to connect to a communication proxy module at an IP address and a port of the communication proxy module. In one aspect, communication proxy module A 130 monitors (or listens to) streams from transparent communication proxy module 120 at a port (which can be a pre-determined or pre-assigned port or can be assigned to another port at a later time).

In one aspect, a computer may be a laptop computer, a desktop computer, a thin client, a client, a server, a personal data assistant (PDA), a portable computing device, or a suitable device with one or more processors. According to one aspect of the disclosure, when a computer is a thin client, it may be a device having at least a processor and memory, where the total amount of memory of the thin client is less than the total amount of memory in a server (e.g., 180). A thin client may not have a hard disk. In certain configurations, a computer may be a telephone, a mobile telephone, an audio player, a game console, a camera, a camcorder, an audio device, a video device, a multimedia device, or a device capable of supporting a connection to another device. A computer can be stationary or mobile.

In one aspect of the disclosure, a proxy module (e.g., 120, 130, 150) may be a module or a Windows system service, and may be implemented as executable software code (e.g., Proxy.exe). In another aspect, a proxy module may be a module that performs a function or operation on behalf of another module such as module 110 or 160 or may be a module that performs a task in the background. In yet another aspect, a proxy module may a module that performs other functions or operations.

In one aspect of the disclosure, a delay between a local module and a remote module may exceed 0 ms (e.g., 0.5 ms, 1 ms, 2 ms, 5 ms, 10 ms, 15 ms, 20 ms, 25 ms, 50 ms, 100 ms, 150 ms, 200 ms, 250 ms, 300 ms, 400 ms, 500 ms, 600 ms, or another number larger than 0 ms). For example, a delay between communication application module A 110 and communication application module B 160 may exceed 250 ms. A delay between local modules is less than a delay between a local module and a remote module.

In one aspect, a communication between a local module and a remote module may experience a packet loss equal to or exceeding 0% (e.g., 0.01%, 0.1%, 0.3%, 0.5%, 0.8%, 1%, 2%, or another number larger than 0%). For example, a communication between communication application module A 110 and communication application module B 160 may have greater than 1% packet loss. A packet loss between local modules is less than a packet loss between a local module and a remote module.

A communication channel formed by communication channel 185, network 140 and communication channel 186 may experience a delay like the delay between a local module and a remote module and a packet loss like the packet loss between a local module and a remote module. Communication channel 189 may experience a delay like the delay between a local module and a remote module and a packet loss like the packet loss between a local module and a remote module. Network 140 may be the internet or another type of network. Network 140 may be an external or internal network.

Figure 2:
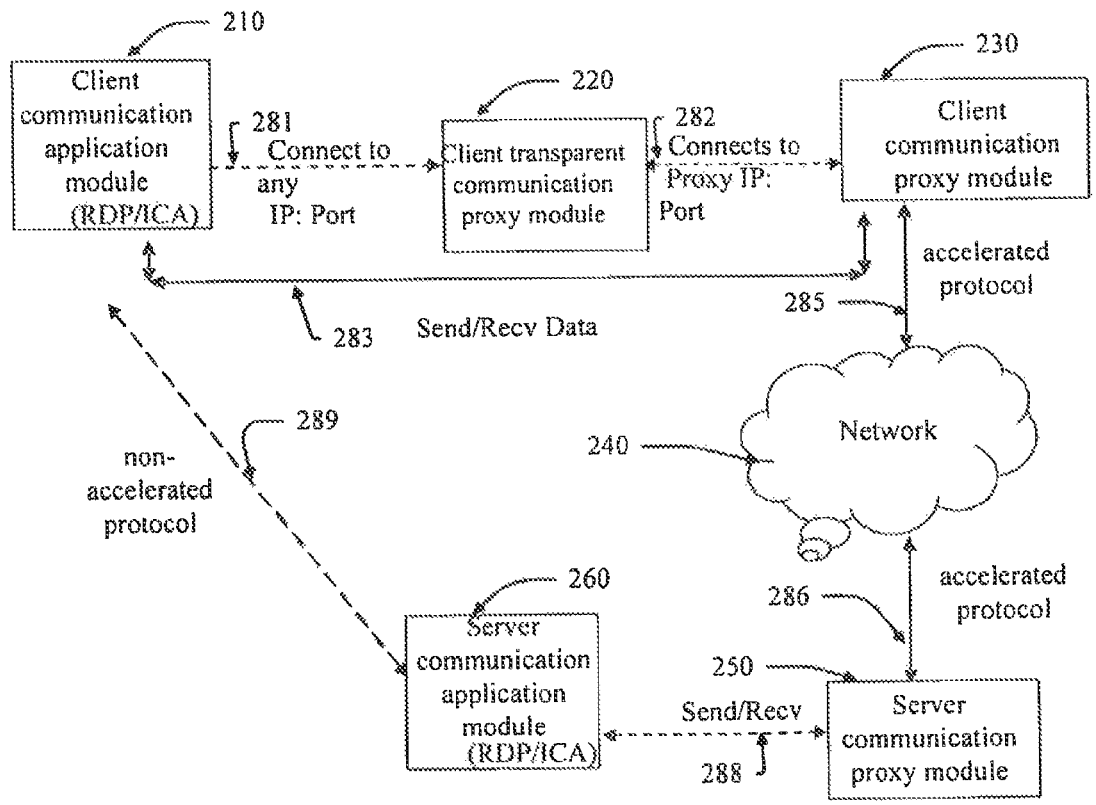
FIG. 2 is a conceptual block diagram illustrating another example of a communication apparatus in accordance with one aspect of the disclosure.

FIG. 2 is a conceptual block diagram illustrating another example of a communication apparatus in accordance with one aspect of the disclosure.

Each of the components shown in FIG. 2 (e.g., 210, 220, 230, 240, 250, 260, 281, 282, 285, 286, 288, 289) may be similar to those shown in FIG. 1 (e.g., 110, 120, 130, 140, 150, 160, 181, 182, 185, 186, 188, 189), except that in this example, each of 210, 220 and 230 may be on one or more client computers (e.g., thin clients), and each of 250 and 260 may be on one or more server computers. Client computers and server computers are sometimes referred to as clients and servers, respectively. Client communication application module 210 may include, for example, the Microsoft® Remote Desktop Protocol (RDP) application and/or the Citrix® Independent Computing Architecture (ICA) application. Server communication application module 260 may include, for example, the Microsoft® Remote Desktop Protocol (RDP) application and/or the Citrix® Independent Computing Architecture (ICA) application.

In accordance with one aspect of the disclosure, client transparent communication proxy module 220 can intercept an outgoing TCP stream (e.g., a connection request) from client communication application module 210 on one computer (e.g., client computer or client) and forward it to client communication proxy module 230. Client transparent communication proxy module 220 may be located on the client computer itself, and client communication proxy module 230 may be located on the client computer, or on another computer (but preferably on the client computer or on a computer proximate to the client computer). Client communication proxy module 230 may then take the TCP stream and send it to server communication proxy module 250 over a communication channel (e.g., communication channel 285, network 240 and communication channel 286) using an accelerated protocol of the subject technology. Server communication proxy module 250 can be running on a server computer itself, or on another computer (but preferably on the server computer or on a computer proximate to the server computer for optimal performance). Server communication proxy module 250 may then take the TCP stream conforming to the accelerated protocol, process it and send the TCP stream to the server communication application module 260 on the server computer over a communication channel (e.g., 288, which may utilize TCP).

In one aspect, modules 210 and 260 (e.g., client and server applications) communicate as they normally would, over TCP, and are not aware of modules 220, 230 and 250 intercepting the data. According to one aspect of the disclosure, this allows the protocol of the subject technology to be application-agnostic.

In accordance with various aspects of the disclosure, a communication apparatus may provide the following functions/features:

In one aspect, a transparent communication proxy module may be configured to intercept all incoming connections and to transfer them to a communication proxy module if required (the decision may be based on user configuration).

In one aspect, communication proxy modules may provide data transport over a communication channel utilizing an accelerated protocol, and as a result, they may conceal network shortcomings (e.g., latency, bandwidth, packet loss, etc.) from the communication application modules (e.g., modules 110/160, modules 210/260 in FIGS. 1 and 2).

In one aspect, the locations of communication proxy modules are independent of the locations of the communication application modules.

In one aspect, a communication apparatus may use congestion control to ensure fairness in bandwidth usage.

In one aspect, a communication apparatus may use a packet-loss based congestion control algorithm that takes into account (i) lost packets that are recovered at a receiver end through packet-loss recovery techniques as well as (ii) packets that are lost and not recovered at the receiver end and are retransmitted to the receiver end. In one aspect, the congestion control algorithm may take into account packets that are successfully transmitted and acknowledged. In another example, a congestion control may be based on one or more factors described in the previous two sentences.

In one aspect, a communication apparatus may use a congestion control algorithm that cycles between two modes of bandwidth usage, where the first mode adjusts bandwidth usage, and the second mode maintains bandwidth usage at some value.

In one aspect, a communication apparatus may use packet loss recovery techniques (e.g., forward error correction) to minimize retransmission of data packets.

In one aspect, a communication apparatus may use error detection (e.g., checksum) and error correction to recover corrupted data.

In one aspect, a communication apparatus may estimate round-trip time (RTT) and bandwidth periodically and optimize the parameters of an accelerated protocol based on these measurements.

In one aspect, a communication apparatus may use User Datagram Protocol (UDP) hole punching to traverse firewalls/network address translations (NATs).

In one aspect, a communication apparatus may use other NAT traversal methods such as Simple Traversal of UDP Through NATs (STUN), Traversal Using Relay NAT (TURN), and Interactive Connectivity Establishment (ICE).

In one aspect, a communication apparatus may use UDP hole punching to establish multiple concurrent sessions.

In one aspect, a communication apparatus may use bandwidth throttling for fair distribution of data transfer to minimize packet loss on client because of UDP's internal queue or some other network condition.

In one aspect, a communication apparatus may use a priority queue at the sender end and a hash table at the receiver end, along with appropriately sized buffers, to ensure fast, reliable and efficient in-order delivery of packets.

In one aspect, a communication apparatus may use a hash table layered on top of the sender-side priority queue to reduce processor usage and access time to sent packets.

In one aspect, a communication apparatus may use real-time data type-aware compression.

In one aspect, a communication apparatus may use encryption to provide increased security of data.

In one aspect, a communication apparatus may use built-in Quality-of-Service (QoS) mechanism for data prioritization and bandwidth utilization.

In one aspect, a communication apparatus may use caching of data to provide better user experience.

In one aspect, local communication proxy modules may communicate with one another to reduce multiple transmissions of packets that are sent from remote locations.

In accordance with various aspects of the disclosure, the features described above are discussed in further detail below, while referring to FIGS. 1 and 2:

In one aspect, a transparent communication proxy module (e.g., 120; 220) may be configured to intercept incoming connection requests (e.g., all or certain connection requests) and to transfer them to a local communication proxy module (e.g., 130; 230) if required (a decision may be based on a configuration).

A transparent communication proxy module may be configured to:
- transfer an incoming connection request to a local communication proxy module based on a configuration (e.g., a user configuration, a user input, a predetermined setting, or a variable setting).
- be responsible for fail over recovery. For example, if a local communication proxy module (e.g., 130; 230) or a remote communication proxy module (e.g., 150; 250) is not running, or a connection between the two cannot be established, then the transparent communication proxy module fails over to a connection utilizing a non-accelerated protocol, such as a TCP channel (e.g., 189; 289). In another example, the transparent communication proxy module fails over to a non-accelerated mode (e.g., utilizing channels such as 189 or 289), if it detects that an accelerated mode does not provide benefits over the non-accelerated mode based on the network condition (e.g., low RTT, low available bandwidth, no or low packet loss).

In one aspect, communication proxy modules (e.g., 130/150; 230/250) may conceal network shortcomings (e.g., latency, bandwidth, packet loss, etc.) from the applications in communication application modules (e.g., applications in modules 110/160; client and server applications in modules 210/260).

Communication proxy modules may be configured to:
- conceal the actual network characteristics from the communication application modules.
- allow the communication application modules to use an accelerated protocol without modification.

In one aspect, the locations of the communication proxy modules (e.g., 130/150; 230/250) are independent of the locations of the communication application modules (e.g., applications in communication application modules 110/160; client and server applications in communication application modules 210/260).

For example, this gives flexibility to adapt this technology to different scenarios and requirements.

In one aspect, communication proxy modules (e.g., 130/150; 230/250) may use congestion control to ensure fairness in bandwidth usage.

For instance, this allows multiple data streams utilizing an accelerated protocol to share the available bandwidth in a fair manner with each other and with other data streams.

In one aspect, communication proxy modules (e.g., 130/150; 230/250) (e.g., as a sender) may use a packet-loss based congestion control algorithm that takes into account (i) lost packets that are recovered at the receiver end through packet-loss recovery techniques as well as (ii) packets that are lost and not recovered at the receiver end and are retransmitted by the sender to the receiver end. In one aspect, the congestion control algorithm may also take into account packets that are successfully transmitted and acknowledged.

For example, the congestion control algorithm may adjust the window size of data sent based on the number or rate of packet retransmissions.

For example, the congestion control algorithm manages bandwidth usage based on packet loss statistics that take into account (i) any lost packets that are recovered at the receiver end through error recovery techniques and (ii) packets that are lost and not recovered at the receiver end and are retransmitted by the sender to the receiver end (described below). In addition, the congestion control algorithm may take into account packets that are successfully transmitted by the sender and acknowledged by the receiver.

In one example, a first communication proxy module (e.g., 130) may adjust the window size of data streams to be sent to a second communication proxy module (e.g., 150) based on lost packets that are recovered by the second communication proxy module and reported back to the first communication proxy module.

In one example, a first communication proxy module (e.g., 130) may adjust the window size of data streams to be sent to a second communication proxy module (e.g., 150) based on lost packets that are recovered by the second communication proxy module and reported back to the first communication proxy module and based on lost packets that are not recovered by the second communication proxy module and retransmitted by the first communication proxy module. In addition, the window size may be adjusted based on the packets that are successfully transmitted by the first communication proxy module and acknowledged by the second communication proxy module.

In one example, each acknowledgement-type packet (e.g., ACK, ACK2, SYN-ACK, RTT-ACK) may contain, in the optional field (e.g., bits 64-95 shown in FIG. 9), the current measured rate of packets that are lost, but recovered. For instance, an ACK packet sent from a second communication proxy module (e.g., module 150) to a first communication proxy module (e.g., module 130) contains, in the optional field, the rate of packets sent from the first communication proxy module to the second communication proxy module that are recovered at the second communication proxy module through error correction (e.g., FEC).

In the above three examples, 130 may be 150, and 150 may be 130, respectively.

In one aspect, communication proxy modules (e.g., 130/150; 230/250) may use a congestion control algorithm that cycles between two modes of bandwidth usage, where the first mode adjusts (e.g., attempts to increase) bandwidth usage, and the second mode maintains (e.g., attempts to maintain, or facilitates maintaining) bandwidth usage at some value.

In one example, the bandwidth usage may be "cycled" or alternated between two modes, staying in each mode for some time. In the first mode, a window size is not limited to any size, or is limited by a size based on the maximum bandwidth limit allowed (e.g., as specified by an administrator). In the second mode, a window size may be limited by a maximum value based on the estimated available bandwidth. In one example, the second bandwidth usage mode is maintained for a period of time, followed by the first bandwidth usage mode for a period of time, and this cycle is repeated continuously.

In one example, a communication proxy module (e.g., 130 or 150) may determine a threshold value for packet loss that is acceptable (e.g., 1 or 2% packet loss). In one aspect, the threshold value may be predetermined and constant. In another aspect, the threshold value may be a variable value.

For the first mode, in one example, a communication proxy module (e.g., 130 or 150) may periodically measure the packet loss and determine whether the packet loss is above a packet loss threshold value. If the packet loss is below the threshold value, then the communication proxy module may increase the current amount of bandwidth used by the streams (e.g., increase a window size used by the streams). The communication proxy module may continue to increase the current amount of bandwidth (e.g., a window size) used by the streams until the packet loss becomes above the packet loss threshold value or until the current amount of bandwidth reaches a maximum bandwidth limit allowed for the first mode, whichever occurs first. Then the communication proxy module may begin to decrease the current amount of bandwidth utilized by the streams until the packet loss is below the threshold value. Accordingly, in the first mode, the communication proxy module may continue to adjust the current amount of bandwidth used by the streams (e.g., by increasing it or decreasing it). The communication proxy module may remain in this first mode for a first duration.

In one aspect, the amount of this first duration is predetermined and constant. In another aspect, the amount of this first duration is a variable value. In one aspect, the maximum bandwidth limit for the first mode is predetermined and constant. In another aspect, the maximum bandwidth limit may be a variable value. In one example, if the maximum bandwidth limit is 10 Mbits/sec, then the current amount of bandwidth may vary between, for example, 2 Mbits/sec and 3 Mbits/sec in the first mode. These are merely examples, and the subject technology is not limited to these examples.

For the second mode, in one example, a communication proxy module (e.g., 130 or 150) may select a maximum bandwidth limit for the second mode (which may be different from the maximum bandwidth limit allowed for the first mode) based on the bandwidth value utilized in the first mode, and may utilize the selected maximum bandwidth limit in the second mode for a second duration. In one example, a communication proxy module may also control bandwidth usage (e.g., through window size adjustment) in this second mode based on a function of the form $L\_use = L_m - \exp(-kt)$, where "$L_m$" is the maximum bandwidth limit for this second mode, "L_use" is the current amount of bandwidth used in this second mode, "k" is a constant, and "t" is time.

In one aspect, even in this second mode, if there is congestion, the current amount of bandwidth (e.g., a window size) may be reduced, and the current amount of bandwidth may increase if the packet loss is less than a packet loss threshold value (e.g., the current amount of bandwidth may increase based on successfully acknowledged packets). But in this second mode, the current amount of bandwidth does not exceed the maximum bandwidth limit selected for the second mode (e.g., the maximum window size for the second mode). This can thus reduce congestion.

In one example, when the communication proxy module switches from the first mode to the second mode, the communication proxy module may select and utilize, as a maximum bandwidth limit for the second mode (e.g., an estimated available bandwidth), the last highest bandwidth value used in the first mode that produced a packet loss that was below the packet loss threshold value. In another example, when the communication proxy module switches from the first mode to the second mode, the communication proxy module may utilize the last bandwidth value used in the first mode. In another example, the communication proxy module may select, as a maximum bandwidth limit for the second mode, yet another bandwidth value.

In one aspect, the amount of the second duration is predetermined and constant. In another aspect, the amount of the second duration is a variable value.

In one aspect, the maximum bandwidth limit (e.g., the maximum window size) for the second mode is less than the maximum bandwidth limit allowed for the first mode. Accordingly, the current amount of bandwidth for the second mode may fluctuate or vary less than the current amount of bandwidth for the first mode.

In one aspect, in the second mode, the communication proxy module facilitates maintaining the bandwidth usage while allowing congestion control, if necessary (e.g., allowing the bandwidth to vary). In one aspect, the congestion control behavior of increasing and decreasing a window size based on acknowledgements and packet loss (respectively) is in effect in both the first and second modes. However, for the second mode, in one aspect, while a communication proxy module performs congestion control, the communication proxy module does not allow the window size to exceed the maximum window size of the second mode (even if successful packet acknowledgements are received), and the maximum window size is related to the estimated available bandwidth of the first mode. Accordingly, in the second mode, the communication proxy module may maintain the bandwidth usage substantially constant at the estimated available bandwidth because, for example, the amount of packet loss likely remains low in the second mode.

In one example, a communication proxy module (e.g., 130 or 150) may be in a first mode for a first duration, switch to a second mode for a second duration, switch to the first mode for the first duration, switch to the second mode for the second duration, and continue to switch between the first and second modes.

In one example, the packet loss may be determined based on various techniques described herein (e.g., lost packets that are recovered, lost packets that are retransmitted, packets that are successfully transmitted).

In one example, an amount of bandwidth may be estimated based on the amount of packet loss. In one example, a maximum window size may be determined based on the amount of bandwidth and a round-trip time (e.g., $W = L*RTT$). In one example, a window size may be set by a congestion control algorithm. In one example, RTT may be substantially constant for a given network and for a given communication apparatus.

In one aspect, the amount of bandwidth may sometimes refer to an estimated bandwidth, a current amount of bandwidth used, an available bandwidth, or an estimated available bandwidth.

In one aspect, utilizing the second mode (e.g., maintaining bandwidth usage for a period at an estimated available bandwidth), a communication apparatus may reduce congestion/packet loss in the network (because the communication apparatus is not always attempting to increase bandwidth usage).

In one aspect, communication proxy modules (e.g., 130/150; 230/250) may use packet loss recovery techniques (e.g., forward error correction (FEC)) to minimize retransmission of data packets.

For example, recovering data at a client end can be especially useful for high-latency networks, since retransmission of data streams from a server means a delay of the order of 1 round-trip time, which would be highly detrimental to the usability of real-time applications. A scheme such as FEC reduces the frequency of such retransmissions.

In one aspect, communication proxy modules (e.g., 130/150; 230/250) may use error detection (e.g., checksum) and error correction to recover corrupted data.

Error detection: For example, the UDP checksum is 16 bits long, and this resolution may not be sufficient to detect all errors. A more sophisticated error detection scheme (such as a 32-bit cyclic redundancy check (CRC) or a 32-bit checksum) can detect errors more effectively. In one aspect, various CRC techniques known in the mi may be employed.

Error correction: For example, once corruption is detected in a data packet, the actual error-free data may be recovered through the use of error correcting codes.

In one aspect, communication proxy modules (e.g., 130/150; 230/250) may estimate round-trip time and bandwidth periodically and optimize protocol parameters based on these measurements.

For example, rather than optimizing an accelerated protocol of the subject technology for a specific type of network with given latency, the protocol is adaptable to changing network conditions. Effective round-trip time is likely to vary in networks, and available bandwidth can change significantly at any instant. An accelerated protocol can measure these quantities periodically and optimize its parameters for these conditions.

In one aspect, communication proxy modules (e.g., 130/150; 230/250) may use User Datagram Protocol (UDP) hole punching to traverse firewalls/network address translations (NATs).

For example, NAT gateways may conceal the IP addresses of all machines that are "behind" them, making communication with these machines difficult. UDP hole punching is a NAT-traversal technique that may be employed for that purpose.

For example, a hole punching technique may be used so that two applications can talk to each other even when behind firewalls, provided, for instance, at least one UDP port on a server is open on the firewall.

In one aspect, a communication apparatus may use other NAT traversal methods such as Simple Traversal of UDP Through NATs (STUN), Traversal Using Relay NAT (TURN), and Interactive Connectivity Establishment (ICE).

In one aspect, communication proxy modules (e.g., 130/150; 230/250) may use UDP hole punching to establish multiple concurrent sessions.

For example, UDP hole punching may be used in the initial "handshake" stage of an accelerated protocol, to establish multiple concurrent connections with a single server.

In one aspect, communication proxy modules (e.g., 130/150; 230/250) may use bandwidth throttling to maximize bandwidth usage for many different conditions of packet loss, latency, and jitter.

For example, a communication proxy module may limit the amount of bandwidth used by the streams at any point to an "optimal" value that is determined by taking into account the latency, and packet loss measurements, as well as the processing capabilities of the host machines on which the communication proxy modules are running, or by taking into account any subset (e.g., one or more) of the aforementioned factors (e.g., the latency and packet loss measurements, and processing capabilities of the host machines). In another example, a communication proxy module may limit the amount of bandwidth used by streams based on the available bandwidth.

In one example, to limit the amount of bandwidth used, a communication proxy module may limit the window size of data packets to be sent based on, for example, the latency and packet loss measurements, as well as the processing capabilities of the host machine on which the communication proxy module is running, or based on any subset (e.g., one or more) of the aforementioned factors (e.g., latency and packet loss measurements, and processing capabilities of the host machines). In another example, a communication proxy module may limit the window size of data packets based on the bandwidth.

In one example, the bandwidth utilized by streams (e.g., packets) may be estimated based on the amount of data loss (e.g., packet loss). A bandwidth may, for example, refer to a window size of streams (e.g., a window size of packets). An optimal value of the bandwidth (e.g., an optimal value for the window size) may be, for example, the window size where the amount of data loss is below a threshold value.

In one aspect, communication proxy modules (e.g., 130/150; 230/250) may use a priority queue at the sender end and a hash table at the receiver end, along with appropriately sized buffers, to ensure fast, reliable and efficient in-order delivery of packets.

For example, a hash table is a way of organizing access to data that allows near-instant access to the data. It can be used at both sender and receiver ends for the buffered packets, and minimize the burden on the processor.

For example, the priority queue at the sender end may order the data according to the time it was sent, so that if retransmissions are needed, then these packets can be sent in the same order.

For example, the priority queue at the sender end may be implemented as a singly-linked list, or as a doubly-linked list.

In one aspect, communication proxy modules (e.g., 130/150; 230/250) may use a hash table layered on top of the sender-side priority queue to reduce processor usage and access time to sent packets.

For example, this allows quick access to sent packets in case they need to be resent, or when they are acknowledged. The processor usage is also reduced, since it does not need to "search" for these packets.

In one aspect, communication proxy modules (e.g., 130/150; 230/250) may use real-time data type-aware compression.

For example, before the data is sent over a communication channel utilizing an accelerated protocol, the data may be compressed to minimize bandwidth usage. The compression type used can be based on the type of the data. For example, image data may use JPEG compression, while audio data may use MPEG compression. In one aspect, various compression techniques known in the art may be employed.

In one example, a communication proxy module (e.g., 130/150; 230/250) may determine the type of data (e.g., based on the format of the data or based on the source of the data), select the compression type for the data based on the determination, and compress the data utilizing the compression type selected.

In one aspect, communication proxy modules (e.g., 130/150; 230/250) may use encryption to provide increased security of data.

For example, it is likely that the data being sent across such "long" networks is generated by applications that did not envision this particular use case. Accordingly, additional security beyond that which is provided by the application may be necessary. In one example, the data sent over a communication channel utilizing an accelerated protocol is first encrypted before it is sent, and is decrypted at the receiver end before being passed on to its respective communication application module. In one aspect, various encryption techniques known in the art may be employed.

In one aspect, communication proxy modules (e.g., 130/150; 230/250) may use built-in Quality-of-Service (QoS) mechanism for data prioritization and bandwidth utilization.

For example, an administrator of the network can set constraints on the bandwidth used by sessions that are running through the framework of a communication apparatus, and also dictate which kinds of data receive higher priority in transmission.

In one example, a communication proxy module may set constraints on the amount of bandwidth used by the streams. This may be done dynamically. In another example, a communication proxy module may dynamically limit the amount of bandwidth used by the streams (e.g., maintain or limit the bandwidth below a threshold value).

In one aspect, communication proxy modules (e.g., 130/150; 230/250) may use caching of data to provide better user experience.

For example, data may be cached at some intermediary location (e.g., a communication proxy module or a location such as a memory in apparatus 170B or another computer) to reduce retransmission of data that is sent multiple times.

In one example, local communication proxy modules (e.g., 130 or 150) may communicate with one another to reduce multiple transmissions of packets that are sent from remote locations.

In one example, if there are many local clients or servers (multiple 110's/multiple 160's) receiving the same data (e.g., video, audio, multimedia) from a remote location, then (i) that data can be sent just once from the remote location to at least one of the communication proxy modules on the client side or server side, respectively, (ii) if there are multiple communication proxy modules, the communication proxy modules can obtain the data from each other, and (iii) the communication proxy module(s) can send that data on to the communication application module on each client or server, respectively. This is described in more detail with reference to FIGS. 5 through 8 later.

In another example, if there are many local clients or servers receiving the same data from a remote location, then (i) that data can be sent just once from the remote location to an intermediary location on the client or Server side, respectively, that is not a communication proxy module, (ii) if there are multiple communication proxy modules, the communication proxy modules can obtain the data from the intermediary location, and (iii) the communication proxy module(s) can send that data on to the communication application module on each client or server, respectively. This is described in more detail with reference to FIGS. 5 through 8 later.

In accordance with one aspect of the disclosure, an example of an operation of a communication apparatus is described as follows, while referring to FIG. 1.

1. In one aspect, transparent communication proxy module 120 intercepts a stream from communication application module A 110.

In one example, transparent communication proxy module 120 may intercept all connection requests (e.g., all TCP connection requests) from communication application module A 110. In another example, transparent communication proxy module 120 may intercept some of the connection requests (e.g., all connection requests directed to a remote location(s) at a certain IP address(es) only, or all connection requests directed to a remote location utilizing a certain port(s) only) from a communication application module(s) 110 and do not intercept data streams from a communication application module(s) 110. In another example, module 120 may intercept connection requests and/or other network requests.

2. In one aspect, transparent communication proxy module 120 passes the intercepted stream (e.g., a TCP stream or a connection request) to communication proxy module A 130.

As a result of steps 1 and 2 described above, after interception by transparent communication proxy module 120, communication proxy module A 130 can now be in possession of the stream that is being sent from communication application module A 110 to communication application module B 160.

In one aspect, steps 1 and 2 allow communication proxy module A 130 to collect the stream from communication application module A 110 (e.g., a client application) so that the stream can be formatted for acceleration and be accelerated over a communication channel utilizing an accelerated protocol.

3. In one aspect, communication proxy module A 130 sends the stream to communication proxy module B 150 over the communication channel utilizing an accelerated protocol.

In one example, streams (e.g., TCP streams or TCP data streams) that have been sent by communication proxy module A 130 to communication proxy module B 150 over the communication channel may be stored in a buffer so that they may be retransmitted to module 150, if necessary.

In one example, on networks that have high latency and/or packet-loss, this allows the stream(s) to be sent faster than TCP would have carried it.

In one aspect, a stream(s) is(are) actually "accelerated" at step 3.

After this step, the stream can be in possession of communication proxy module B 150.

4. In one aspect, communication proxy module B 150 then sends the stream to communication application module B 160.

For example, the stream is sent to communication application module B 160 over a communication channel utilizing a non-accelerated protocol such as TCP.

Prior to step 4, communication proxy module B 150 reformats the stream to its original format so that the stream can be sent over a non-accelerated communication channel.

Step 4 completes the transmission from communication application module A 110 (e.g., client) to communication application module B 160 (e.g., server).

In one aspect, this step ensures that the stream reaches communication application module B 160 (e.g., server), and it is over a communication channel utilizing TCP so that communication application module B 160 is not aware of any difference from its normal operation.

After step 4, the stream from communication application module A 110 (e.g., client) is successfully arrived at communication application module B 160 (e.g., server).

In accordance with one aspect of the disclosure, an example of an operation of a communication apparatus is described with reference to FIGS. 1 and 3.

At block 101, a stream is received. For example, transparent communication proxy module 120 intercepts a stream destined to a remote destination (e.g., 160). In one aspect, the stream is a connection request. In one aspect, transparent communication proxy module 120 may intercept (i) all streams that are connection requests, (ii) all streams that are certain types of connection requests (e.g., connection requests for one or more remote destinations), or (iii) streams that are other network requests (e.g., network requests that are not connection requests).

At block 102, a determination (or a selection) is made as to whether to accelerate or not to accelerate communication associated with the stream. In one aspect, the stream is a connection request, and the communication associated with the stream may include communication of one or more streams (or data streams) that follow the connection request. In one aspect, the stream is a connection request, and the communication associated with the stream may include communication utilizing a connection that is made as a result of the connection request.

In one aspect, transparent communication proxy module 120 makes the determination. For example, transparent communication proxy module 120 determines whether to direct the stream to the remote destination (e.g., 160) through a local communication proxy module (e.g., 130) or to direct the stream to the remote destination without utilizing the local communication proxy module.

If a determination is made to accelerate the communication, then at block 103, the stream may be directed to a local communication proxy module (e.g., 130). If a determination is made not to accelerate the communication, then at block 103b, the stream may be directed towards the remote destination (e.g., 160) without utilizing the local communication proxy module.

Referring back to block 102, in one aspect, module 120 may make a determination based on (i) a configuration (e.g., a user configuration, a user input, a predetermined setting, or a variable setting) and/or (ii) one or more network conditions (e.g., an amount of packet loss or a round-trip time). In one example, if a configuration indicates an accelerated mode is selected (e.g., module 130 is enabled), then module 120 may select the accelerated mode and direct the stream to module 130, and if not, then module 120 can select the non-accelerated mode and direct the stream to the remote destination without using module 130. In one example, if a network condition is acceptable (e.g., the amount of packet loss is below a threshold level, or the round-trip time is below a threshold level), then module 120 may select the non-accelerated mode. If not, module 120 may select the accelerated mode. In another example, module 120 may select the non-accelerated mode if a bandwidth (which may be another network condition) used by streams is below a threshold value. If not, module 120 may select the accelerated mode. In one example, module 120 may receive the network conditions from module 130.

In one aspect, module 120 may also make a determination based on one or more of the following: whether module 130 is running (or operational), whether module 150 is running, or whether a connection between module 130 and module 150 is establishable. If module 130 or module 150 is not running, or if the connection is not establishable, module 120 may select the non-accelerated mode.

In one aspect, prior to module 120 making the determination described in the previous paragraph, the local communication proxy module may make a determination as to whether a connection between the local communication proxy module (e.g., 130) and the remote communication proxy module (e.g., 150) is establishable (e.g., whether a connection can be successfully established between 130 and 150, or a connection can be successfully established between 110 and 160 utilizing 130 and 150).

In one example, the local communication proxy module may attempt to establish a separate test connection with the remote communication proxy module to test and determine whether a connection between the local communication proxy module and the remote communication proxy module is establishable. Similarly, in one example, the remote communication proxy module may determine whether a connection between the remote communication proxy module (e.g., 150) and the remote destination (e.g., 160) is establishable (e.g., using another test connection).

If a connection is establishable (e.g., the test connection(s) are successfully established), then the successful connection-establishability result may be communicated. For example, a local communication proxy module (e.g., 130) may send a reply message to a transparent communication proxy module (e.g., 120), for example, in response to a request from the transparent communication proxy module, that the connection is establishable so that the stream can be transmitted using the local communication proxy module.

If a connection cannot be successfully made (e.g., the test connection(s) are not successfully established), then the failed result may be communicated. For example, a local communication proxy module (e.g., 130) may send a reply message to a transparent communication proxy module (e.g., 120), for example, in response to a request from the transparent communication proxy module, that the connection cannot be made. In this case, the transparent communication proxy module may redirect the stream towards the remote destination without utilizing the local communication proxy module (block 103b).

At block 104, the stream is provided to a remote communication proxy module (e.g., 150). For example, the local communication proxy module (e.g., 130) may facilitate sending the stream or may provide the stream to the remote communication proxy module. The remote communication proxy module may then send the stream to the remote destination.

In one example, the stream provided to a remote communication proxy module may include one of the following: (i) a portion of the stream received by the local communication proxy, (ii) information extracted from the stream received by the local communication proxy (e.g., the IP address and port of the remote destination), or (iii) the entire stream received by the local communication proxy. Before providing the stream to the remote communication proxy module, the local communication proxy module may add various header information described elsewhere in this disclosure.

In one example, the local communication proxy module may receive the entire stream from the transparent communication proxy module, and the local communication proxy module may then (i) take a portion of the stream received by the local communication proxy (e.g., create a modified version of the stream received by the local communication proxy), (ii) extract certain information from the stream received by the local communication proxy, or (iii) take the entire stream received by the local communication proxy, and add the appropriate header information before sending the stream to the remote communication proxy module. In another example, the transparent communication proxy module may send, to the local communication proxy module, (i) a portion of the stream received by the transparent communication proxy module from a local communication application module (e.g., 110), (ii) information extracted from the stream received by the transparent communication proxy module from the local communication application module, (iii) the entire stream received by the transparent communication proxy module from the local communication application module, or (iv) a modified version of the stream received by the transparent communication proxy module from the local communication application module. In one example, a transparent communication proxy module may send, to a local communication proxy module, the entire stream if the connection is successful, with the destination IP address changed from the IP address of the remote application module to the IP address of the local communication proxy module.

At block 107, one or more additional streams may be received. For example, one or more subsequent data streams from communication application module A 110 may be forwarded to the local communication proxy module (e.g., 130) via communication channel 183 (directly without utilizing transparent communication proxy module 120). In one aspect, the port used by communication proxy module 130 for communication channel 183 is different from the port used by communication proxy module 130 for communication channel 182.

At block 108, the local communication proxy module (e.g., 130) may send the one or more additional streams to the remote communication proxy module (e.g., 150). This may occur via a communication channel utilizing an accelerated protocol (e.g., via 185, 140 and 186). At block 109, the remote communication proxy module may send the one or more additional streams to the remote destination (e.g., 160). This may occur via a communication channel utilizing a non-accelerated protocol (e.g., 188).

In one aspect, once a connection is established, transparent communication proxy module 120 is not involved in transfer and/or receipt of streams, and communication application module A 110 communicates (e.g., sends and receives) streams directly with communication proxy module A 130 (e.g., via communication channel 183). Streams from communication application module B 160 may be sent to communication application module A 110 through a communication channel, which may include, for example, components 188, 150, 186, 140, 185, 130, and 183, where the communication is accelerated through components 185, 140 and 186.

In one aspect, after the stream (e.g., a connection request) is directed towards the remote destination without utilizing an accelerated communication channel (block 103b), the data streams, subsequent to the stream for the connection request, are also directed towards the remote destination without utilizing an accelerated communication channel. For example, subsequent data streams are sent from communication application module A 110 to communication application module 160 through communication channel 189. According to one example, these subsequent data streams are not intercepted by transparent communication proxy module 120.

In one aspect, an independent decision is made for each connection request as to whether to accelerate or not to accelerate communication associated with the connection request. For example, after receiving a stream, if module 120 receives a subsequent stream, which is a new connection request (as opposed to a data stream), then module 120 determines whether to accelerate or not to accelerate communication associated with the subsequent stream.

If a connection fails or is interrupted during communication (whether accelerated or not-accelerated), then communication application module A 110 may reestablish the connection utilizing, for example, an RDP or ICA.

Figure 3:
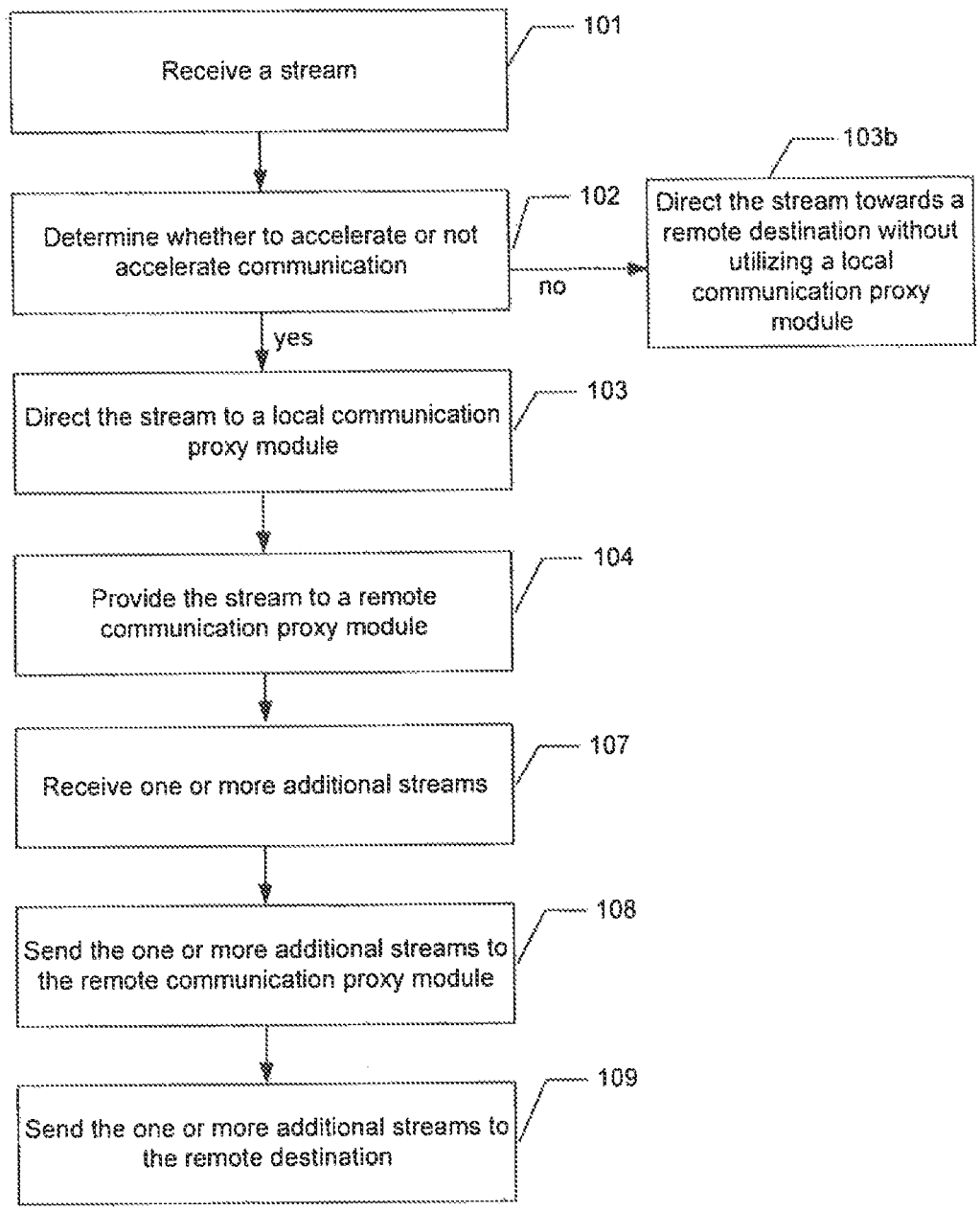
FIG. 3 is a flow chart illustrating an example of an operation of a communication apparatus in accordance with one aspect of the disclosure.

It should be noted that the order of operations provided in FIG. 3 is an example. The order may be changed, and some of the operations may be performed simultaneously in other examples.

Figure 4:
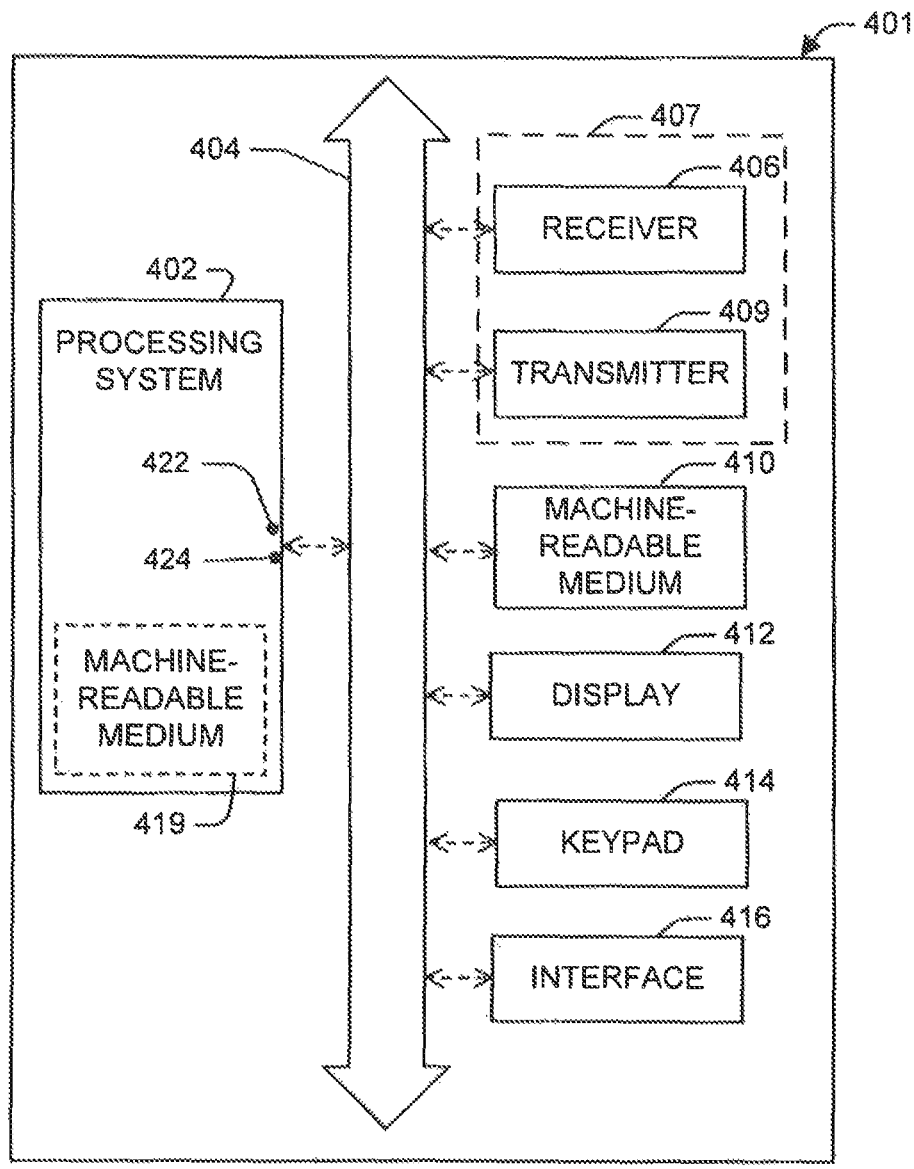
FIG. 4 is a conceptual block diagram illustrating an example of a system.

FIG. 4 is a conceptual block diagram illustrating an example of a system.

A system 401 may be, for example, a computer with module 110, a computer with modules 110 and 120, a computer with modules 110, 120, and/or 130, or a computer with a module 160 and/or a module 150. The system 401 includes a processing system 402. The processing system 402 is capable of communication with a receiver 406 and a transmitter 409 through a bus 404 or other structures or devices. It should be understood that communication means other than busses can be utilized with the disclosed configurations. The processing system 402 can generate audio, video, multimedia, and/or other types of data to be provided to the transmitter 409 for communication. In addition, audio, video, multimedia, and/or other types of data can be received at the receiver 406, and processed by the processing system 402.

The processing system 402 may include a general-purpose processor or a specific-purpose processor for executing instructions and may further include a machine-readable medium 419, such as a volatile or non-volatile memory, for storing data and/or instructions for software programs. The instructions, which may be stored in a machine-readable medium 410 and/or 419, may be executed by the processing system 402 to control and manage access to the various networks, as well as provide other communication and processing functions. The instructions may also include instructions executed by the processing system 402 for various user interface devices, such as a display 412 and a keypad 414. The processing system 402 may include an input port 422 and an output port 424. Each of the input port 422 and the output port 424 may include one or more ports. The input port 422 and the output port 424 may be the same port (e.g., a bi-directional port) or may be different ports.

The processing system 402 may be implemented using software, hardware, or a combination of both. By way of example, the processing system 402 may be implemented with one or more processors. A processor may be a general-purpose microprocessor, a microcontroller, a Digital Signal Processor (DSP), an Application Specific Integrated Circuit (ASIC), a Field Programmable Gate Anay (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 419) may include storage integrated into a processing system, such as might be the case with an ASIC. Machine-readable media (e.g., 410) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. Those skilled in the art will recognize how best to implement the described functionality for the processing system 402. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a computer or by a processing system of a computer. Instructions can be, for example, a computer program including code.

An interface 416 may be any type of interface and may reside between any of the components shown in FIG. 4. An interface 416 may also be, for example, an interface to the outside world (e.g., an Internet network interface). A transceiver block 407 may represent one or more transceivers, and each transceiver may include a receiver 406 and a transmitter 409. A functionality implemented in a processing system 402 may be implemented in a portion of a receiver 406, a portion of a transmitter 409, a portion of a machine-readable medium 410, a portion of a display 412, a portion of a keypad 414, or a portion of an interface 416, and vice versa.

Further Functional Description According to Various Aspects of the Disclosure

According to one aspect of the disclosure, communication proxy modules (e.g., 120, 130, 150 in FIG. 1) can provide a consistent user experience on remote data communication sessions (e.g., RDP, ICA) regardless of the round trip delay between its originating device and a remote destination device (e.g., a client and a session server; modules 110 and 160 in FIG. 1). In other words, for a given bandwidth, an accelerated session (e.g., an accelerated RDPIICA session) between a client and its remote destination device (e.g., a server located at some arbitrary distance from the client) "feels" like a "local" experience (e.g., feels as if the remote destination device is local to the client).

Referring back to FIG. 1, transparent communication proxy module 120, communication proxy module A 130, and communication proxy module B 150 are described in further detail below.

Transparent Communication Proxy Module:

When a connection request is made (e.g., when an RDP connection request is initiated from communication application module A 110), transparent communication proxy module 120—which may be inserted at a layer below layer 6 in the OSI model, e.g., in the networking stack (layer 3)—may intercept this outgoing connection establishment request and send the request to the address of communication proxy module A 130.

Communication Proxy Module A:

Communication proxy module A 130 (which is a software application in one example), running as a service, may monitor (or listen on) a port to accept incoming socket connections from communication application module A 110. This port may be a pre-assigned port or may be configured to a different port at a later time. Once a connection request is received, communication proxy module A 130 may establish an accelerated connection (e.g., 185, 140 and 186) with communication proxy module B 150 and then transfer streams (e.g., data streams) between communication application module A 110 and communication proxy module B 150 over the communication channel (e.g., 185, 140 and 186) utilizing an accelerated protocol.

Communication Proxy Module B:

Communication proxy module B 150 (which is a software application in one example), running as a service, may receive all incoming streams (e.g., data streams conforming to an accelerated protocol) from communication proxy module A 130 and forward them to a destination (e.g., communication application module B 160). Communication proxy module B 150 may also receive streams from communication application module B 160 and transfer them to communication proxy module A 130.

According to one aspect of the disclosure, an example of an operation of a communication apparatus is illustrated below as a process flow, while referring to FIG. 1.

1. Communication application module A 110 (e.g., an application on a first computer or a client) sends a connection request in an attempt to connect to communication application module B 160 (e.g., an application on a second computer or a server at a certain IP address and port).
2. Transparent communication proxy module 120 intercepts this connection request (e.g., an RDP/ICA connection request), and opens a new connection (e.g., 182) to communication proxy module A 130.
3. Communication proxy module A 130 attempts to establish a connection channel (e.g., 185, 140 and 186) with communication proxy module B 150 using an accelerated protocol.
    a. If this connection (or this communication channel) between modules 130 and 150 cannot be established, then communication proxy module A 130 sends a 'FAIL' signal to transparent communication proxy module 120 via, e.g., channel 182.

b. Otherwise, if this connection (or this communication channel) is established, then communication proxy module A 130 sends a 'SUCCESS' signal to transparent communication proxy module 120 via, e.g., channel 182.

4. If the reply from communication proxy module A 130 is 'SUCCESS,' then communication proxy module A 130 may monitor streams from communication application module A 110 directly using communication channel 183 without transparent communication proxy module 120. Streams (e.g., data streams) may be sent and received between communication application module A 110 and communication proxy module A 130 via communication channel 183.

5. If the reply is 'FAIL,' then transparent communication proxy module 120 may redirect the connection request (e.g., original RDP/ICA connection request) to communication application module B 160 (e.g., a session server) over communication channel 189 utilizing a non-accelerated protocol (e.g., TCP). This may be referred to as a fallback mechanism.

In one configuration, a graphical user interface (GUI) is not provided; in another configuration, a GUI is provided. In one aspect, users/administrators can configure the acceleration parameters in registry keys, and can enable/disable the acceleration by accelerator modules using, for example, the Windows Services menu (e.g., services.msc).

In one aspect, the accelerator modules may include communication proxy module A 130 and communication proxy module B 150. In another aspect, the accelerator modules may include transparent communication proxy module 120, communication proxy module A 130 and communication proxy module B 150.

In one example, the following registry keys are available (e.g., at HKEY_LOCAL_MACHINE\Software\WYSE\Accelerator_Product\Settings):

Bandwidth: This may be the maximum bandwidth that accelerator modules 130 and 150 use.

Horizontal XOR Window Size: This may be the number of packets in the horizontal window for forward error correction (FEC).

MTU Size: This may be the maximum size of individual packets sent/received by accelerator modules 130 and 150.

UDP Port: This may be the port at which communication proxy module B 150 listens.

Vertical XOR Window Size: This may be the number of packets in the vertical window for forward error correction (FEC).

In one example, the following registry keys are available (e.g., at HKEY_LOCAL_MACHINE\Software\Wyse\Accelerator_Product\):

Enable: When this is set to 1, accelerator modules 130 and 150 are enabled. When it is 0, accelerator modules 130 and 150 are disabled.

Ports: A list of ports that may be intercepted by communication proxy module A 130 (as further described below).

In the above two examples, while the accelerator modules refer to accelerator modules 130 and 150, in an alternate configuration, the accelerator modules may further include module 120. Accordingly, in the above two example, the phrase "accelerator modules 130 and 150" may be replaced with the phrase "accelerator modules 120, 130 and 150" in an alternate configuration.

Below is an example of a list of ports that may be intercepted by communication proxy module A 130.

ICA: Value=2598
ICA_alternate: Value=1494
MMR: Value=9427
RDP: Value=3389

According to various aspects of the disclosure, a number of different exemplary scenarios are presented in Table 1 below, while still referring to FIG. 1.

TABLE 1

| Event | Code | Behavior at 170 | Behavior at 180 |
|---|---|---|---|
| Event 1: Module 110 initiates an RDP/ICA connection to module 160 using RDP/ICA applications. | The connection is accelerated using modules 120, 130 and 150. (e.g., Modules 120, 130 and 150 for connection requests, and modules 130 and 150 for data streams) | All streams pertaining to the connection are redirected through module 130, which sends/receives streams using an accelerated protocol. | Module 150 establishes a non-accelerated connection (e.g., 188 using TCP) with module 160. Module 150 forwards all streams received on channel 186 to module 160 over the non-accelerated channel 188 and also receives streams from 160 over the non-accelerated channel 188. |
| Event 2: Additional sessions are opened on module 110, to multiple modules 160's (e.g., one client-to-many servers) | Each connection is accelerated using modules 120, 130 and 150 (or multiple 150's). | Each connection is established on a separate port. | Each of multiple modules 160's handles its own connection as in the one-to-one case. A new port is created for each respective connection. |

TABLE 1-continued

| Event | Code | Behavior at 170 | Behavior at 180 |
|---|---|---|---|
| Event 3: Multiple sessions are opened on the same module 160 from multiple modules 110's (e.g., many clients-to-one server) | Each connection is accelerated using modules 120, 130 (or multiple 130's) and 150. | Each of modules 110's handles its own connection as in the one-to-one case. A new port is used for each respective connection. | Each connection is established on a separate port, if multiple sessions are supported by the underlying accelerated protocol. |
| Event 4: The connection is dropped | The connection is dropped | The connection is dropped | The connection is dropped |
| Event 5: The session is used with another Wyse's device/software such as a TCX component. | Modules 120, 130 and 150 accelerate Wyse's TCX component traffic. In one example, only MMR is supported. | A new thread is created. A separate port is opened for Wyse's TCX component traffic, and acceleration happens on this port. | A new thread is created. Module 150 intercepts streams (e.g., traffic), and forwards the streams to module 160 on a separate port. |
| Event 6: Module 110 attempts to open a connection on module 160 that is behind a firewall. | Modules 120, 130 and 150 accelerate the connection, provided that, in one example, the accelerator module port (3471) is opened on the firewall. | Same as non-firewalled connection. | Same as non-firewalled operation. In one example, the accelerator module port (3471) is opened on the firewall to allow this event to occur. |

Figure 5:
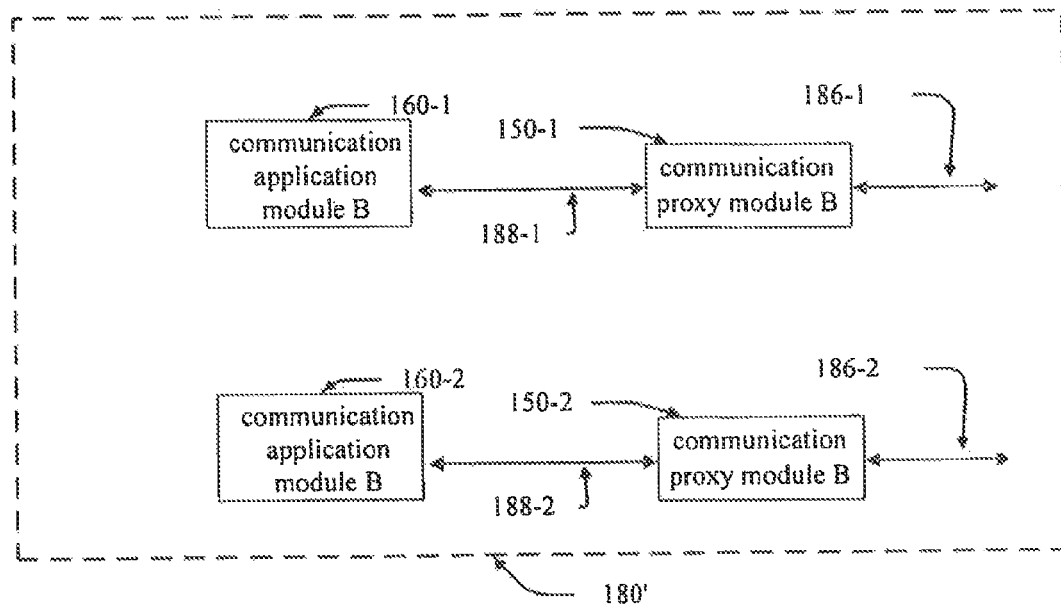
FIG. 5 is a conceptual block diagram illustrating an example of a communication apparatus having multiple destination modules in accordance with one aspect of the disclosure.

In accordance with one aspect of the disclosure, Event 2 described in Table 1 is described in further detail with reference to FIGS. 1 and 5. In this example, communication apparatus B 180' includes multiple communication application modules and multiple communication proxy modules. In FIG. 5, communication application modules B 160-1 and 160-2 are connected to communication proxy modules B 150-1 and 150-2, respectively, via communication channels 188-1 and 188-2, respectively. Communication proxy modules B 150-1 and 150-2 may use separate communication channels 186-1 and 186-2, respectively, to communicate with communication proxy module A 130. Thus, each of communication proxy modules B 150-1 and 150-2 may utilize its respective port to communicate with communication proxy module A 130. While two communication application modules and two communication proxy modules are shown, the subject technology is not limited to these and may include any number of communication application modules and any number of corresponding communication proxy modules.

Figure 6:
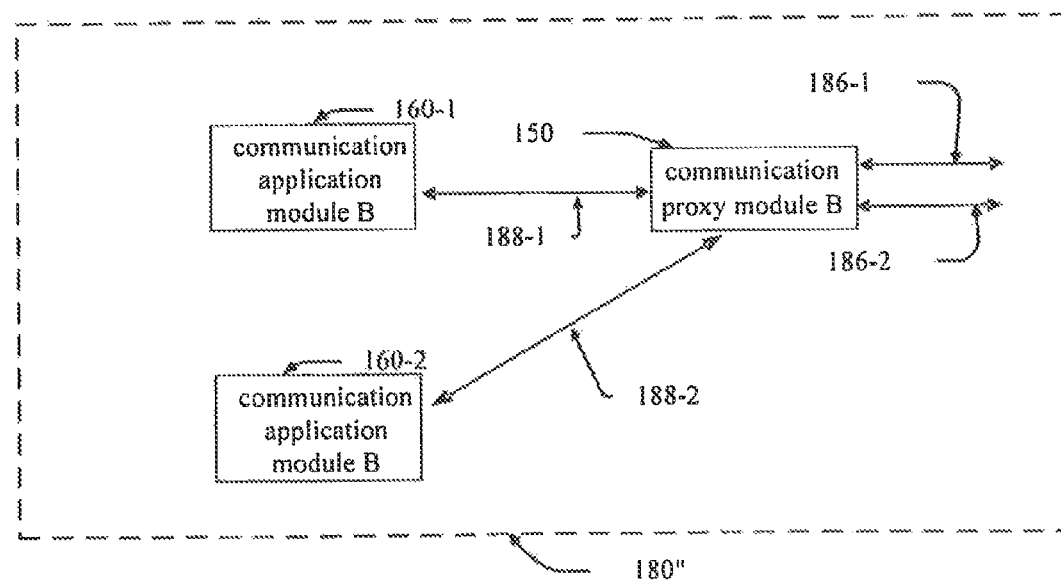
FIG. 6 is a conceptual block diagram illustrating another example of a communication apparatus having multiple destination modules in accordance with one aspect of the disclosure.

In accordance with another aspect of the disclosure, Event 2 described in Table 1 is described in further detail with reference to FIGS. 1 and 6. In this example, communication apparatus B 180" includes multiple communication application modules and a single communication proxy module. In FIG. 6, communication application modules B 160-1 and 160-2 are connected to communication proxy module B 150, via communication channels 188-1 and 188-2, respectively. Communication proxy module B 150 may use separate communication channels 186-1 and 186-2, respectively, to communicate with communication proxy module A 130. Channel 186-1 may be for streams from/to module 160-1, and channel 186-2 may be for streams from/to module 160-2. Thus, communication proxy module B 150 may utilize separate ports to communicate with modules 160-1 and 160-2 and separate ports to communicate with communication proxy module A 130. While two communication application modules and a single communication proxy module are shown, the subject technology is not limited to these and may include any number of communication application modules and any number of communication proxy modules.

Figure 7:
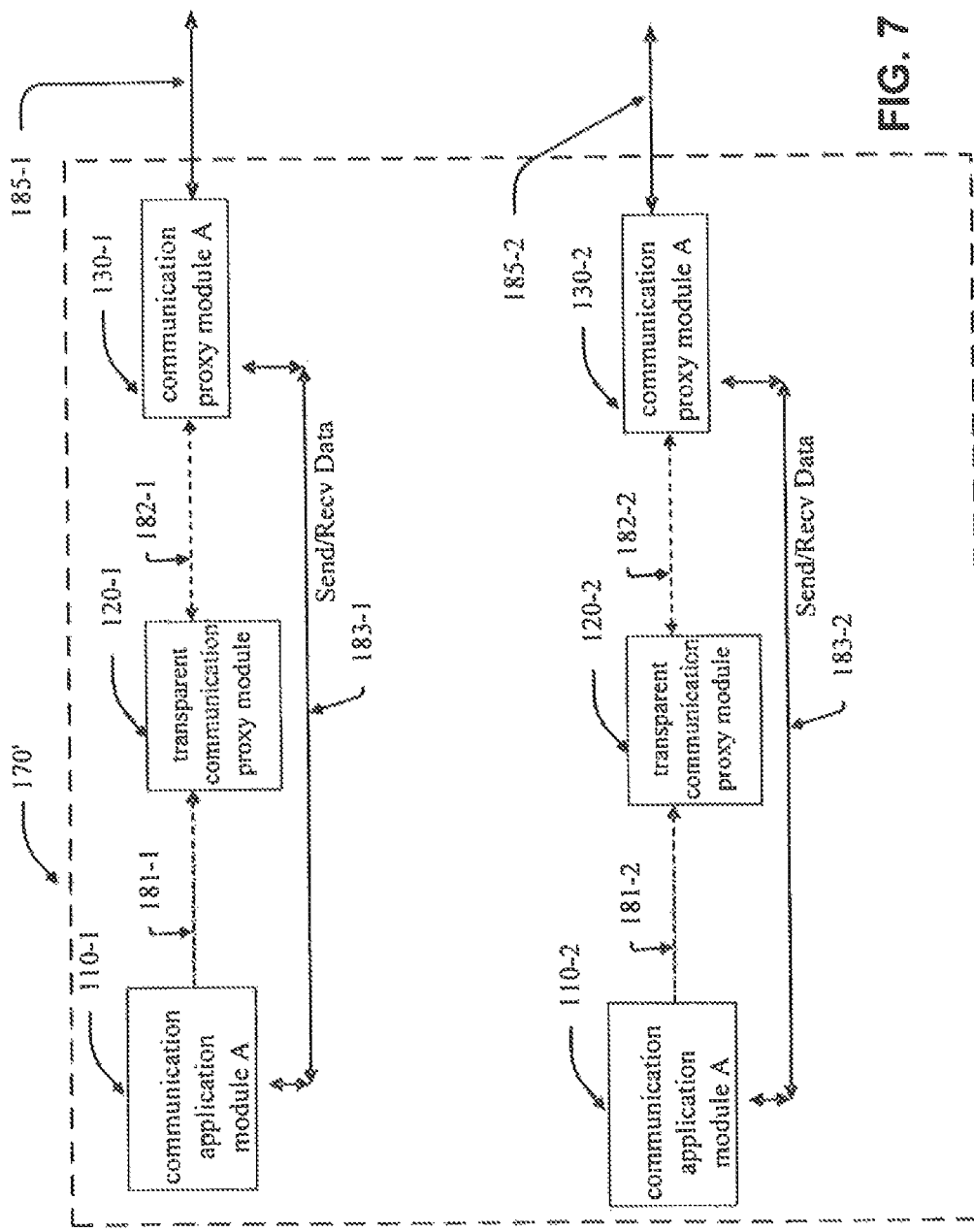
FIG. 7 is a conceptual block diagram illustrating an example of a communication apparatus having multiple originating modules in accordance with one aspect of the disclosure.

In accordance with one aspect of the disclosure, Event 3 described in Table 1 is described in further detail with reference to FIGS. 1 and 7. In this example, communication apparatus A 170' includes multiple communication application modules, multiple transparent communication proxy modules, and multiple communication proxy modules. In FIG. 7, communication application modules A 110-1 and 110-2 are connected to communication proxy modules A 130-1 and 130-2, respectively, via communication channels 181-1 and 181-2, respectively, via transparent communication proxy modules 120-1 and 120-2, respectively, via communication channels 182-1 and 182-2, respectively, and also via communication channels 183-1 and 183-2, respectively. Communication proxy modules A 130-1 and 130-2 may use separate communication channels 185-1 and 185-2, respectively, to communicate with communication proxy module B 150 (or 150-1 and 150-2, respectively, in another configuration). Thus, each of communication proxy modules A 130-1 and 130-2 may utilize its respective port to communicate with communication proxy module B 150 (or 150-1 and 150-2). While two communication application modules, two transparent communication proxy modules and two communication proxy modules are shown, the subject technology is not limited to these and may include any number of communication application modules, any number of corresponding transparent communication proxy modules and any number of corresponding communication proxy modules.

Figure 8:
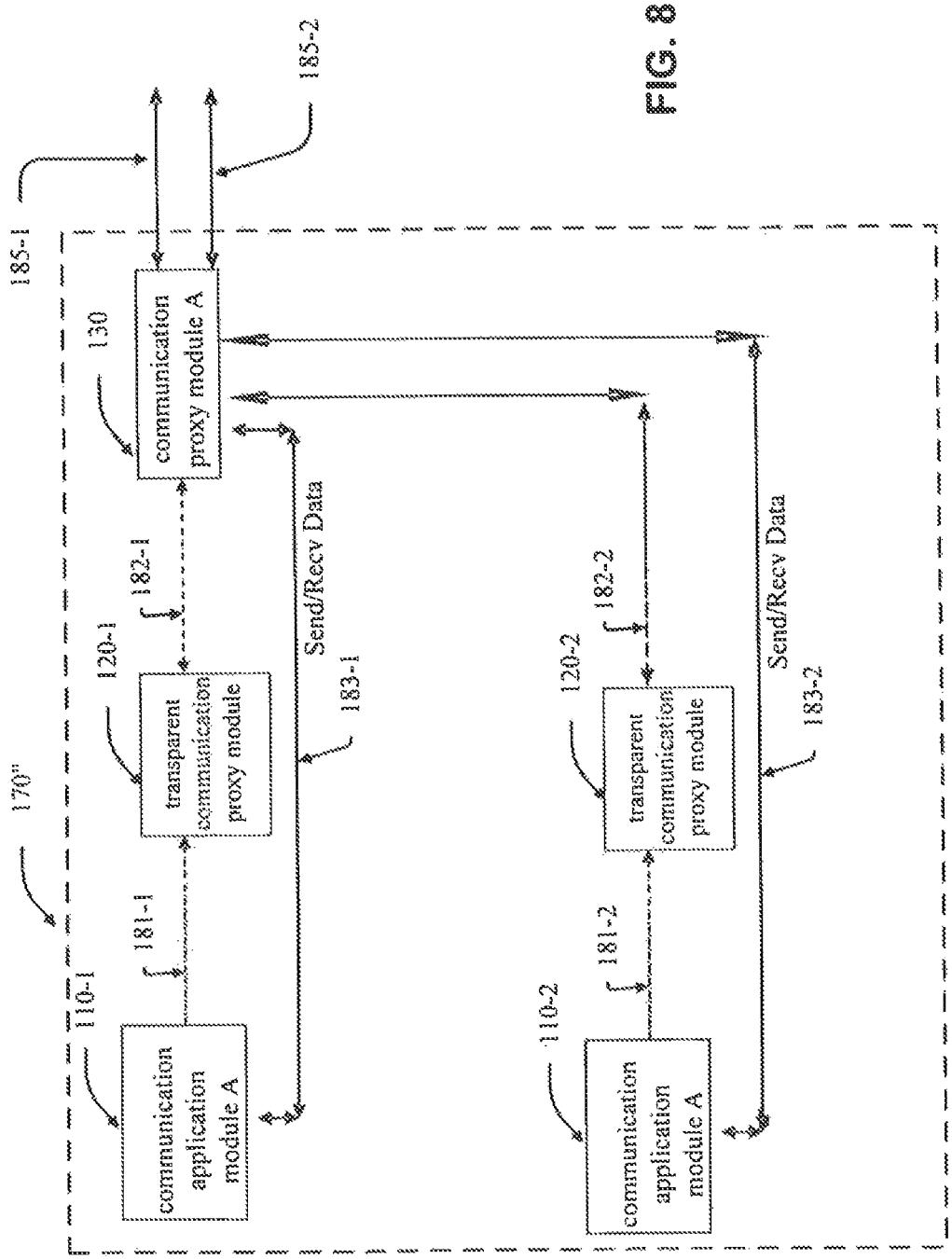
FIG. 8 is a conceptual block diagram illustrating another example of a communication apparatus having multiple originating modules in accordance with one aspect of the disclosure.

In accordance with one aspect of the disclosure, Event 3 described in Table 1 is described in further detail with reference to FIGS. 1 and 8. In this example, communication apparatus A 170" includes multiple communication application modules, multiple transparent communication proxy modules, and a single communication proxy module. In FIG. 8, communication application modules A 110-1 and 110-2 are connected to communication proxy module A 130, via communication channels 181-1 and 181-2, respectively, via transparent communication proxy modules 120-1 and 120-2, respectively, via communication channels 182-1 and 182-2, respectively, and also via communication channels 183-1 and 183-2, respectively. Communication proxy module A 130 may use separate communication channels 185-1 and 185-2, respectively, to communicate with communication proxy module B 150 (or 150-1 and 150-2, respectively, in another configuration). Thus, communication proxy module A 130 may utilize two separate ports to communicate with communication proxy module B 150 (or 150-1 and 150-2). While two communication application modules, two transparent communication proxy modules and one communication proxy module are shown, the subject technology is not limited to these and may include any number of communication application modules, any number of corresponding transparent communication proxy modules and any number of communication proxy modules.

Referring to FIGS. 1 and 5 through 8, in one aspect of the disclosure, if there are many local clients receiving the same data from a remote location (e.g., a single video from module 160 that is being viewed by multiple modules 110-1 and 110-2), then (i) that data can be sent just once from the remote location to at least one of the communication proxy modules on the client side (e.g., at least one of modules 130-1 or 130-2 in FIG. 7, or module 130 in FIG. 8), (ii) if there are multiple communication proxy modules (e.g., modules 130-1 and 130-2, as shown in FIG. 7), the communication proxy modules can obtain the data from each other, and (iii) the communication proxy module(s) can send that data to the communication application modules (e.g., modules 110-1 and 110-2). In another example, instead of using at least one of the communication proxy modules, an intermediary location that is not a communication proxy module can be used.

Similarly, in one aspect of the disclosure, if there are many local servers receiving the same data from a remote location (e.g., data from module 110 that is being viewed by multiple modules 160-1 and 160-2), then (i) that data can be sent just once from the remote location to at least one of the communication proxy modules on the server side (e.g., at least one of modules 150-1 or 150-2 in FIG. 5, or module 150 in FIG. 6), (ii) if there are multiple communication proxy modules (e.g., modules 150-1 and 150-2, as shown in FIG. 5), the communication proxy modules can obtain the data from each other, and (iii) the communication proxy module(s) can send that data on to the communication application modules (e.g., modules 160-1 and 160-2). In another example, instead of using at least one of the communication proxy modules, an intermediary location that is not a communication proxy module can be used.

FIGS. 5 through 8 are mere examples, and other configurations are also possible.

Referring back to FIG. 1, exemplary operating systems that are compatible with a communication apparatus (e.g., one or more computers in apparatus 170 and/or apparatus 180) include, but are not limited to, various versions and flavors of Windows Vista®, Windows XP®, Windows 2000 Server®, Windows Server 2003®, Windows NT®, Windows Me®, Windows 98®, Windows CEO, Windows XPe®, PocketPC®, Unix® systems, Wyse Thin Operating System (OS), and GNU/Linux®.

According to one aspect of the disclosure, one or more computers in communication apparatus A 170 may utilize, for example, any one of the following operating systems: a version of Wyse Thin OS, Linux®, Windows CEO (including Windows CEO 5.0 and Windows CEO 6.0), Windows XP®, Windows XPe®, or any other operating system. One or more computers in communication apparatus A 170 may use different classes of thin computing platforms, such as platforms that differ in their levels of scalability, flexibility, and expense. In another aspect, one or more computers in apparatus 170 may utilize any one or more of the operating systems described in the previous paragraph.

According to one aspect of the disclosure, one or more computers in communication apparatus B 180 may utilize, for example, any one of the following operating systems: a version of Windows XP®, (including Windows XPe with SP2 and Windows XP Professional with SP2), Windows Server 2003® (including Windows Server 2003® Standard Edition with SP1), or any other operating system. One or more computers in communication apparatus B 180 may run any one or more of the following: Microsoft® Terminal Services, Citrix® Presentation server, or Windows XP®. In one example, multiple sessions may not be supported natively in Windows XP®.

Further Functional Description According to Various Aspects of the Disclosure

According to one aspect of the disclosure, a reliable UDP-based protocol is provided with congestion control—one that maximizes bandwidth usage over networks with high latencies, which contains TCP-like reliability and in-order delivery.

In one aspect, when a network becomes congested (e.g., an increase in packet loss and/or an increase in round-trip time (RTT)), a configuration of the subject technology may adjust the bandwidth usage by decreasing the transfer rate of the streams, and/or optimizing a window size of the packets.

Referring back to FIG. 1, a communication apparatus 100 is described further in detail below.

In one aspect of the disclosure, communication application module B 160 (e.g., a session server) is housed proximate to communication proxy module B 150 so that the network delay between them is low (e.g., approximately 0 ms). Similarly, communication proxy module A 130 may be placed near communication application module A 110 so that the delay between them is also low (e.g., approximately 0 ms). In one aspect, it is advantage to place transparent communication proxy module 120 on the same computer as communication application module A 110. The delay between communication proxy modules 130 and 150 is large. In one example, the delay between communication proxy modules 130 and 150 may be similar to the delay experienced by a Long Fat Network (LFN) (i.e., a network with high bandwidth-delay product (BDP)). According to one aspect of the disclosure, modules 120, 130 and 150 can perform well when the delay between modules 110 and 160 (or the delay between modules 130 and 150) is approximately 250 ms, and packet loss over the communication channel is about 0.5%.

According to one aspect of the disclosure, an example of an operation of a communication apparatus is illustrated below as a process flow, while referring to FIG. 1

1. A non-accelerated connection (e.g., a TCP connection) is set up between communication application module A 110 and communication proxy module A 130 (at login), after interception of the connection by transparent communication proxy module 120.
2. Communication proxy module A 130 sets up a connection utilizing an accelerated protocol with communication proxy module B 150 (via a handshaking process). In one aspect, RTT/bandwidth can be determined in this step, and initial window size can be set accordingly.
3. Communication proxy module B 150 sets up a non-accelerated connection (e.g., a TCP connection) with communication application module B 160 (e.g., a RDP server).

4. Data stream transmission
   a. Communication application module A 110→Communication application module B 160
      i. Communication proxy module A 130 receives one or more data streams (e.g., TCP data) from communication application module A 110.
      ii. Communication proxy module A 130 performs forward error correction (FEC) on the one or more data streams (and maybe compression and/or encryption).
      iii. Communication proxy module A 130 sends the one or more data streams to communication proxy module B 150.
      iv. Communication proxy module B 150 recovers the one or more data streams through FEC (and decryption and/or decompression) and periodically acknowledges all data streams received/recovered.
      v. Communication proxy module B 150 sends the one or more data stream to communication application module B 160 (e.g., a RDP server).
   b. Communication application module B 160→Communication application module A 110
      i. Communication proxy module B 150 receives one or more data streams from communication application module B 160 (e.g., a RDP server) over a non-accelerated communication channel (e.g., 188; a TCP channel).
      ii. Communication proxy module B 150 performs forward error correction (FEC) on the one or more data streams (and maybe compression and/or encryption).
      iii. Communication proxy module B 150 forwards the one or more data streams to communication proxy module A 130 using a reliable accelerated protocol (e.g., a reliable UDP-based accelerated protocol).
      iv. Communication proxy module A 130 recovers the one or more data streams through FEC (and decryption and/or decompression) and periodically acknowledges all data streams received/recovered.
      v. Communication proxy module A 130 forwards the one or more data streams to communication application module A 110 over a non-accelerated communication channel (e.g., 183; a TCP channel).

In accordance with one aspect of the disclosure, communication of streams (e.g., data streams) in communication apparatus 100 of FIG. 1 is described, particularly, in connection with a forward error correction (FEC) scheme.

In one aspect, if communication proxy module B 150's send window is not full, communication proxy module B 150 may request for more data (e.g., by calling a routine such as the Windows Sockets Application Programming Interface (winsock) call, recv( ) and receive one or more data streams (e.g., RDP data) from communication application module B 160 (e.g., a session server). This can take advantage of any inherent bandwidth-adaptive features of module 160. The send window size may be dynamic, changing to adapt to various parameters such as network speed and congestion. A scheme same as the scheme described above can be applied to communication proxy module A 130 and communication application module A 110.

Due to high delay in sending data streams (and consequently high round-trip time (RTT)) between modules 110 and 160 (or between modules 130 and 150), some forward error correction (FEC) scheme is implemented. This reduces the amount of data streams that needs to be resent from module 150 or 130. The FEC scheme employed can be an algorithm involving XOR operation on the data packets, or may employ other FEC schemes known in the art.

According to one aspect of the disclosure, an example of a communication operation utilizing an FEC scheme with XOR is presented below as a process flow, while referring to FIG. 1:

1. Assume that a sender (e.g., module 130) has initiated communication with a receiver (e.g., module 150). In sending packets by a receiver over a communication channel utilizing an accelerated protocol, "n" continuous packets and every mth packets till k (n, m, k may be determined as a function of packet loss and RTT) can be XORed together by the receiver, and the XOR value can be sent in a packet immediately following its corresponding packets by the receiver. The size of the XOR windows may be represented as n=V_W_x, k=D_X_x and m=H_W_x.
2. A receiver may set the initial size of the XOR windows to a pre-determined value or may determine or select the initial size of the XOR windows based on some parameters.
3. The value of V_W_x, D_X_x and H_W_x can be changed by a receiver periodically and/or in response to changing (or measured) network characteristics-primarily based on measured packet-loss on the network. When this happens, XOR_CONTROL packet can be sent by a receiver if old values are less then new calculated values for any of V_W_x, D_X_x or H_W_x. On receiving new window sizes, a receiver can adjust itself to the new window sizes and send these new sizes in the ACKS (acknowledgements). In one aspect, a sender (e.g., module 130) does not change the window sizes until it receives ACK from a receiver (e.g., module 150). After receiving ACK, a sender may continuously send new window sizes.

One example of an implementation according to one aspect of the disclosure:

Vertical XOR: There is a buffer of MTU size which can be used to store XOR packet of last V_W_x packets.

Horizontal XOR: There is a list of MTU size buffers which can be used to calculate XOR of its corresponding data packets.

Receiver (e.g., module 150 or 130): On receiving any XOR packet, a receiver can check whether the packet is expired or not based on current expected sequence number. If expected sequence number is greater than the sequence numbers of packets available in XOR packet, the receiver can ignore it; otherwise, the receiver can store it until the time above condition holds true.

4. Each XOR packet contains the V_W_x or H_W_x and D_W_x so that a sender can determine how many packets this XOR packet has and what these packets are.
5. If the XOR packet is missing, but all other packets have arrived, then the sender does nothing further on it.
6. If one of the other packets in the XOR group is missing, a sender uses the XOR value to recover this packet by XORing this with the packets that were received, and the sender determines the number of bits in the lost packet by subtracting bytes received from the current cumulative byte value for this XOR group, which is included in the XOR packet. Accordingly, in one aspect, an XOR packet includes the cumulative byte value for the XOR group associated with the XOR packet. Stated in another way, an XOR packet may include the total number of bytes (or the total amount of information) sent from a sender, such as module 130 or 150, for the corresponding XOR group.

7. If more than one packet in the XOR group is missing, then the receiver can resend all missing packets.
8. When the subsequent ACK is sent by a receiver, the receiver can also acknowledge packets that were recovered through FEC.

After step 8 described above, the sender (e.g., module 130) has the data streams received over a communication channel utilizing an accelerated protocol. In one aspect, an accelerated protocol may have features such as reliability, in-order delivery, and congestion control. An accelerated protocol may also make an efficient use of the network bandwidth.

According to one aspect of the disclosure, an example of a communication operation utilizing a handshake is presented below as a process flow, while referring to FIG. 1. In one aspect, a connection between a sender (e.g., module 130) and a receiver (e.g., module 150) may be set up as follows:

1. A connection can be initiated by a sender (e.g., module 130) which sends a SYN (synchronization) request to a receiver (e.g., module 150). The SYN request may contain, for example, the expected sequence number of the first packet that will be sent from the sender, authentication code for hole punching, and the IP address and port number of a destination (e.g., module 160; a TCP server).
2. The receiver (e.g., module 150) may respond with a SYN-ACK (synchronization-acknowledgement), at which point the sender (e.g., module 130) can measure RTT and set the initial send window size, W, based on RTT and bandwidth L (L can be a fixed value or can be determined or changed dynamically based on, for example, measured values). The SYN-ACK may contain the expected sequence number of the first packet that will be sent from the receiver (e.g., module 150), the initial size of the XOR windows, $V\_W\_x$, $H\_W\_x$, $D\_W\_x$, a new port number to be used for communication between the sender and receiver, and a bandwidth L.
   In another configuration, the sender and receiver may determine their own $V\_W\_x$, $H\_W\_x$, and $D\_W\_x$ values, and they each may have slightly different values for these.
3. The receiver (e.g., module 150) can start sending "hole-punching" packets immediately after sending a SYN-ACK.
4. If the SYN or the SYN-ACK is lost, the sender (e.g., module 130) can resend the SYN after a time-out, and the previous SYN can be treated as obsolete.
5. Once the SYN-ACK has been received, the sender (e.g., module 130) can begin transmitting "hole-punching" packets, which can contain the measured value of RTT. The sender can send a series of data packets in a window of size W, where W is a function of the available bandwidth L, and the round-trip time (RTT), and where $W=L \times RTT$. In general, the window size is, for example, as large as possible.

In one aspect, hole punching is a method for establishing bidirectional UDP connections between Internet hosts in networks using network address translation (NAT). For example, assume A and B are the two hosts, each in its own private network, N1 and N2 are the two NAT devices, and S is a public server with a well-known globally reachable IP address. A and B each can begin a UDP conversation with S, and the NAT devices N1 and N2 create UDP translation states and assign temporary external port numbers. S can then relay these port numbers back to A and B. A and B can contact each others' NAT devices directly on the translated ports, and the NAT devices can use the previously created translation states and send the packets to A and B.

According to another aspect of the disclosure, an example of a communication operation utilizing a handshake is presented below, while referring to FIG. 1. In one aspect, an example of an implementation of handshake may be described as follows.

1. To start a connection, a sender (e.g., module 130) can send a SYN packet to a receiver (e.g., module 150) with its sequence number as 0, and the IP address and the port number of the destination (e.g., module 160; a TCP server).
2. On receiving the SYN packet, the receiver (e.g., module 150) can create a new connection socket and send a SYN_ACK packet. The SYN_ACK packet may contain a sequence number that is the same as the sequence number of the SYN packet, XOR window sizes, a new port number of the newly created connection socket for communication with the sender and the bandwidth L.
3. After sending a SYN_ACK packet, the receiver may start sending to the sender hole-punching (HOL_PUN) packets from this new connection socket having the new port number.
4. If the sender (e.g., module 130) does not receive a SYN_ACK packet within pre-configured time (determined based on selection, experimentation or other methods), the sender can send a new SYN packet with a different sequence number. If the sender receives a SYN_ACK packet of the previous SYN packet after sending a new SYN packet, the sender may simply discard this SYN_ACK packet.
5. After receiving a proper SYN_ACK packet, the sender may calculate initial RTT value and may start sending hole-punching (HOL_PUN) packets to the receiver on the new port (received in the SYN_ACK packet) with calculated RTT value.

According to one aspect of the disclosure, the receiver and sender (e.g., modules 150 and 130) can continue to send these hole-punching packets until both ends receive these packets. In one aspect, to check for this condition, a "reserved" portion of a packet can be used as follow: initially all the bits are set to zero, and say 4th bit is the receiver's receive bit and $0^{th}$ bit is sender's receive bit. Whenever the sender (e.g., module 130) receives data from the receiver (e.g., module 150), the sender can make $0^{th}$ bit as 1 and send it to the receiver. When the receiver receives data, the receiver can make its bit as 1. Once the receiver receives $0^{th}$ bit as 1, the receiver can connect to a destination module (e.g., module 160; a TCP server), and when the sender receives 4th bit as 1, the sender can start sending data.

According to one aspect of the disclosure, an approach for estimating the bandwidth L and RTT is described, while referring to FIG. 1. The bandwidth L may be sometimes referred to as an available bandwidth or a link capacity.

To estimate RTT, every RTT_timeout seconds (determined based on selection, experimentation, or other methods) a data packet can be sent with packet type "RTT." A receiver (e.g., module 150), upon receiving such a packet, can respond immediately with an acknowledgement with packet type set as "RTT response." This acknowledgement may contain the sequence number of the RTT packet in the data region, in addition to the acknowledgement information contained in a standard acknowledgement. This RTT measurement can be stored in a running queue of length "n" (determined based on selection, experimentation, or other methods), and the current estimate of RTT is, for example, equal to the average of the values in this queue. In another aspect, the current RTT estimate may be determined, for example, by a "gradient descent" method using a function such as: RTT=a*RTT_old+ (1−a)*RTT_currentMeasured.

Figure 9:
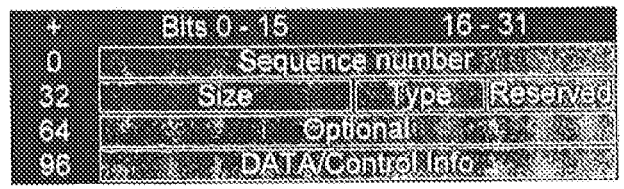
FIG. 9 illustrates an example of a structure of a packet in accordance with one aspect of the disclosure.

FIG. 9 illustrates an example of a structure of a packet according to one aspect of the disclosure.

In one aspect, a packet may have an arbitrary size, rather than a fixed size. In another aspect, all packets are of arbitrary (non-constant) size. Referring to FIG. 9, a packet utilizing an accelerated protocol of the subject technology may include some or all of the following portions according to one aspect of the disclosure:

Bits 0-31 may be the 32-bit sequence number, which is used to represent the order in which the packets are sent.

Bits 32-47 may be the packet size, which comprises the total number of bytes contained in the current packet sent from a sender (e.g., module 130 or 150 in FIG. 1).

Bits 48-55 may indicate the type of packet. In one example, packet types may include: data, handshake (while setting up a connection), ACK, ACK2, keep-alive, XOR packet, packet-pair (for measuring the bandwidth L), RTT, RTT-response, and shutdown (to close the connection). In one aspect, packet types may be categorized into the following: data and communication control. The communication control may comprise a packet type for communication connection (e.g., handshake, ACK, ACK2, keep-alive, shutdown), a packet type for packet loss recovery (e.g., XOR packet), and a packet type for network condition (e.g., packet-pair, RTT, RTT-response).

In another example, the packet types may include the following: data, ACK, SYN, SYN-ACK, keep-alive, XOR packet, packet-pair, RTT, RTT-ACK, shutdown, UDP-HOL (UDP hole-punching), debug-stats, and silent-RTT. A packet type for connection establishment may include, for example, SYN or SYN-ACK. A packet type for packet loss recovery may include, for example, XOR packet. A packet type for round-trip time (RTT) measurement may include, for example, RTT or RTT-ACK. RTT-ACK may be sometimes referred to as RTT-response and vice versa.

Bits 56-63 may be reserved bits for customizability/more functionality. One or more reserved bits may, for example, store additional information related to the type of packet.

Bits 64-95 may be optional bits and may be used to store additional information. The additional information may be, for example, information related to the packet type and/or information on measured network conditions. The information on measured network conditions may, for example, include (i) information, reported back by the receiver to the sender, about the recovered packet loss statistics (e.g., lost packets that are recovered by the receiver) and/or (ii) for an RTT-ACK packet, the sequence number of the RTT packet that the RTT-ACK is responding to.

Bits 96-end may contain either the data being sent, or control information such as the XOR value of the preceding "n" packets, if type is XOR packet, or the sequence numbers of acknowledged packets if it is an ACK packet, or other control information.

In one aspect, a header portion of a packet (e.g., a packet sent or received between modules 130 and 150 in FIG. 1) may include information located between bit 0 through bit 95 and any control information located between bit 96 and the last bit. A packet structure described above shows illustrative examples, and the subject technology is not limited to these examples. In one aspect, a header portion of a packet may include any additional field(s) that contain more information, which may be related to the packet type or other information.

In one aspect, the total size (or the total number of bits) for the header portion is not limited to the size shown above. In one example, the total size of the header (e.g., a header portion of a packet) may be even smaller than the size shown above. This may be accomplished, for example, by eliminating or reducing the size of one or more fields in the header, and using this reduced-size header to achieve similar functionality. Such modifications would be apparent to those skilled in the art.

In one aspect of the disclosure, a first communication proxy module (e.g., module 130 in FIG. 1) may receive one or more streams (e.g., data streams or connection requests) from, for example, communication application module A 110 or transparent communication proxy module 120, generate one or more header portions, and send the one or more streams, including the one or more header portions, to a second communication proxy module (e.g., module 150). Each of the one or more header portions may include, for example, some or all of the following header information: (i) a packet sequence identifier, (ii) a packet size, (iii) a packet type identifier, (iv) control information, and (v) any other information. The header information may be added to a stream. A stream may be encapsulated in a packet, which has the header information. In one aspect, module 130 may generate header information for data streams as well as header information for connection requests. Header information for a data stream may be appended to the data stream, and header information for a connection request may be appended to the connection request.

In another aspect of the disclosure, a first communication proxy module (e.g., module 150 in FIG. 1) may receive one or more streams (e.g., data streams) from, for example, communication application module B 160, generate one or more header portions, and send the one or more streams, including the one or more header portions, to a second communication proxy module (e.g., module 130). Each of the one or more header portions may include, for example, some or all of the following header information: (i) a packet sequence identifier, (ii) a packet size, (iii) a packet type identifier, (iv) control information, and (v) any other information. The header information may be added to a stream. A stream may be encapsulated in a packet, which has the header information. In one aspect, module 150 may generate header information for data streams as well as header information for connection requests. Header information for a data stream may be appended to the data stream, and header information for a connection request may be appended to the connection request.

Referring to FIGS. 1 and 9, in one aspect of the disclosure, module 130 may receive, utilizing a first protocol, a stream in a format utilizing the first protocol. Module 130 may add first header information, and then add second header information to form a packet in a format utilizing a second protocol, and then facilitate sending the packet to module 150 utilizing the second protocol.

In one aspect, each of the first protocol and the second protocol is a first transmission protocol and a second transmission protocol, respectively. In one aspect, the first protocol is different from the second protocol. In one aspect, the first header information may include one or more of the header information described above with reference to FIG. 9. In one example, the first protocol is TCP, and the second protocol is UDP. In one aspect, module 130 does not modify the stream itself (e.g., a TCP stream) in that it does not eliminate any portion of the stream, but adds header information to the stream. In one aspect, the first protocol may be a non-accelerated protocol, and the second protocol including the first and second header information may be an accelerated protocol.

In one example, module 130 may receive a TCP stream utilizing TCP (e.g., via 181 and 182 or via 183), add header information (including one or more of the header information described above), and add UDP header information to form a UDP packet (or a packet that conforms to UDP), and then facilitate sending the packet to module 150 utilizing UDP (e.g., via 185, 140 and 186). The UDP header information may, for example, include one or more of the following: a source port, a destination port, and the length of a packet.

In one aspect, the descriptions provided in the last three paragraphs with reference to modules 130 and 150 may apply mutatis mutandis to modules 150 and 130, respectively, as if the following replacements were made: 130 with 150; 150 with 130; and 181, 182, 183 with 188.

According to one aspect of the disclosure, an example of reliability control is described below, while referring to FIG. 1.

In one aspect, to ensure that all packets that are sent arrive at a receiver (e.g., module 130 or 150), a timer-based selective acknowledgement (SACK) scheme may be employed. This scheme may be enforced periodically.

In one aspect, the format of a portion of an acknowledgement (showing SEQ# and data portions of a header) may be:

```
SEQ#|0|1|1|0|1|1|1|1|0|1...
 5      6 7 8 9 ...
```

Where SEQ# is the sequence number of the data packet up to which all packets have been received (including SEQ#). The bits following the sequence number each contains a 0 or a 1 depending on whether the corresponding packet (subsequent to SEQ#) has been received/recovered or not by a receiver (e.g., module 130 or 150). In one aspect, the last bit may be a 1 and represents the highest packet sequence number thus far received by the receiver. In another example, the last bit is always a 1. Since data is sent by byte, this last byte may contain some slack bits that are all 0, which may be interpreted correctly as "this data has not been received."

In one aspect, an acknowledgement (ACK) includes a full header (rather than just the SEQ# and data portions described above). For example, an ACK includes "ACK" as the packet type identifier, and the reserved field may be empty.

In one aspect, an acknowledgement (ACK) may be stored in the control information bits (e.g., bit 96 and thereafter) in the header of the packet, with the base sequence number stored in the "sequence number" portion of the header (bits 0-31), and the packet type field (bits 48-55) indicating that it is an acknowledgement packet. The ACKs may be sent periodically, at some pre-determined value for the period (e.g., as a function of BDP so that the number of packets being acknowledged is approximately constant).

In one aspect, packet loss statistics may be included in the header of a packet, for example, in the optional bits:

```
...
| SEQ #                  |
| Packet Size | Type | Resvd |
|          PL%           |
| 0 | 1 | 1 | 0 | | 1 | 1 | ... |
| ...                    |
```

In addition, in one aspect, to ensure reliability, all unacknowledged packets are buffered at the sender (e.g., module 130 or 150) so that they may be resent, if necessary.

According to one aspect of the disclosure, an example of in-order delivery is described below, while referring to FIG. 1.

In one aspect, all packets received at accelerator modules (e.g., module 130 or 150) are put into order before they are forwarded to an application module (e.g., module 110 or 160, respectively). Accordingly, all out-of-order packets are buffered at the receiver (e.g., module 130 or 150) until the packet sequence can be put into order (when the required packet(s) arrive).

According to one aspect of the disclosure, an example of memory management is described below, while referring to FIG. 1.

In one aspect, due to the reliability and in-order delivery requirements, an efficient memory management scheme is employed to handle the send and receive buffers in a sender and a receiver (e.g., module 130 or 150).

Sender Scheme

In one aspect, a structure referred to as the "send queue" (which may be sometimes referred to as a priority queue) can be utilized. A send queue in a sender (e.g., module 130 or 150) can be a linked list queue that contains pointers to the packets that have been sent, in order of sending time, along with the timestamp of the packet. The actual packets can be stored in a circular buffer of size W (which is a window size). Every time the buffer becomes full (which may happen when W is increased), the buffer can be copied into a new buffer of size W_new. In another example, the buffer size may be 2 W or another size.

According to one aspect, an example of an operation of memory management is described below as a process flow, while referring to FIG. 1:

1. A program timer of a sender (e.g., module 130 or 150) is initialized when the first packet is sent.
2. When a packet is sent, it is placed onto a send queue of the sender along with its timestamp.
3. If an acknowledgement is received by the sender, the corresponding queue node is deleted (by clearing it and appending the empty node to the back of the queue).
4. When the packet at the front of the send queue "times out" (time since sent>RTT), the packet is resent by the sender, and the node is placed at the back of the send queue with the new timestamp.
5. If the send queue is full, a new node is created.
6. If the byte counter value of the latest packet sent is greater than the byte counter value of the earliest unacknowledged packet by more than W, then no new packets are sent by the sender (e.g., recv( ) is not called).
7. Additionally, a hashtable may be used to index nodes in the send queue to facilitate quick lookup.
8. The send queue may be singly-linked, or doubly-linked.

According to one aspect, an example of a possible scenario is illustrated below.

Packets 1-7 are sent:

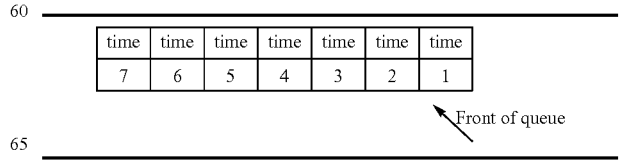

Front of queue

When the front node of the queue times out, the corresponding packet is resent:

| time | time | time | time | time | time | time |
|------|------|------|------|------|------|------|
| 1    | 7    | 6    | 5    | 4    | 3    | 2    |

↖ Front of queue

Now say the following acknowledgement arrives:
|2||0|1|0|0|1|
This means that all packets up to and including seq#2 have been received, and packets 4 and 7 have also been received.
The queue is now updated to:

|  |  |  | time | time | time |
|--|--|--|------|------|------|
|  |  |  | 6    | 5    | 3    |

↖ Front of queue

And now, since the send window has cleared up a bit, more data is sent to fill the window:

|  | time | time | time | time | time | time |
|--|------|------|------|------|------|------|
|  | 10   | 9    | 8    | 6    | 5    | 3    |

↖ Front of queue

Note that the number of packets in the window at any time does not have to be constant since the packet size is arbitrary, and in one example, only the window size (in bytes) at any particular instant in time is fixed.
In addition, note that when a new node is created as described above, then another node (e.g., node for seq-8) may be added, as shown below.

| time(8) | time(7) | time(6) | time(5) | time(4) | time(3) | time(2) | time(1) |
|---------|---------|---------|---------|---------|---------|---------|---------|
| 8       | 7       | 6       | 5       | 4       | 3       | 2       | 1       |

↖ Front of queue

In the above example, each of time(8), time(7), time(6), time(5), time(4), time(3), time(2), and time(1) represents the time at which a particular packet is received, and 8, 7, 6, 5, 4, 3, 2, and 1 represent the sequence numbers of the packets.

Receiver Scheme

In one aspect, a receiver (e.g., module 130 or 150) may use two structures—(i) a receive buffer into which packets can be received, and (ii) a hash table to index these packets. In one example, a buffer is a wrap-around buffer of size 2W (to provide some slack space). Since packets are not guaranteed to arrive in order, buffer fragmentation becomes an issue. To optimize buffer usage, it can be defragmented when it is nearing capacity. To make this process efficient, a buffer in a receiver can make use of headers for each packet stored in the buffer. The header can indicate whether the "slot" is occupied or not, and can also contain packet size of the contained packet. If the buffer reaches capacity (e.g., when the amount of space left is about 1 MTU (maximum transfer unit—the largest possible size for a packet)), then it can be defragmented to free up space. If, after defragmentation, the buffer is still at capacity, then its size can be doubled.

Figure 10:
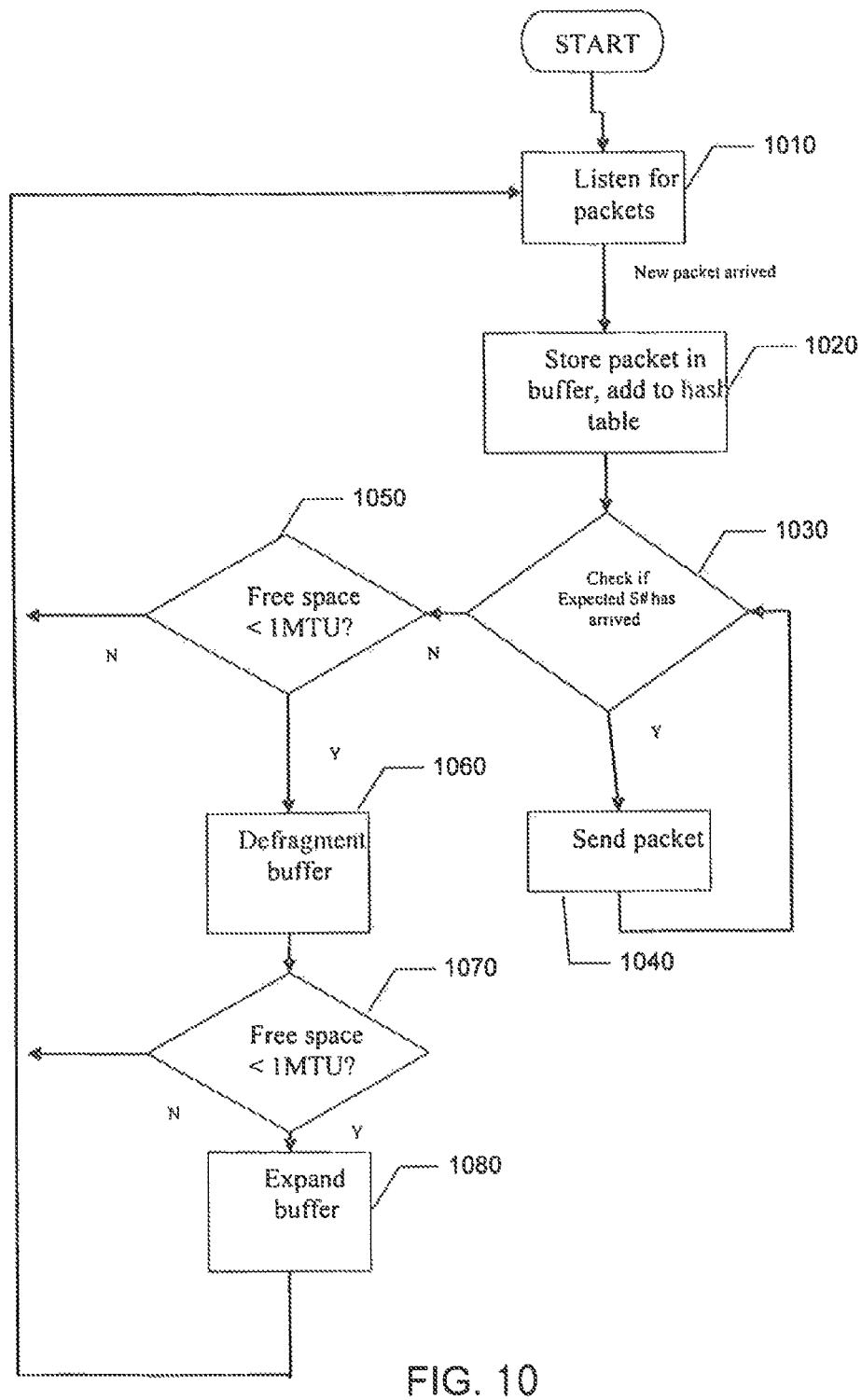
FIG. 10 is a flow chart illustrating an example of an operation of memory management in accordance with one aspect of the disclosure.

According to one aspect of the disclosure, an example of an operation of memory management at a receiver (e.g., module 130 or 150) is described in detail below, while referring to FIGS. 1 and 10.

1. A receiver (e.g., module 130 or 150) monitors packets. (see block 1010) When a packet arrives at the receiver, it is maintained in a buffer of the receiver if it has not already been received, and an entry is made in the receiver's hash table containing a pointer to the packet in the buffer. (see block 1020)
2. The hash table is now checked by the receiver to see if the expected packet has arrived. (see block 1030)
3. If so, then it is sent over a non-accelerated communication channel (e.g., channel 183 or 188, respectively; a channel utilizing TCP) to a destination (e.g., module 110 or 160, respectively). (see block 1040) Then steps (2) and (3) are repeated until the expected packet is not found in the hash table.
4. When the receiver's buffer has less than 1 MTU space left at the end, the buffer is defragmented as described in "buffer defragmentation" below. (see blocks 1050 and 1060). If, after defragmentation, the buffer still has less than 1 MTU (see block 1070), then a new buffer is allocated with, for example, twice the space (see block 1080), and the receiver's entire buffer is copied into the new space.

According to one aspect of the disclosure, an example of an operation of buffer defragmentation at a receiver (e.g., module 130 or 150) is described in detail below, while referring to FIGS. 1 and 11.

Figure 11:
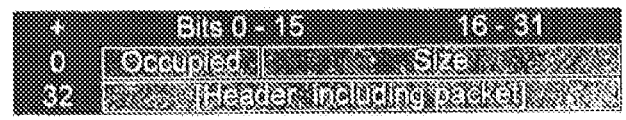
FIG. 11 illustrates an example of a structure of a receive buffer header in accordance with one aspect of the disclosure.

In one aspect, every packet in the receive buffer can be contained inside a "receive buffer header," which may have the format shown in FIG. 11. A receive buffer header may include bits for "occupied", bits for "size," and bits for a "header" including a packet. The bits for "occupied" may be used to indicate whether the block is occupied or not.

Referring to FIGS. 1 and 11, in one aspect, an example of an operation of buffer defragmentation may be performed by a receiver (e.g., module 130 or 150) as follows:

1. The buffer start and end pointers are set to the beginning and end of the allocated buffer, respectively.
2. Sequentially check the receive buffer headers until the first unoccupied slot is found.
3. Sequentially check the receive buffer headers from this point on until the first occupied slot is found.
4. The entire region from this occupied slot until the end of the buffer is copied to the strut of this "hole" (first unoccupied slot found in part (2).
5. This process is repeated from step (2) until 1 MTU is freed.

Figure 12:
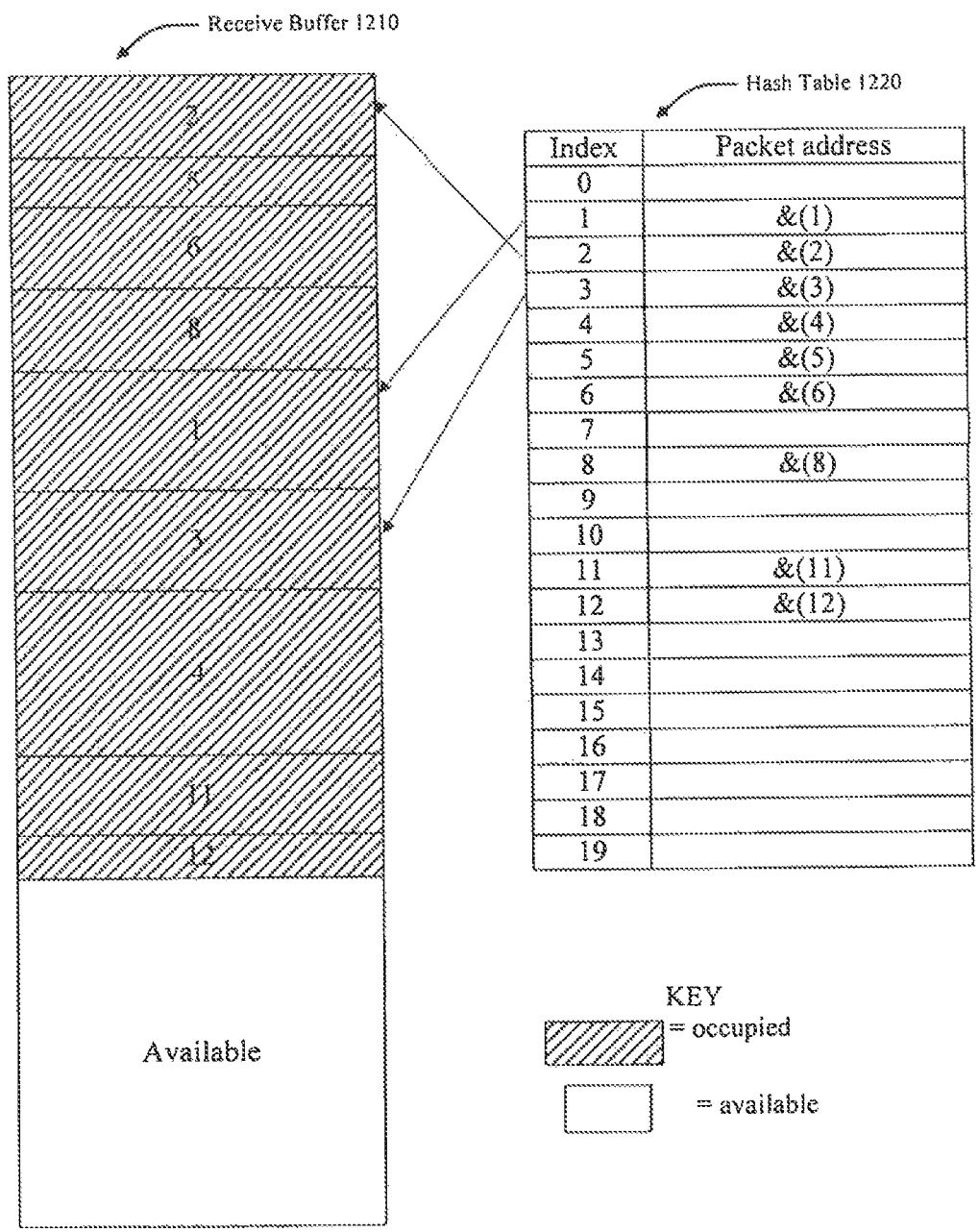
FIGS. 12 and 13 illustrate an example of an operation of a communication apparatus utilizing a receive buffer and a hash table according to one aspect of the disclosure.
Figure 13:
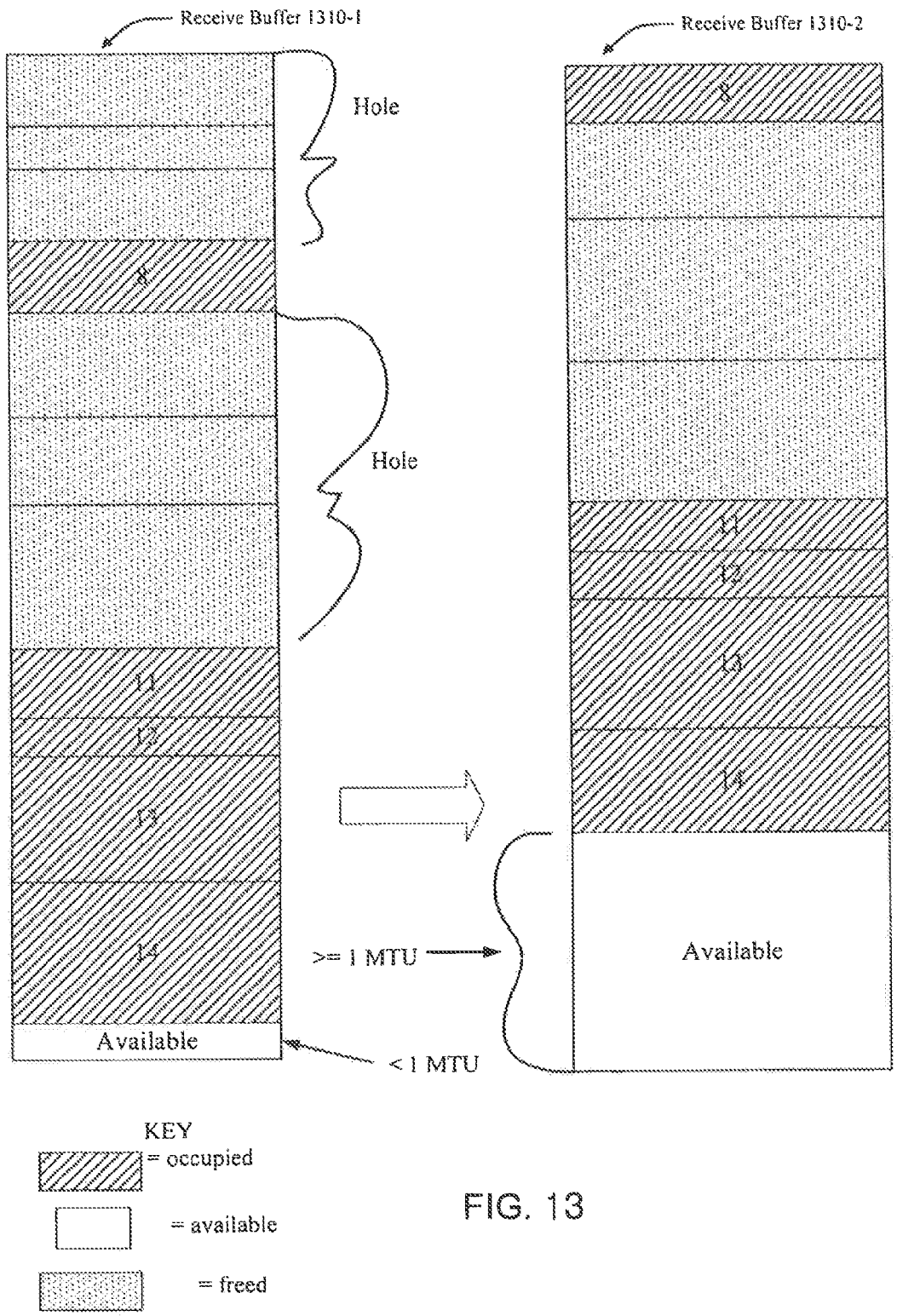

FIGS. 12 and 13 illustrate an example of an operation of a communication apparatus utilizing a receive buffer and a hash table at a receiver according to one aspect of the disclosure. In one aspect, a receiver (e.g., module 130 or 150 of FIG. 1) may perform instructions on a receive buffer and a hash table. In one example, a computer may contain a machine-readable medium (e.g., one or more internal or external memories), which includes module 130 and its receive buffer and hash table. In another example, a computer may contain a machine-readable medium (e.g., one or more internal or external memories), which includes module 150 and its receive buffer and hash table. Module 130 may include instructions for utilizing its receive buffer and hash table.

Module 150 may include instructions for utilizing its receive buffer and hash table.

FIG. 12 illustrates an example of a receive buffer and a hash table of a receiver, where a receiver (e.g., module 130 or 15) has received and stored packet numbers 2, 5, 6, 8, 1, 3, 4, 11, and 12. A receiver (or a computer of a receiver) includes a receive buffer 1210 and a hash table 1220 in a machine-readable medium. Receive buffer 1210 stores packet numbers 2, 5, 6, 8, 1, 3, 4, 11, and 12, and Hash table 1220 stores the addresses where the packets are stored in receive buffer 1210.

As illustrated in FIG. 13, when packet number 0 arrives, packet numbers 0-7 are cleared immediately. When more packets arrive and the amount of space at the end of the buffer is less than 1 MTU, the allocated memory is defragmented, as shown in FIG. 13.

According to one aspect of the disclosure, an example of an operation of congestion control is described in detail below.

One approach for congestion control is to increase the window size I transmission rate until transmission reaches the available bandwidth L, by using a function in which W is proportional to $(L-\exp(-t))$. L may be a link capacity measured by bits/second. In one aspect, congestion control may be carried out by determining a window size as a function of RTT and L.

Another approach for congestion control is an "additive increase, multiplicative decrease" scheme. In this scheme, the window size is increased by some fraction of the number of bytes that are acknowledged in each acknowledgement ("additive increase"). When measured packet loss reaches a certain threshold value (e.g., 1%), the window size is reduced to a fraction of itself, e.g., 75% ("multiplicative decrease"). The measured packet loss may take into consideration not only the packets that are lost and retransmitted from a local communication proxy module, but also the packets that are lost but recovered at a remote communication proxy module through FEC. In this way, a "true" network packet loss can be measured, and not just packets that are lost and not recovered.

According to one aspect of the disclosure, an example of an operation of a transparent communication proxy module is described in further detail below, while referring to FIG. 1.

In one aspect, a transparent communication proxy module (e.g., module 120) may be implemented as a layered service provider Winsock interface. This interface can be loaded with any Winsock based application. Whenever a Winsock routine (or function) is called, the routine is first dispatched to this interface and then this interface transfers it to other layers of Winsock.

As one example of an implementation, transparent communication proxy module 120 of FIG. 1 may intercept connect( ) calls of Winstock-based applications from communication application module A 110 and determine whether the port of this new outgoing connection needs to be accelerated or not. If the connection is to be accelerated, then module 120 may create a new socket and connect the socket to communication proxy module A 130. If a connection between communication proxy module A 130 and communication proxy module B 150 is successful, then the IP address and the port number of an outgoing connection may be changed to communication proxy module A 130. Finally, the connect call can be forwarded to other Winsock layers (as usual in Winsock-based applications) to complete the connection process.

According to one aspect of the disclosure, an example of an operation of a communication proxy module is described in further detail below, while referring to FIG. 1.

As one example of an implementation, communication proxy module A 130 (module 130) may listen on a pre-configured TCP port. When (or whenever) transparent communication proxy module 120 finds any connection request for communication which needs to be accelerated, module 120 forwards that connection request to module 130 on this port. On receiving the connect request, module 130 initiates a handshake with corresponding proxy module (e.g., communication proxy module B 150) and sets up a communication channel that utilizes an accelerated protocol, and creates a new thread for data communication on this session.

According to one aspect of the disclosure, if data can be parsed at a communication proxy module (e.g., module 130 or 150), the communication proxy module may determine the type of data (e.g., bitmap, audio, video), and the communication proxy module may assign priorities (e.g., transmission priorities specifying when to transmit the data) to the data based on its type determined by the communication proxy module. In addition, the communication proxy module may use different data processing techniques or sending schemes for different types of data (e.g., less focus on error-correction/recovery for streaming data such as video; different types of compression depending on the type of data).

The references listed below are hereby incorporated by reference in their entirety for all purposes:

UDT:
  Yunhong Gu and Robert L. Grossman, "UDT: UDP-based Data Transfer for High-Speed Wide Area Networks," National Center for Data Mining, University of Illinois at Chicago Hole punching:

http://en.wikipedia.org/wiki/UDP_hole_punching
http://www.brynosaurus.com/pub/net/p2pnat/
LSP:

http://en.wikipedia.org/wiki/Layered_Service_Provider
http://www.microsoft.com/msj/0599/LayeredService/LayeredService.aspx Referring to FIGS. 1 and 5 through 8, in one aspect, the terms "local" and "remote" are relative terms. For example, any of the modules or components (e.g., 170A, 170B, 110, 120, 130, 181, 182 or 183 in FIG. 1 or items in FIGS. 7 and 8) in apparatus 170, 170' or 170" (e.g., on a client side) may be considered as (i) local modules or local components or (ii) remote modules or remote components, depending on whether the modules or components are described from the perspective of apparatus 170, 170' or 170" (e.g., a client side) or from the perspective of apparatus 180, 180' or 180" (e.g., a server side), respectively.

Similarly, any of the modules or components (e.g., 180A, 180B, 160, 150 or 188 in FIG. 1 or items in FIGS. 5 and 6) in apparatus 180, 180' or 180" (e.g., on a server side) may be considered as (i) local modules or local components or (ii) remote modules or remote components, depending on whether the modules or components are described from the perspective of apparatus 180, 180' or 180" (e.g., a server side) or from the perspective of apparatus 170, 170' or 170" (e.g., a client side), respectively.

Furthermore, an application may be a local application or a remote application, depending on whether the application is described from the perspective of apparatus 170, 170' or 170" (e.g., a client side) or from the perspective of apparatus 180, 180' or 180" (e.g., a server side).

By way of illustration and not limitation, a communication channel for remote communication (e.g., 140, 185, 186, 189) between remote components or modules may include wired or wireless communication networks and may have any geographic reach (e.g., a personal area network, a local area network, a wide area network, the Internet, or an intranet). A communication channel for remote communication may use the internet protocol (IP) packet format or any other format for data communication. A communication channel for remote communication may comprise one or more heterogeneous networks communicating on different physical media, and may be managed by one or more network operators. In one example, a communication channel for remote communication may be a wireless wide area network comprising a cellular telephony network.

Communication apparatus A 170 may connect to communication apparatus B 180 remotely over a communication channel (e.g., 140, 185, 186, 189), for example, via a modem connection, a LAN connection including the Ethernet or a broadband WAN connection including DSL, Cable, T1, T3, Fiber Optics, Wi-Fi or other network connection. A communication channel for remote communication may include, for example, one or more routers for routing data between apparatus 170 and 180. A remote device (e.g., a component in apparatus 180 from the perspective of apparatus 170 or a component in apparatus 170 from the perspective of apparatus 180) on a network may be addressed, for example, by a corresponding network address, such as, but not limited to, an Internal protocol (IP) address, an Internet name, a Windows Internet name service (WINS) name, a domain name or other system name.

By way of illustration and not limitation, a communication channel for local communication (e.g., 181 or 182 from the perspective of apparatus 170; 188 from the perspective of apparatus 180) between local components or modules may be a wired or wireless short range communication network or connection such as one of the family of Institute of Electrical and Electronics Engineers (IEEE) 802.x communication networks, a Bluetooth network, a universal serial bus (USB) connection, a near-field communication (NFC) network, a FireWire connection, or another type of short range connection or network (including a direct connection). In one example, a communication channel for local communication may be a connection or network within a distance of 1 foot, 5 feet, 10 feet, 15 feet, 20 feet, 50 feet or 100 feet (e.g., modules 120 and 130 are located within 1 foot, 5 feet, 10 feet, 15 feet, 20 feet, 50 feet or 100 feet of each other).

In one aspect of the disclosure, the term "communication channel" may sometimes be referred to as a connection, a socket connection, a connection channel, a channel, a network or vice versa. In one aspect, a communication channel may include one or more communication channels (in parallel or in series). In one aspect, a communication channel may refer to a communication path. A communication path may include a wired path, a wireless path, or a combination of both. A communication path may include one or more components, one or more devices and/or one or more networks. For example, in FIG. 1, a communication channel between modules 110 and 160 may include an accelerated communication path that includes components 183, 130, 185, 140, 186, 150 and 188. In another example, a communication channel between modules 110 and 160 may include a non-accelerated communication path that includes channel 189.

In one aspect of the disclosure, a stream transfer rate of an accelerated communication path may be higher than a stream transfer rate of a non-accelerated communication path. In one example, data streams utilizing an accelerated communication path (e.g., components 183, 130, 185, 140, 186, 150 and 188) are transferred between modules 110 and 160 at a rate higher than the rate the data streams would be transferred using a non-accelerated communication path (e.g., channel 189).

In one aspect, the term "stream" may sometimes be referred to as data, data stream, data packet(s), packet(s), traffic, a connection request, a request, or vice versa. In one aspect, the term "packet loss" may sometimes be referred to as "data loss" or vice versa. In one aspect, the terms "packet sequence identifier" and "packet type identifier" may be sometimes referred to as "stream sequence identifier" and "stream type identifier," respectively, or vice versa. A term "IP identifier" may refer to an IP address. A term "port" or "an identifier of a port" may refer to a port number. In one aspect, when a sender or a receiver is described as a module (e.g., module 130 or 150), such sender or receiver may be (i) the module itself (e.g., an application) or (ii) a machine-readable medium, a device or a computer that contains the module.

In one aspect of the disclosure, the term "accelerate" may refer to acceleration for a network(s) with high latency and/or packet loss. In another aspect, acceleration may provide the capability to increase bandwidth (e.g., increase a window size of packets). In another aspect, acceleration may provide the capability to maximize bandwidth for a network condition.

In one aspect, when a signal flows from module U, to module V, to module X, module Y, and to module Z. A signal received by module Z can be viewed as originated by module U, module V, module X or module Y. Accordingly, in one aspect, an originator of a signal does not need to be the first originator of the signal. In another example, an originator may be the first originator of the signal.

In one example, a connection between two points is established when a handshake between the two points is made successfully. In another example, a connection between two points is established when the two points are ready to send or receive a stream from each other. Methods of establishing a connection is not limited to these examples, and a connection may be established using other methods.

In one aspect of the disclosure, the one or more accelerator modules (e.g., module 120, module 130 and/or module 150 in FIG. 1) may be transparent to modules 110 and 160. For example, an accelerator module may be application-agnostic. In one aspect, an accelerator module may be a software-only application. In one aspect, an accelerator module may be at a layer below the presentation layer (layer 6) in the OSI model (e.g., in layer 3) so that an accelerator module may be independent of the presentation layer and any layer above it in the OSI model. In one aspect, an accelerator module can be invoked outside modules 110 and 160. In one aspect, modules 110 and 160 can be pre-existing applications, and an accelerator module can be used with modules 110 and 160 without modifying module 110 or 160 specifically for the accelerator module.

In one aspect of the disclosure, in an accelerated mode, a module (e.g., module 130 or module 150 in FIG. 1) may transmit and receive streams via a communication channel utilizing an accelerated protocol (e.g., non-TCP). In one aspect, in an accelerated mode, a module may accelerate a stream to use the maximum bandwidth for the current latency and data loss conditions. In one aspect, in an accelerated mode, a module may dynamically adjust itself to changing latency and data loss conditions to maintain optimal usage of bandwidth and user experience.

In one aspect of the disclosure, various network conditions (e.g., latency, data loss, other network conditions) and various measurements may be real-time conditions, and a module (e.g., module 130 or module 150 in FIG. 1) may respond to these conditions in real-time. In one aspect, the term "a network condition" may refer to one or more network conditions. In one aspect of the disclosure, the term "round-trip time" or RTT may refer to latency or vice versa.

The subject technology is illustrated, for example, according to various aspects described below. Numbered clauses are provided below for convenience. These are provided as examples, and do not limit the subject technology.

1. A communication apparatus for remote communication, comprising:

a local transparent communication proxy module configured to intercept a first stream destined to a remote destination and configured to make a first determination whether to accelerate communication associated with the first stream; and a local communication proxy module configured to receive the first stream based on the first determination and configured to make a second determination whether a connection to a remote communication proxy module is established, wherein if the connection is established, then the local communication proxy module is configured to receive one or more additional streams and configured to direct the one or more additional streams to the remote communication proxy module utilizing an accelerated mode, and if the connection is not established, then the local transparent communication proxy module is configured to direct the first stream to the remote destination utilizing a non-accelerated mode.

2. The communication apparatus of clause 1, wherein the first stream comprises a network request, and the one or more additional streams comprise one or more data streams, wherein the communication apparatus comprises one or more computers, and wherein the one or more computers comprises one or more displays, one or more processing systems, the local transparent communication proxy module, and the local communication proxy module.

3. The communication apparatus of clause 1, wherein the first stream comprises real-time information from a local communication application module comprising a real-time application, and the one or more additional streams comprise real-time information, and wherein the first stream is in a form utilizing a first transmission protocol, the non-accelerated mode utilizes the first transmission protocol, and the accelerated mode utilizes a second transmission protocol different from the first transmission protocol.

4. The communication apparatus of clause 1, wherein the local transparent communication proxy module is configured to receive the first stream via a first communication channel, wherein the local communication proxy module is configured to receive the first stream via a second communication channel, wherein if the connection is established, then the local communication proxy module is configured to receive the one or more additional streams via a third communication channel, wherein the third communication channel bypasses the local transparent communication proxy module, wherein the local communication proxy module is configured to facilitate establishment of the connection via a fourth communication channel, and wherein a communication path for the accelerated mode is different from a communication path for the non-accelerated mode.

5. The communication apparatus of clause 1, wherein a stream transfer rate utilizing the accelerated mode is higher than a stream transfer rate utilizing a transmission control protocol (TCP) or a stream transfer rate utilizing the non-accelerated mode.

6. The communication apparatus of clause 1, wherein the local transparent communication proxy module is configured to intercept the first stream originated from a local communication application module, and the local communication proxy module is configured to be transparent to the local communication application module.

7. The communication apparatus of clause 1, wherein the local transparent communication proxy module is configured to intercept the first stream from a local communication application module without modifying the local communication application module specifically for the local transparent communication proxy module, and wherein the local communication proxy module is configured to receive the first stream and the one or more additional streams originated from a local communication application module, without modifying the local communication application module specifically for the local communication proxy module.

8. The communication apparatus of clause 1, wherein the local communication proxy module comprises:

a priority queue configured to store and order streams according to times the streams have been sent; and a receive buffer configured to store streams.

9. The communication apparatus of clause 8, wherein the local communication proxy module further comprises:

a send hash table configured to minimize access time to the streams stored in the priority queue; and a receive hash table configured to minimize access time to the streams stored in the receive buffer.

10. The communication apparatus of clause 1, further comprising:

a second local transparent communication proxy module configured to intercept a third stream destined to the remote destination and configured to make a third determination whether to accelerate communication associated with the third stream; and a second local communication proxy module configured to receive the third stream based on the third determination and configured to make a fourth determination whether a second connection to the remote communication proxy module is established, wherein if the second connection is established, then the second local communication proxy module is configured to receive one or more second additional streams and configured to direct the one or more second additional streams to the remote communication proxy module utilizing an accelerated mode and the second connection, and if the second connection is not established, then the second local transparent communication proxy module is configured to direct the third stream to the remote destination utilizing a non-accelerated mode.

11. The communication apparatus of clause 1, further comprising:

a second local transparent communication proxy module configured to intercept a third stream destined to the remote destination and configured to make a third determination whether to accelerate communication associated with the third stream, the local communication proxy module configured to receive the third stream based on the third determination and configured to make a fourth determination whether a second connection to the remote communication proxy module is established, wherein if the second connection is established, then the local communication proxy module is configured to receive one or more second additional streams and configured to direct the one or more second additional streams to the remote communication proxy module utilizing an accelerated mode, and if the second connection is not established, then the second local transparent communication proxy module is configured to direct the third stream to the remote destination utilizing a non-accelerated mode.

Figure 14A:
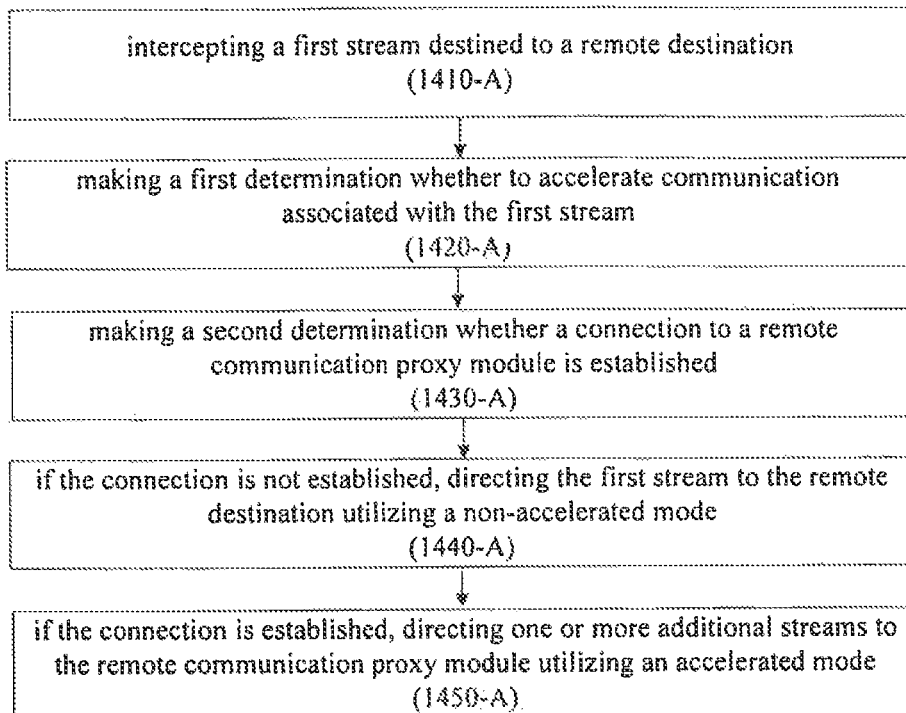
FIG. 14A illustrates an example of an operation of a communication apparatus according to one aspect of the disclosure.

12. A machine-readable medium encoded with instructions for remote communication, the instructions comprising code for:

intercepting a first stream destined to a remote destination (e.g., 1410-A of FIG. 14A);

making a first determination whether to accelerate communication associated with the first stream (e.g., 1420-B);

making a second determination whether a connection to a remote communication proxy module is established (e.g., 1430-A);

if the connection is not established, directing the first stream to the remote destination utilizing a non-accelerated mode (e.g., 1440-A); and if the connection is established, directing one or more additional streams to the remote communication proxy module utilizing an accelerated mode (e.g., 1450-A).

12A. The machine-readable medium of clause 12, wherein the directing one or more additional streams comprises directing one or more additional streams to the remote communication proxy module through a local communication proxy module utilizing an accelerated mode.

13. The machine-readable medium of clause 12, wherein the first stream comprises a network request, and the one or more additional streams comprise one or more data streams.

14. The machine-readable medium of clause 12, wherein the first stream comprises real-time information from a local communication application module comprising a real-time application, and the one or more additional streams comprise real-time information, and wherein the first stream is in a form utilizing a first transmission protocol, the non-accelerated mode comprises the first transmission protocol, and the accelerated mode comprises a second transmission protocol different from the first transmission protocol.

15. The machine-readable medium of clause 12, wherein the intercepting comprises receiving the first stream by a local transparent communication proxy module via a first communication channel, wherein the making a first determination is performed by the local transparent communication proxy module, wherein the making a second determination is performed by a local communication proxy module, wherein the directing the first stream is performed by the local transparent communication proxy module, wherein the directing one or more additional streams is performed by the local communication proxy module, wherein the instructions further comprise code for: receiving the first stream by the local communication proxy module, based on the first determination, via a second communication channel; facilitating establishing the connection with the remote communication proxy module by the local communication proxy module, based on the first determination; if the connection between the local communication proxy module and the remote communication proxy module is established, receiving, by the local communication proxy module, the one or more additional streams via a third communication channel, wherein the third communication channel bypasses the local transparent communication proxy module, wherein the local communication proxy module is configured to facilitate establishing the connection via a fourth communication channel, and wherein a communication path for the accelerated mode is different from a communication path for the non-accelerated mode.

16. The machine-readable medium of clause 12, wherein a stream transfer rate utilizing the accelerated mode is higher than a stream transfer rate utilizing a transmission control protocol (TCP) or a stream transfer rate utilizing the non-accelerated mode.

17. The machine-readable medium of clause 12, wherein the intercepting a first stream comprises intercepting, by a local transparent communication proxy module, the first stream originated from a local communication application module, and the local communication proxy module is configured to be transparent to the local communication application module.

18. The machine-readable medium of clause 12, wherein the intercepting a first stream comprises intercepting, by a local transparent communication proxy module, the first stream from a local communication application module without modifying the local communication application module specifically for the local transparent communication proxy module, and wherein the instructions further comprise code for: receiving, based on the first determination by the local communication proxy module, the first stream originated from the local communication application module, without modifying the local communication application module specifically for the local communication proxy module; and receiving, based on the first determination by the local communication proxy module, the one or more additional streams originated from the local communication application module, without modifying the local communication application module specifically for the local communication proxy module.

19. The machine-readable medium of clause 12, wherein the instructions further comprise code for: facilitating storing and ordering streams according to times the streams have been sent; and facilitating storing streams that have been received.

20. The machine-readable medium of clause 19, wherein the instructions further comprise code for minimizing access time to the streams that have been sent and stored; and minimizing access time to the streams that have been received and stored.

20A. The machine-readable medium of clause 12, wherein the instructions further comprise code for error correction to reduce retransmission of streams.

21. The machine-readable medium of clause 12, comprising:

a first local transparent communication proxy module comprising the code for: intercepting a first stream destined to a remote destination; making a first determination whether to accelerate communication associated with the first stream; and if the connection is not established, directing the first stream to the remote destination utilizing a non-accelerated mode;

a first local communication proxy module comprising code for: receiving the first stream based on the first determination, wherein the first local communication proxy module further comprises the code for: making a second determination whether a connection to a remote communication proxy module is established; and if the connection is established, directing one or more additional streams to the remote communication proxy module utilizing an accelerated mode;

a second local transparent communication proxy module comprising code for: intercepting a third stream destined to the remote destination; and making a third determination whether to accelerate communication associated with the third stream; and a second local communication proxy module comprising code for: receiving the third stream based on the third determination; making a fourth determination whether a second connection to the remote communication proxy module is established; and if the second connection is established, receiving one or more second additional streams and directing the one or more second additional streams to the remote communication proxy module utilizing an accelerated mode, wherein the second local transparent communication proxy module further comprises code for: if the second connection is not established, directing the third stream to the remote destination utilizing an non-accelerated mode.

22. The machine-readable medium of clause 12, comprising:

a first local transparent communication proxy module comprising the code for: intercepting a first stream destined to a remote destination; making a first determination whether to accelerate communication associated with the first stream; and if the connection is not established, directing the first stream to the remote destination utilizing a non-accelerated mode;

a local communication proxy module comprising code for: receiving the first stream based on the first determination, wherein the first local communication proxy module further comprises the code for: making a second determination whether a connection to a remote communication proxy module is established; and if the connection is established, directing one or more additional streams to the remote communication proxy module utilizing an accelerated mode; and a second local transparent communication proxy module comprising code for: intercepting a third stream destined to the remote destination; and making a third determination whether to accelerate communication associated with the third stream, wherein the local communication proxy module further comprises code for: receiving the third stream based on the third determination; making a fourth determination whether a second connection to the remote communication proxy module is established; and if the second connection is established, receiving one or more second additional streams and directing the one or more second additional streams to the remote communication proxy module utilizing an accelerated mode, wherein the second local transparent communication proxy module further comprises code for: if the second connection is not established, directing the third stream to the remote destination utilizing a non-accelerated mode.

23. A method for remote communication, comprising:

intercepting a first stream destined to a remote destination;

making a first determination whether to accelerate communication associated with the first stream;

making a second determination whether a connection to a remote communication proxy module is established;

if the connection is not established, directing the first stream to the remote destination utilizing a non-accelerated mode; and if the connection is established, directing one or more additional streams to the remote communication proxy module utilizing an accelerated mode.

24. The method of clause 23, wherein the first stream comprises a network request, and the one or more additional streams comprise one or more data streams.

25. The method of clause 23, wherein the first stream comprises real-time information from a local communication application module comprising a real-time application, and the one or more additional streams comprise real-time information, and wherein the first stream is in a form utilizing a first transmission protocol, the non-accelerated mode comprises the first transmission protocol, and the accelerated mode comprises a second transmission protocol different from the first transmission protocol.

26. The method of clause 23, wherein the intercepting comprises receiving the first stream by a local transparent communication proxy module via a first communication channel, wherein the making a first determination is performed by the local transparent communication proxy module, wherein the making a second determination is performed by a local communication proxy module, wherein the directing the first stream is performed by the local transparent communication proxy module, wherein the directing one or more additional streams is performed by the local communication proxy module, wherein the method further comprises: receiving the first stream by the local communication proxy module, based on the first determination, via a second communication channel; facilitating establishing the connection with the remote communication proxy module by the local communication proxy module, based on the first determination; if the connection between the local communication proxy module and the remote communication proxy module is established, receiving, by the local communication proxy module, the one or more additional streams via a third communication channel, wherein the third communication channel bypasses the local transparent communication proxy module, wherein the local communication proxy module is configured to facilitate establishing the connection via a fourth communication channel, and wherein a communication path for the accelerated mode is different from a communication path for the non-accelerated mode.

27. The method of clause 23, wherein a stream transfer rate utilizing the accelerated mode is higher than a stream transfer rate utilizing a transmission control protocol (TCP) or a stream transfer rate utilizing the non-accelerated mode.

28. The method of clause 23, wherein the intercepting a first stream comprises intercepting, by a local transparent communication proxy module, the first stream originated from a local communication application module, and the local communication proxy module is configured to be transparent to the local communication application module.

29. The method of clause 23, wherein the intercepting a first stream comprises intercepting, by a local transparent communication proxy module, the first stream from a local communication application module without modifying the local communication application module specifically for the local transparent communication proxy module, and wherein the method further comprises: receiving, based on the first determination by the local communication proxy module, the first stream originated from the local communication application module, without modifying the local communication application module specifically for the local communication proxy module; and receiving, based on the first determination by the local communication proxy module, the one or more additional streams originated from the local communication application module, without modifying the local communication application module specifically for the local communication proxy module.

30. The method of clause 23, further comprising: facilitating storing and ordering streams according to times the streams have been sent; and facilitating storing streams that have been received.

31. The method of clause 30, further comprising: minimizing access time to the streams that have been sent and stored; and minimizing access time to the streams that have been received and stored.

32. The method of clause 23, wherein the intercepting is performed by a local transparent communication proxy module, wherein the making a first determination is performed by the local transparent communication proxy module, wherein the making a second determination is performed by a local communication proxy module, wherein the directing the first stream is performed by the local transparent communication proxy module, wherein the directing one or more additional streams is performed by the local communication proxy module, wherein the method further comprises: receiving, by the local communication proxy module, the first stream based on the first determination; intercepting, by a second local transparent communication proxy module, a third stream destined to the remote destination; making, by the second local transparent communication proxy module, a third determination whether to accelerate communication associated with the third stream; receiving, by a second local communication proxy module, the third stream based on the third determination; making, by the second local communication proxy module, a fourth determination whether a second connection to the remote communication proxy module is established; if the second connection is established, receiving, by the second local communication proxy module, one or more second additional streams, and directing, by the second local communication proxy module, the one or more second additional streams to the remote communication proxy module utilizing an accelerated mode; and if the second connection is not established, directing, by the second local transparent communication proxy module, the third stream to the remote destination utilizing a non-accelerated mode.

33. The method of clause 23, wherein the intercepting is performed by a local transparent communication proxy module, wherein the making a first determination is performed by the local transparent communication proxy module, wherein the making a second determination is performed by a local communication proxy module, wherein the directing the first stream is performed by the local transparent communication proxy module, wherein the directing one or more additional streams is performed by the local communication proxy module, wherein the method further comprises: receiving, by the local communication proxy module, the first stream based on the first determination; intercepting, by a second local transparent communication proxy module, a third stream destined to the remote destination; making, by the second local transparent communication proxy module, a third determination whether to accelerate communication associated with the third stream; receiving, by the local communication proxy module, the third stream based on the third determination; making, by the local communication proxy module, a fourth determination whether a second connection to the remote communication proxy module is established; and if the second connection is established, receiving, by the local communication proxy module, one or more second additional streams and directing, by the local communication proxy module, the one or more second additional streams to the remote communication proxy module utilizing an accelerated mode; and if the second connection is not established, directing, by the second local transparent communication proxy module, the third stream to the remote destination utilizing a non-accelerated mode.

Figure 14B:
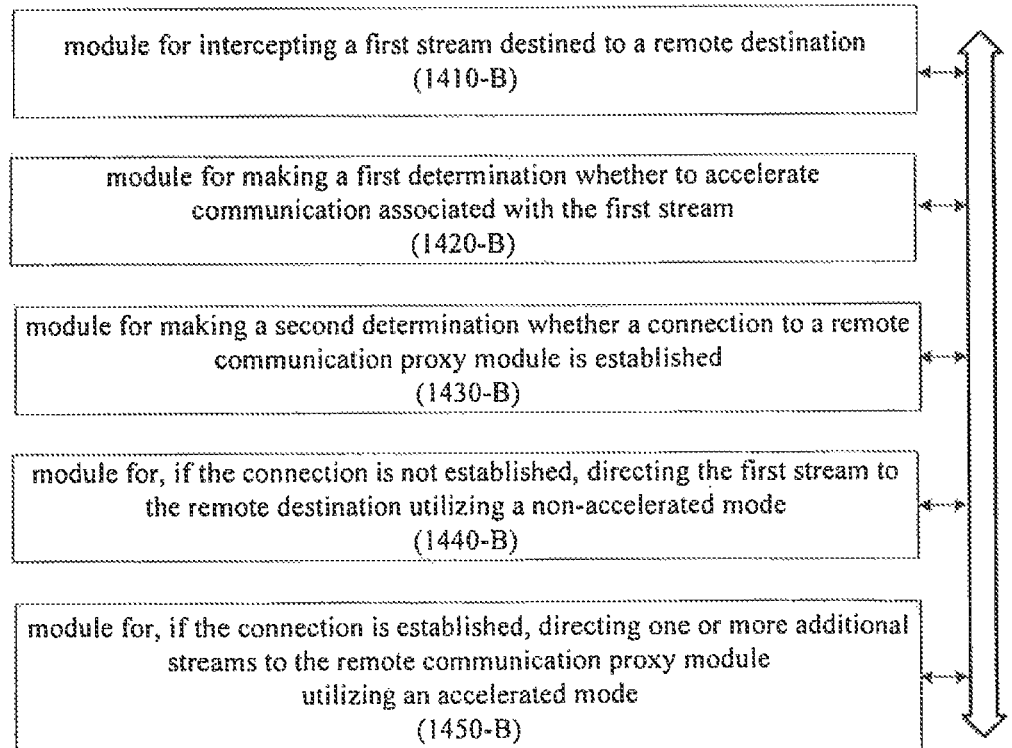
FIG. 14B illustrates an example of a configuration of a communication apparatus according to one aspect of the disclosure.

34. A communication apparatus for remote communication, comprising:

means for intercepting a first stream destined to a remote destination (e.g., 1410-B of FIG. 14B);

means for making a first determination whether to accelerate communication associated with the first stream (e.g., 1420-B);

means for making a second determination whether a connection to a remote communication proxy module is established (e.g., 1430-B);

means for, if the connection is not established, directing the first stream to the remote destination utilizing a non-accelerated mode (e.g., 1440-B); and means for, if the connection is established, directing one or more additional streams to the remote communication proxy module utilizing an accelerated mode (e.g., 1450-B).

35. The communication apparatus of clause 34, wherein the first stream comprises a network request, and the one or more additional streams comprise one or more data streams, wherein the communication apparatus comprises one or more computers, and wherein the one or more computers comprises: means for displaying information; means for processing information; the means for intercepting; the means for making a first determination; the means for making a second determination; the means for directing the first stream; and the means for directing one or more additional streams.

36. The communication apparatus of clause 34, wherein the first stream comprises real-time information from a local communication application module comprising a real-time application, and the one or more additional streams comprise real-time information, and wherein the first stream is in a form utilizing a first transmission protocol, the non-accelerated mode comprises the first transmission protocol, and the accelerated mode comprises a second transmission protocol different from the first transmission protocol.

37. The communication apparatus of clause 34, wherein the means for intercepting comprises means for receiving the first stream via a first communication channel, wherein the communication apparatus further comprises: means for receiving the first stream based on the first determination, via a second communication channel; means for facilitating establishing the connection with the remote communication proxy module, based on the first determination, via a fourth communication channel; means for, if the connection is established, receiving the one or more additional streams via a third communication channel; wherein the third communication channel bypasses the means for receiving the first stream via the first communication channel, and wherein a communication path for the accelerated mode is different from a communication path for the non-accelerated mode.

38. The communication apparatus of clause 34, wherein a stream transfer rate utilizing the accelerated mode is higher than a stream transfer rate utilizing a transmission control protocol (TCP) or a stream transfer rate utilizing the non-accelerated mode.

39. The communication apparatus of clause 34, wherein the means for intercepting a first stream comprises means for intercepting the first stream originated from a local communication application module, and the means for making the second determination and the means for directing the one or more additional streams are transparent to the local communication application module.

40. The communication apparatus of clause 34, wherein the means for intercepting a first stream comprises means for intercepting, by a local transparent communication proxy module, the first stream from a local communication application module, without modifying the local communication application module specifically for the local transparent communication proxy module, and wherein the communication apparatus comprises: means for receiving, based on the first determination by a local communication proxy module, the first stream originated from the local communication application module, without modifying the local communication application module specifically for the local communication proxy module; and means for receiving, based on the first determination by the local communication proxy module, the one or more additional streams originated from the local communication application module, without modifying the local communication application module specifically for the local communication proxy module.

41. The communication apparatus of clause 34, further comprising: means for facilitating storing and ordering streams according to times the streams have been sent; and means for facilitating storing streams that have been received.

42. The communication apparatus of clause 41, further comprising: means for minimizing access time to the streams that have been sent and stored; and means for minimizing access time to the streams that have been received and stored.

43. The communication apparatus of clause 34, further comprising:

means for receiving the first stream based on the first determination;

means for intercepting a third stream destined to the remote destination, making a third determination whether to accelerate communication associated with the third stream, and, if a second connection is not established, directing a third stream to the remote destination utilizing a non-accelerated mode; and means for receiving the third stream based on the third determination, making a fourth determination whether the second connection to the remote communication proxy module is established, and, if the second connection is established, receiving one or more second additional streams and directing the one or more second additional streams to the remote communication proxy module utilizing an accelerated mode.

44. The communication apparatus of clause 34, further comprising:

means for receiving the first stream based on the first determination, receiving a third stream based on a third determination, making a fourth determination whether a second connection to the remote communication proxy module is established, if the second connection is established, receiving one or more second additional streams, and directing the one or more second additional streams to the remote communication proxy module utilizing an accelerated mode; and means for intercepting the third stream destined to the remote destination and making the third determination whether to accelerate communication associated with the third stream, and, if the second connection is not established, directing the third stream to the remote destination utilizing a non-accelerated mode.

The subject technology is illustrated, for example, according to various aspects described below. Numbered clauses are provided below for convenience. These are provided as examples, and do not limit the subject technology.

1. A communication apparatus for remote communication, comprising:

a first local module configured to intercept a first stream, the first stream utilizing a first transmission protocol and destined to a remote destination over a network, configured to make a determination whether to direct the first stream over a first connection to a first destination utilizing the first transmission protocol or to direct the first stream over a second connection to a second destination utilizing a second transmission protocol, based on one or more of the following factors: a configuration or a network condition, and configured to direct the first stream to the first destination or the second destination based on the determination, wherein the second transmission protocol is different from the first transmission protocol.

1A. The communication apparatus of clause 1, wherein the first connection comprises at least a portion or all of a communication channel, wherein the communication channel may include, for example, a portion of connection 181, a connection 184, a port 112 of the communication apparatus, a channel 189, and/or a port 114 at the remote destination, wherein the communication channel may be between the communication apparatus and the remote destination (e.g., 180A or 160), between a local application module (e.g., 110) and a remote application module (e.g., 160), or a portion thereof, and wherein the first destination comprises one of the following: a port (e.g., 112) of the communication apparatus, an intermediary destination along the communication channel, the remote destination, or a port (e.g., 114) at the remote destination.

1B. The communication apparatus of clause 1, wherein the second connection comprises at least a portion or all of a second communication channel, wherein the second communication channel may include, for example, a connection 182 between the first local module and a local proxy module, a port 113, a communication channel (e.g., 185, 140, 186, 188), and/or ports 115 and 116, wherein the second communication channel may be between the communication apparatus and the remote destination, between the first local module and a remote application module, or a portion thereof, and wherein the second destination comprises one of the following: a local proxy module (e.g., 130), a remote proxy module (e.g., 150), a port (e.g., 113, 116), an intermediary destination along the second communication channel, the remote destination, or a port (e.g., 115) at the remote destination.

1C. The communication apparatus of clause 1, wherein the second transmission protocol comprises the first transmission protocol, wherein the second connection or the second destination utilizes the second transmission protocol.

1D. The communication apparatus of clause 1, wherein if the first local module determines to direct the first stream to the first destination, and the first stream is a connection request originated from a local application module, then the first local module is configured to not intercept subsequent streams, which comprise data, from the local application module and is configured to allow the subsequent streams to be directed to the remote destination without the first local module's intervention, and is configured to allow the local application module to receive streams from the remote destination without the first local module's intervention (e.g., via a portion of 181, 184, 112, 189, 114).

2. The communication apparatus of clause 1, wherein the network condition comprises an amount of packet loss.

3. The communication apparatus of clause 1, wherein the network condition comprises a round-trip time.

4. The communication apparatus of clause 1, wherein the network condition comprises available bandwidth.

5. The communication apparatus of clause 1, wherein the first local module is configured to direct the first stream to the first destination if an amount of packet loss over the network is below a threshold value, and wherein the first local module is configured to direct the first stream to the second destination if an amount of packet loss over the network is above a threshold value.

6. The communication apparatus of clause 1, wherein the first local module is configured to make a determination whether to direct a first stream over a first connection to a first destination utilizing the first transmission protocol or to direct the first stream over a second connection to a second destination utilizing a second transmission protocol, further based on one or more of the following: whether a second local module for receiving and accelerating a stream is running, whether a first remote module for receiving a stream, from the second local module, is running, and whether a connection between the second local module and the first remote module is establishable.

7. The communication apparatus of clause 1, wherein the communication apparatus comprises a computer, wherein the computer comprises a display, a processing system, and the first local module, wherein the first stream comprises a network request, and wherein the first local module is configured to direct the first stream to the remote destination via the first destination or via the second destination.

Figure 15A:
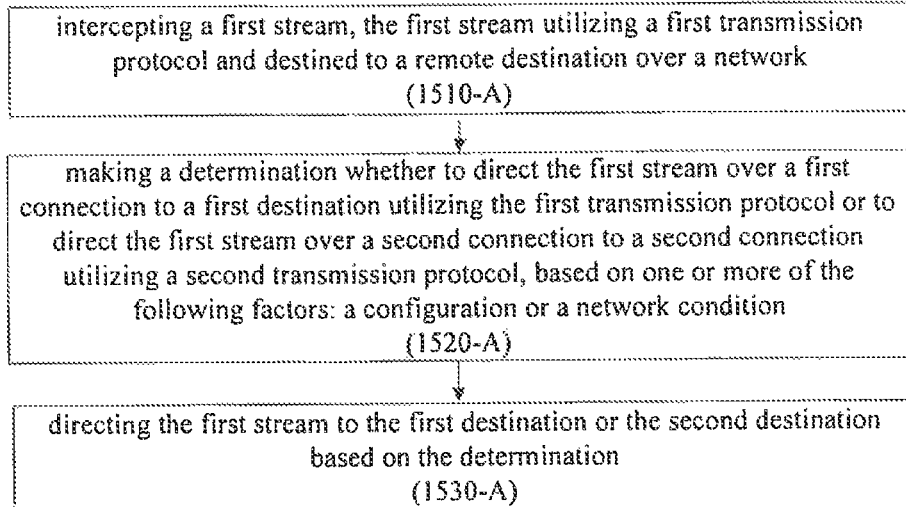
FIG. 15A illustrates an example of an operation of a communication apparatus according to one aspect of the disclosure.

8. A machine-readable medium encoded with instructions for remote communication, the instructions comprising code for:

intercepting a first stream, the first stream utilizing a first transmission protocol and destined to a remote destination over a network (e.g., 1510-A of FIG. 15A);

making a determination whether to direct the first stream over a first connection to a first destination utilizing the first transmission protocol or to direct the first stream over a second connection to a second destination utilizing a second transmission protocol, based on one or more of the following factors: a configuration or a network condition (e.g., 1520-A); and directing the first stream to the first destination or the second destination based on the determination (e.g., 1530-A), wherein the second transmission protocol is different from the first transmission protocol.

9. The machine-readable medium of clause 8, wherein the network condition comprises an amount of packet loss.

10. The machine-readable medium of clause 8, wherein the network condition comprises a round-trip time.

11. The machine-readable medium of clause 8, wherein the network condition comprises available bandwidth.

12. The machine-readable medium of clause 8, wherein the directing comprises: directing the first stream to the first destination if an amount of packet loss over the network is below a threshold value; and directing the first stream to the second destination if an amount of packet loss over the network is above a threshold value.

13. The machine-readable medium of clause 8, wherein the instructions further comprise code for:

making a determination, by a first local module, whether to direct a first stream over a first connection to a first destination utilizing the first transmission protocol or to direct the first stream over a second connection to a second destination utilizing a second transmission protocol, further based on one or more of the following: whether a second local module for receiving and accelerating a stream is running, whether a first remote module for receiving a stream, from the second local module, is running, and whether a connection between the second local module and the first remote module is establishable.

14. The machine-readable medium of clause 8, wherein the first stream comprises a network request, and wherein the directing comprises code for: directing the first stream to the remote destination via the first destination or via the second destination.

15. A method for remote communication, comprising:

intercepting a first stream, the first stream utilizing a first transmission protocol and destined to a remote destination over a network;

making a determination whether to direct the first stream over a first connection to a first destination utilizing the first transmission protocol or to direct the first stream over a second connection to a second destination utilizing a second transmission protocol, based on one or more of the following factors: a configuration or a network condition; and directing the first stream to the first destination or the second destination based on the determination, wherein the second transmission protocol is different from the first transmission protocol.

16. The method of clause 15, wherein the network condition comprises an amount of packet loss.

17. The method of clause 15, wherein the network condition comprises a round-trip time.

18. The method of clause 15, wherein the network condition comprises available bandwidth.

19. The method of clause 15, wherein the directing comprises: directing the first stream to the first destination if an amount of packet loss over the network is below a threshold value; and directing the first stream to the second destination if an amount of packet loss over the network is above a threshold value.

20. The method of clause 15, further comprising:

making a determination, by a first local module, whether to direct a first stream over a first connection to a first destination utilizing the first transmission protocol or to direct the first stream over a second connection to a second destination utilizing a second transmission protocol, further based on one or more of the following: whether a second local module for receiving and accelerating a stream is running, whether a first remote module for receiving a stream, from the second local module, is running, and whether a connection between the second local module and the first remote module is establishable.

21. The method of clause 15, wherein the first stream comprises a network request, and wherein the directing comprises: directing the first stream to the remote destination via the first destination or via the second destination.

Figure 15B:
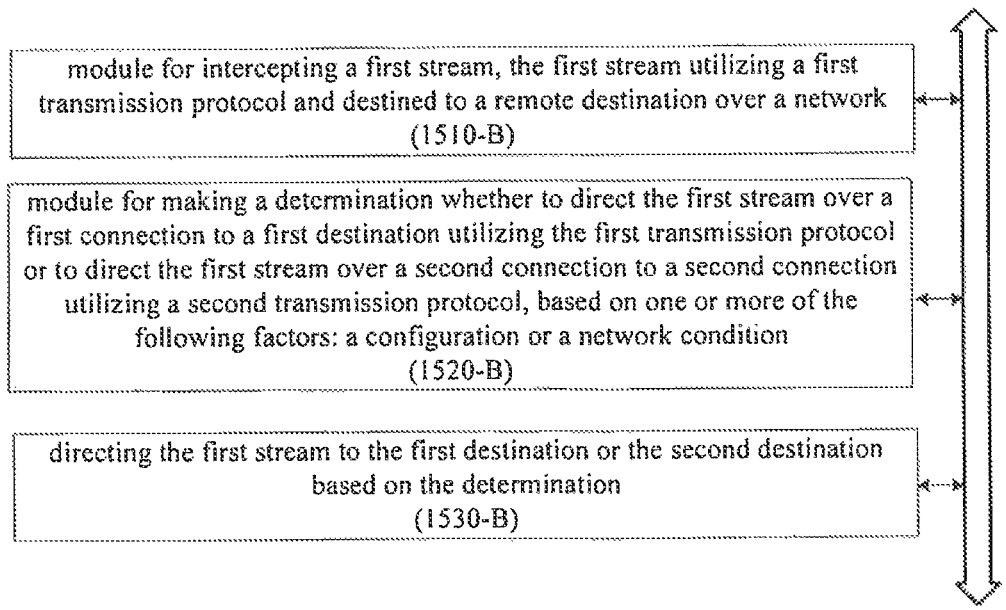
FIG. 15B illustrates an example of a configuration of a communication apparatus according to one aspect of the disclosure.

22. A communication apparatus for remote communication, comprising:

means for intercepting a first stream, the first stream utilizing a first transmission protocol and destined to a remote destination over a network (e.g., 1510-B of FIG. 15B);

means for making a determination whether to direct the first stream over a first connection to a first destination utilizing the first transmission protocol or to direct the first stream over a second connection to a second destination utilizing a second transmission protocol, based on one or more of the following factors: a configuration or a network condition (e.g., 1520-B); and means for directing the first stream to the first destination or the second destination based on the determination (e.g., 1530-B), wherein the second transmission protocol is different from the first transmission protocol.

23. The communication apparatus of clause 22, wherein the network condition comprises an amount of packet loss.

24. The communication apparatus of clause 22, wherein the network condition comprises a round-trip time.

25. The communication apparatus of clause 22, wherein the network condition comprises available bandwidth.

26. The communication apparatus of clause 22, wherein the means for directing comprises: means for directing the first stream to the first destination if an amount of packet loss over the network is below a threshold value; and means for directing the first stream to the second destination if an amount of packet loss over the network is above a threshold value.

27. The communication apparatus of clause 22, further comprising:

means for making a determination, by a first local module, whether to direct a first stream over a first connection to a first destination utilizing the first transmission protocol or to direct the first stream over a second connection to a second destination utilizing a second transmission protocol, further based on one or more of the following: whether a second local module for receiving and accelerating a stream is running, whether a first remote module for receiving a stream, from the second local module, is running, and whether a connection between the second local module and the first remote module is establishable.

28. The communication apparatus of clause 22, wherein the communication apparatus comprises a computer, and wherein the computer comprises: means for displaying information; means for processing information; the means for intercepting; the means for making a determination; and the means for directing, wherein the first stream comprises a network request, and wherein the means for directing comprises: means for directing the first stream to the remote destination via the first destination or via the second destination.

The subject technology is illustrated, for example, according to various aspects described below. Numbered clauses are provided below for convenience. These are provided as examples, and do not limit the subject technology.

1. A communication apparatus for remote communication, comprising:

a local communication proxy module configured to receive streams from a local communication application module, the streams in a form utilizing a first transmission protocol and destined to a remote destination, the local communication proxy module configured to facilitate sending, utilizing a second transmission protocol, the streams in real-time over a network to a remote communication proxy module, the local communication proxy module configured to adjust an amount of bandwidth used by the streams.

2. The communication apparatus of clause 1, wherein the local communication proxy module is configured to determine a window size for the streams to be sent to the remote communication proxy module and configured to adjust the window size based on one or more network conditions, wherein the second transmission protocol is different from the first transmission protocol.

3. The communication apparatus of clause 1, wherein the local communication proxy module is configured to dynamically determine a window size for the streams to be sent to the remote communication proxy module and configured to dynamically adjust the window size based on one or more real-time network conditions that are variable.

4. The communication apparatus of clause 1, wherein the local communication proxy module is configured to adjust a window size for the streams based on a round-trip time (RTT) and a bandwidth of a connection between the local communication proxy module and the remote communication proxy module.

5. The communication apparatus of clause 1, wherein the local communication proxy module is configured to control congestion in a connection between the local communication proxy module and the remote communication proxy module based on recovery of lost data and based on lost data retransmitted.

6. The communication apparatus of clause 1, wherein the local communication proxy module is configured to adjust a window size for the streams based on the number or rate of lost data retransmitted by the local communication proxy module, based on the number or rate of lost data recovered by the remote communication proxy module, and based on data successfully transmitted and acknowledged.

7. The communication apparatus of clause 1, wherein the local communication proxy module is configured to determine periodically a round-trip time (RTT) based on a signal sent to the remote communication proxy module and a signal received from the remote communication proxy module.

8. The communication apparatus of clause 1, wherein the local communication proxy module is configured to determine periodically a bandwidth of a connection between the local communication proxy module and the remote communication proxy module.

9. The communication apparatus of clause 1, wherein the local communication proxy module is configured to limit an amount of bandwidth used to send and receive streams between the local communication proxy module and the remote communication proxy module based on one or more of the following: latency, data loss, and processing capabilities of a machine on which the local communication proxy module is located.

10. The communication apparatus of clause 1, wherein the local communication proxy module is configured to set constraints on the amount of bandwidth used by the streams.

11. The communication apparatus of clause 1, wherein the local communication proxy module is configured to receive the streams from the local communication application module based on a determination as to whether to accelerate the streams.

12. The communication apparatus of clause 1, wherein the local communication proxy module is configured to adjust the amount of bandwidth by cycling between two modes, wherein in a first one of the two modes, the local communication proxy module is configured to adjust bandwidth usage, and in a second one of the two modes, the local communication proxy module is configured to maintain bandwidth usage.

13. The communication apparatus of clause 1, wherein the communication apparatus comprises one or more computers, wherein the one or more computers comprises one or more displays, one or more processing systems, and the local communication proxy module.

Figure 16A:
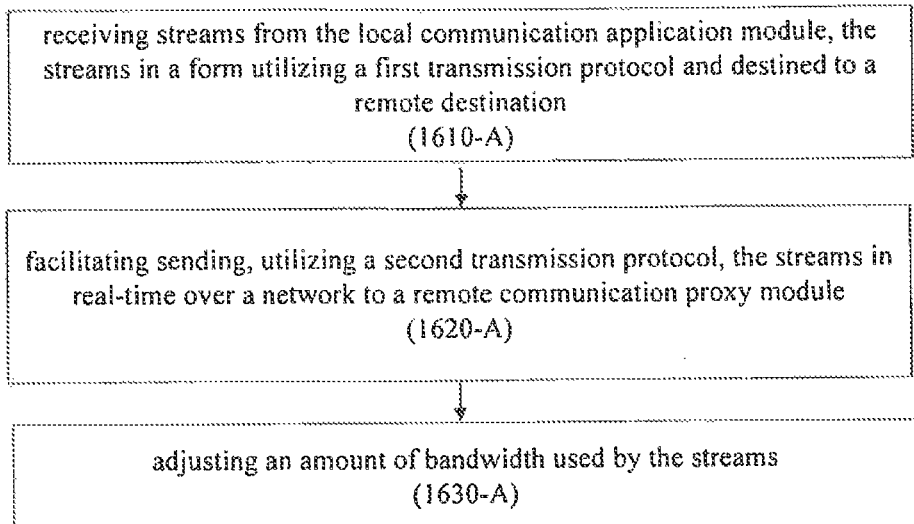
FIG. 16A illustrates an example of an operation of a communication apparatus according to one aspect of the disclosure.

14. A machine-readable medium encoded with instructions for remote communication, the instructions comprising code for:

receiving streams from the local communication application module, the streams in a form utilizing a first transmission protocol and destined to a remote destination (e.g., 1610-A of FIG. 16A);

facilitating sending, utilizing a second transmission protocol, the streams in real-time over a network to a remote communication proxy module (e.g., 1620-A); and adjusting an amount of bandwidth used by the streams (e.g., 1630-A).

15. The machine-readable medium of clause 14, wherein the adjusting comprises:

determining a window size for the streams to be sent to the remote communication proxy module; and adjusting the window size based on one or more network conditions, wherein the second transmission protocol is different from the first transmission protocol.

16. The machine-readable medium of clause 14, wherein the adjusting comprises:

dynamically determining a window size for the streams to be sent to the remote communication proxy module; and dynamically adjusting the window size based on one or more real-time network conditions that are variable.

17. The machine-readable medium of clause 14, wherein the adjusting comprises:

adjusting a window size for the streams based on a round-trip time (RTT) and a bandwidth of a connection between a local communication proxy module and the remote communication proxy module.

18. The machine-readable medium of clause 14, wherein the instructions comprise code for:

controlling congestion in a connection between a local communication proxy module and the remote communication proxy module based on recovery of lost data and based on lost data retransmitted.

19. The machine-readable medium of clause 14, wherein the adjusting comprises:

adjusting a window size for the streams based on the number or rate of lost data retransmitted by a local communication proxy module, based on the number or rate of lost data recovered by the remote communication proxy module, and based on data successfully transmitted and acknowledged.

20. The machine-readable medium of clause 14, wherein the instructions comprise code for:

determining periodically a round-trip time (RTT) based on a signal sent to the remote communication proxy module and a signal received from the remote communication proxy module.

21. The machine-readable medium of clause 14, wherein the instructions comprise code for:

determining periodically a bandwidth of a connection between a local communication proxy module and the remote communication proxy module.

22. The machine-readable medium of clause 14, wherein the adjusting comprises:

limiting an amount of bandwidth used to send and receive streams between a local communication proxy module and the remote communication proxy module based on one or more of the following: latency, data loss, and as processing capabilities of a machine on which the local communication proxy module is located.

23. The machine-readable medium of clause 14, wherein the instructions comprise code for: setting constraints on the amount of bandwidth used by the streams.

24. The machine-readable medium of clause 14, wherein the instructions comprise code for: receiving the streams from the local communication application module based on a determination as to whether to accelerate the streams.

25. The machine-readable medium of clause 14, wherein the adjusting comprises cycling between two modes, wherein a first one of the two modes comprises adjusting bandwidth usage, and a second one of the two modes comprises maintaining bandwidth usage.

26. A method for remote communication, comprising:

receiving streams from the local communication application module, the streams in a form utilizing a first transmission protocol and destined to a remote destination;

facilitating sending, utilizing a second transmission protocol, the streams in real-time over a network to a remote communication proxy module; and adjusting an amount of bandwidth used by the streams.

27. The method of clause 26, wherein the adjusting comprises:

determining a window size for the streams to be sent to the remote communication proxy module; and adjusting the window size based on one or more network conditions, wherein the second transmission protocol is different from the first transmission protocol.

28. The method of clause 26, wherein the adjusting comprises:

dynamically determining a window size for the streams to be sent to the remote communication proxy module; and dynamically adjusting the window size based on one or more real-time network conditions that are variable.

29. The method of clause 26, wherein the adjusting comprises:

adjusting a window size for the streams based on a round-trip time (RTT) and a bandwidth of a connection between a local communication proxy module and the remote communication proxy module.

30. The method of clause 26, comprising:

controlling congestion in a connection between a local communication proxy module and the remote communication proxy module based on recovery of lost data and based on lost data retransmitted.

31. The method of clause 26, wherein the adjusting comprises:

adjusting a window size for the streams based on the number or rate of lost data retransmitted by a local communication proxy module, based on the number or rate of lost data recovered by the remote communication proxy module, and based on data successfully transmitted and acknowledged.

32. The method of clause 26, comprising:

determining periodically a round-trip time (RTT) based on a signal sent to the remote communication proxy module and a signal received from the remote communication proxy module.

33. The method of clause 26, comprising:

determining periodically a bandwidth of a connection between a local communication proxy module and the remote communication proxy module.

34. The method of clause 26, wherein the adjusting comprises:

limiting an amount of bandwidth used to send and receive streams between a local communication proxy module and the remote communication proxy module based on one or more of the following: latency, data loss, and as processing capabilities of a machine on which the local communication proxy module is located.

35. The method of clause 26, comprising: setting constraints on the amount of bandwidth used by the streams.

36. The method of clause 26, comprising: receiving the streams from the local communication application module based on a determination as to whether to accelerate the streams.

37. The method of clause 26, wherein the adjusting comprises cycling between two modes, wherein a first one of the two modes comprises adjusting bandwidth usage, and a second one of the two modes comprises maintaining bandwidth usage.

Figure 16B:
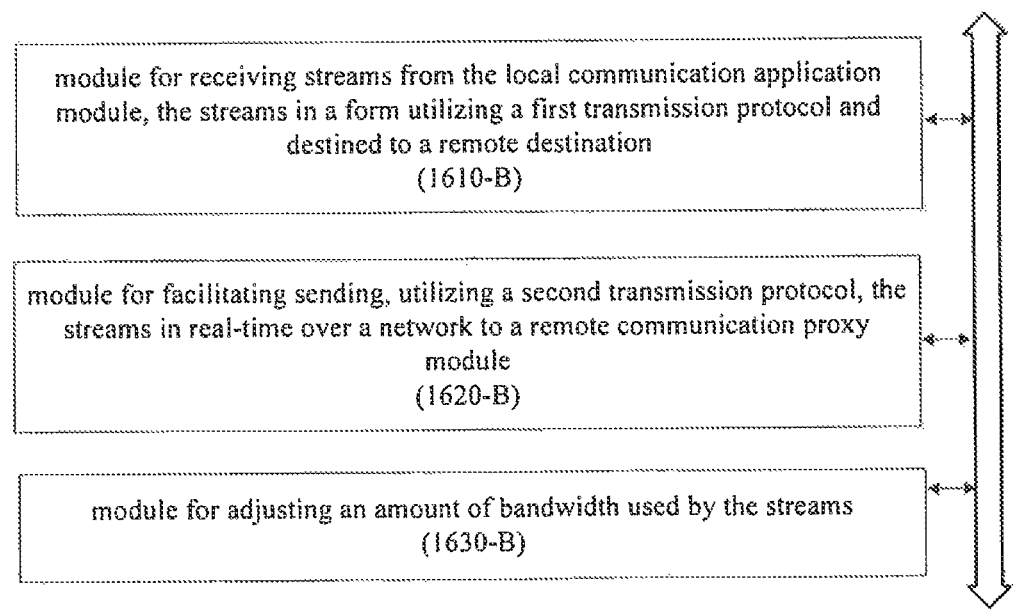
FIG. 16B illustrates an example of a configuration of a communication apparatus according to one aspect of the disclosure.

38. A communication apparatus for remote communication, comprising:

means for receiving streams from the local communication application module, the streams in a form utilizing a first transmission protocol and destined to a remote destination (e.g., 1610-B of FIG. 16B);

means for facilitating sending, utilizing a second transmission protocol, the streams in real-time over a network to a remote communication proxy module (e.g., 1620-B); and means for adjusting an amount of bandwidth used by the streams (e.g., 1630-B).

39. The communication apparatus of clause 38, wherein the means for adjusting comprises:

means for determining a window size for the streams to be sent to the remote communication proxy module; and means for adjusting the window size based on one or more network conditions, wherein the second transmission protocol is different from the first transmission protocol.

40. The communication apparatus of clause 38, wherein the means for adjusting comprises:

means for dynamically determining a window size for the streams to be sent to the remote communication proxy module; and means for dynamically adjusting the window size based on one or more real-time network conditions that are variable.

41. The communication apparatus of clause 38, wherein the means for adjusting comprises:

means for adjusting a window size for the streams based on a round-trip time (RTT) and a bandwidth of a connection between a local communication proxy module and the remote communication proxy module.

42. The communication apparatus of clause 38, comprising:

means for controlling congestion in a connection between a local communication proxy module and the remote communication proxy module based on recovery of lost data and based on lost data retransmitted.

43. The communication apparatus of clause 38, wherein the means for adjusting comprises:

means for adjusting a window size for the streams based on the number or rate of lost data retransmitted by a local communication proxy module, based on the number or rate of lost data recovered by the remote communication proxy module, and based on data successfully transmitted and acknowledged.

44. The communication apparatus of clause 38, comprising:

means for determining periodically a round-trip time (RTT) based on a signal sent to the remote communication proxy module and a signal received from the remote communication proxy module.

45. The communication apparatus of clause 38, comprising:

means for determining periodically a bandwidth of a connection between a local communication proxy module and the remote communication proxy module.

46. The communication apparatus of clause 38, wherein the means for adjusting comprises:

means for limiting an amount of bandwidth used to send and receive streams between a local communication proxy module and the remote communication proxy module based on one or more of the following: latency, data loss, and as processing capabilities of a machine on which the local communication proxy module is located.

47. The communication apparatus of clause 38, comprising:

means for setting constraints on the amount of bandwidth used by the streams.

48. The communication apparatus of clause 38, comprising:

means for receiving the streams from the local communication application module based on a determination as to whether to accelerate the streams.

49. The communication apparatus of clause 38, wherein the means for adjusting comprises means for cycling between two modes, wherein a first one of the two modes comprises means for adjusting bandwidth usage, and a second one of the two modes comprises means for maintaining bandwidth usage.

50. The communication apparatus of clause 38, comprising one or more computers, wherein the one or more computers comprises: means for displaying information; means for processing information; the means for receiving; the means for facilitating; and the means for adjusting.

The subject technology is illustrated, for example, according to various aspects described below. Numbered clauses are provided below for convenience. These are provided as examples, and do not limit the subject technology.

1. A communication apparatus for remote communication, comprising:

a local communication proxy module (e.g., 130 or 150 in FIG. 1) configured to receive streams from a local communication application module, the streams in a form utilizing a first transmission protocol and destined to a remote destination, the local communication proxy module configured to facilitate sending, utilizing a second transmission protocol, the streams in real-time over a network to a remote communication proxy module, the local communication proxy module configured to conceal characteristics of the network from the local communication application module, the local communication proxy module configured to be transparent to the local communication application module.

2. The communication apparatus of clause 1, wherein a location of the local communication proxy module is independent of a location of the local communication application module configured to send the streams, and the location of the local communication proxy module is independent of a location of the remote destination, and wherein the second transmission protocol is different from the first transmission protocol.

3. The communication apparatus of clause 1, wherein the local communication proxy module is configured for a layer below a presentation layer in an Open Systems Interconnection Reference model (OSI model), and the remote communication proxy module is configured for a layer below a presentation layer in the OSI model.

4. The communication apparatus of clause 1, wherein the local communication proxy module is configured to cache streams received from the remote communication proxy module and configured to facilitate sending the cached streams to multiple local communication application modules.

5. The communication apparatus of clause 1, wherein the local communication proxy module is configured to determine a type of data, select a compression type for the data based on the determination, and compress streams, to be sent to the remote communication proxy module, utilizing the compression type selected and configured to decompress streams received from the remote communication proxy module.

6. The communication apparatus of clause 1, wherein the local communication proxy module is configured to encrypt streams to be sent to the remote communication proxy module and configured to decrypt streams received from the remote communication proxy module.

7. The communication apparatus of clause 1, wherein the local communication proxy module is configured to detect error in streams utilizing a cyclic redundancy check (CRC) or a checksum, and wherein the local communication proxy module is configured to recover corrupted data utilizing error correcting codes.

8. The communication apparatus of clause 1, wherein the local communication proxy module is configured to receive the streams from the local communication application module based on a determination as to whether to accelerate the streams.

9. The communication apparatus of clause 1, further comprising:

a second local communication proxy module (e.g., 186-2 in FIG. 5, or 130-2 in FIG. 7) configured to receive second streams from a second local communication application module (e.g., 160-2 in FIG. 5, or 110-2 in FIG. 7), the second streams in a form utilizing the first transmission protocol and destined to the remote destination, the second local communication proxy module configured to facilitate sending, utilizing the second transmission protocol, the second streams in real-time over a network to the remote communication proxy module, the second local communication proxy module configured to conceal characteristics of the network, used for the second streams, from the second local communication application module, the second local communication proxy module configured to be transparent to the second local communication application module.

10. The communication apparatus of clause 1, wherein the local communication proxy module is configured to receive second streams from a second local communication application module (e.g., 160-2 in FIG. 6, or 110-2 in FIG. 8), the second streams in a form utilizing the first transmission protocol and destined to the remote destination, wherein the local communication proxy module is configured to facilitate sending, utilizing the second transmission protocol, the second streams in real-time over a network to the remote communication proxy module, wherein the local communication proxy module is configured to conceal characteristics of the network, used for the second streams, from the second local communication application module, and wherein the local communication proxy module is configured to be transparent to the second local communication application module.

11. The communication apparatus of clause 1, wherein the communication apparatus comprises one or more computers, wherein the one or more computers comprises one or more displays, one or more processing systems, and the local communication proxy module.

Figure 17A:
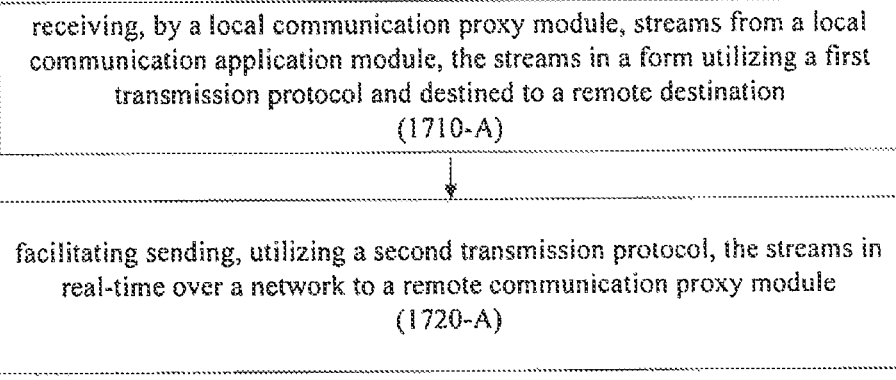
FIG. 17A illustrates an example of an operation of a communication apparatus according to one aspect of the disclosure.

12. A machine-readable medium encoded with instructions for remote communication, the instructions comprising code for:

receiving, by a local communication proxy module, streams from a local communication application module, the streams in a form utilizing a first transmission protocol and destined to a remote destination (e.g., 1710-A of FIG. 17A); and facilitating sending, utilizing a second transmission protocol, the streams in real-time over a network to a remote communication proxy module (e.g., 1720-A), wherein the local communication proxy module is configured to conceal characteristics of the network from the local communication application module, and wherein the local communication proxy module is configured to be transparent to the local communication application module.

13. The machine-readable medium of clause 12, wherein a location of the local communication proxy module is independent of a location of the local communication application module configured to send the streams, and the location of the local communication proxy module is independent of a location of the remote destination, and wherein the second transmission protocol is different from the first transmission protocol.

14. The machine-readable medium of clause 12, wherein the local communication proxy module is configured for a layer below a presentation layer in an Open Systems Interconnection Reference model (OSI model), and the remote communication proxy module is configured for a layer below a presentation layer in the OSI model.

15. The machine-readable medium of clause 12, wherein the instructions further comprise code for:

caching streams received from the remote communication proxy module; and facilitating sending the cached streams to multiple local communication application modules.

16. The machine-readable medium of clause 12, wherein the instructions further comprise code for:

determining a type of data;

selecting a compression type for the data based on the determination;

compressing streams, to be sent to the remote communication proxy module, utilizing the compression type selected; and decompressing streams received from the remote communication proxy module.

17. The machine-readable medium of clause 12, wherein the instructions further comprise code for:

encrypting streams to be sent to the remote communication proxy module; and decrypting streams received from the remote communication proxy module.

18. The machine-readable medium of clause 12, wherein the instructions further comprise code for:

detecting error in streams utilizing a cyclic redundancy check (CRC) or a checksum; and recovering corrupted data utilizing error correcting codes.

19. The machine-readable medium of clause 12, wherein the receiving comprises receiving the streams from the local communication application module based on a determination as to whether to accelerate the streams.

20. The machine-readable medium of clause 12, further comprising:

a second local communication proxy module comprising code for:

receiving second streams from a second local communication application module, the second streams in a form utilizing the first transmission protocol and destined to the remote destination; and facilitating sending, utilizing the second transmission protocol, the second streams in real-time over a network to the remote communication proxy module, wherein the second local communication proxy module is configured to conceal characteristics of the network, used for the second streams, from the second local communication application module, and wherein the second local communication proxy module is configured to be transparent to the second local communication application module.

21. The machine-readable medium of clause 12, wherein the local communication proxy module comprises code for:

receiving second streams from a second local communication application module, the second streams in a form utilizing the first transmission protocol and destined to the remote destination; and facilitating sending, utilizing the second transmission protocol, the second streams in real-time over a network to the remote communication proxy module, wherein the local communication proxy module is configured to conceal characteristics of the network, used for the second streams, from the second local communication application module, and wherein the local communication proxy module is configured to be transparent to the second local communication application module.

22. A method for remote communication, comprising:

receiving, by a local communication proxy module, streams from a local communication application module, the streams in a form utilizing a first transmission protocol and destined to a remote destination; and facilitating sending, utilizing a second transmission protocol, the streams in real-time over a network to a remote communication proxy module, wherein the local communication proxy module is configured to conceal characteristics of the network from the local communication application module, and wherein the local communication proxy module is configured to be transparent to the local communication application module.

23. The method of clause 22, wherein a location of the local communication proxy module is independent of a location of the local communication application module configured to send the streams, and the location of the local communication proxy module is independent of a location of the remote destination, and wherein the second transmission protocol is different from the first transmission protocol.

24. The method of clause 22, wherein the local communication proxy module is configured for a layer below a presentation layer in an Open Systems Interconnection Reference model (OSI model), and the remote communication proxy module is configured for a layer below a presentation layer in the OSI model.

25. The method of clause 22, further comprising:

caching streams received from the remote communication proxy module; and facilitating sending the cached streams to multiple local communication application modules.

26. The method of clause 22, further comprising:

determining a type of data;

selecting a compression type for the data based on the determination;

compressing streams, to be sent to the remote communication proxy module, utilizing the compression type selected; and decompressing streams received from the remote communication proxy module.

27. The method of clause 22, further comprising:

encrypting streams to be sent to the remote communication proxy module; and decrypting streams received from the remote communication proxy module.

28. The method of clause 22, further comprising:

detecting error in streams utilizing a cyclic redundancy check (CRC) or a checksum; and recovering corrupted data utilizing error correcting codes.

29. The method of clause 22, wherein the receiving comprises receiving the streams from the local communication application module based on a determination as to whether to accelerate the streams.

30. The method of clause 22, further comprising:

receiving, by a second local communication proxy module, second streams from a second local communication application module, the second streams in a form utilizing the first transmission protocol and destined to the remote destination; and facilitating sending, utilizing the second transmission protocol, the second streams in real-time over a network to the remote communication proxy module, wherein the second local communication proxy module is configured to conceal characteristics of the network, used for the second streams, from the second local communication application module, and wherein the second local communication proxy module is configured to be transparent to the second local communication application module.

31. The method of clause 22, further comprising:

receiving second streams from a second local communication application module, the second streams in a form utilizing the first transmission protocol and destined to the remote destination; and facilitating sending, utilizing the second transmission protocol, the second streams in real-time over a network to the remote communication proxy module, wherein the local communication proxy module is configured to conceal characteristics of the network, used for the second streams, from the second local communication application module, and wherein the local communication proxy module is configured to be transparent to the second local communication application module.

Figure 17B:
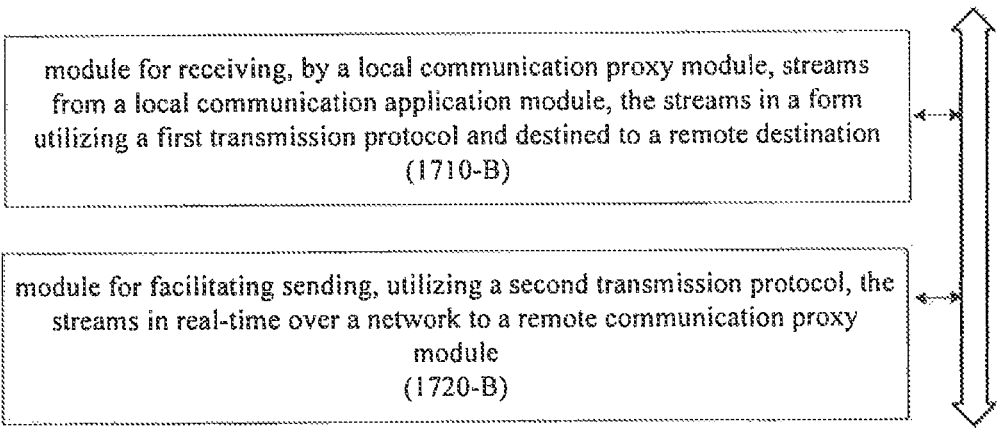
FIG. 17B illustrates an example of a configuration of a communication apparatus according to one aspect of the disclosure.

32. A communication apparatus for remote communication, comprising:

means for receiving, by a local communication proxy module, streams from a local communication application module, the streams in a form utilizing a first transmission protocol and destined to a remote destination (e.g., 1710-B of FIG. 17B); and means for facilitating sending, utilizing a second transmission protocol, the streams in real-time over a network to a remote communication proxy module (e.g., 1720-B), wherein the local communication proxy module is configured to conceal characteristics of the network from the local communication application module, and wherein the local communication proxy module is configured to be transparent to the local communication application module.

33. The communication apparatus of clause 32, wherein a location of the local communication proxy module is independent of a location of the local communication application module configured to send the streams, and the location of the local communication proxy module is independent of a location of the remote destination, and wherein the second transmission protocol is different from the first transmission protocol.

34. The communication apparatus of clause 32, wherein the local communication proxy module is configured for a layer below a presentation layer in an Open Systems Interconnection Reference model (OSI model), and the remote communication proxy module is configured for a layer below a presentation layer in the OSI model.

35. The communication apparatus of clause 32, further comprising:
means for caching streams received from the remote communication proxy module; and
means for facilitating sending the cached streams to multiple local communication application modules.

36. The communication apparatus of clause 32, further comprising:
means for determining a type of data;
means for selecting a compression type for the data based on the determination;
means for compressing streams, to be sent to the remote communication proxy module, utilizing the compression type selected; and
means for decompressing streams received from the remote communication proxy module.

37. The communication apparatus of clause 32, further comprising:
means for encrypting streams to be sent to the remote communication proxy module; and
means for decrypting streams received from the remote communication proxy module.

38. The communication apparatus of clause 32, further comprising:
means for detecting error in streams utilizing a cyclic redundancy check (CRC) or a checksum; and
means for recovering corrupted data utilizing error correcting codes.

39. The communication apparatus of clause 32, wherein the means for receiving comprises means for receiving the streams from the local communication application module based on a determination as to whether to accelerate the streams.

40. The communication apparatus of clause 32, further comprising:
means for receiving, by a second local communication proxy module, second streams from a second local communication application module, the second streams in a form utilizing the first transmission protocol and destined to the remote destination; and
means for facilitating sending, utilizing the second transmission protocol, the second streams in real-time over a network to the remote communication proxy module,
wherein the second local communication proxy module is configured to conceal characteristics of the network, used for the second streams, from the second local communication application module, and
wherein the second local communication proxy module is configured to be transparent to the second local communication application module.

41. The communication apparatus of clause 32, further comprising:
means for receiving second streams from a second local communication application module, the second streams in a form utilizing the first transmission protocol and destined to the remote destination; and
means for facilitating sending, utilizing the second transmission protocol, the second streams in real-time over a network to the remote communication proxy module,
wherein the local communication proxy module is configured to conceal characteristics of the network, used for the second streams, from the second local communication application module, and
wherein the local communication proxy module is configured to be transparent to the second local communication application module.

42. The communication apparatus of clause 32, comprising one or more computers, wherein the one or more computers comprises: means for displaying information; means for processing information; the means for receiving; and the means for facilitating.

The subject technology is illustrated, for example, according to various aspects described below. Numbered clauses are provided below for convenience. These are provided as examples, and do not limit the subject technology.

1. A communication apparatus for remote communication, comprising:
a local communication proxy module configured to receive streams from a local communication application module, the streams in a form utilizing a first transmission protocol and destined to a remote destination, the local communication proxy module configured to add first header information comprising one or more of the following: a packet sequence identifier, a packet size, a packet type identifier, and additional information related to a packet type identifier, the local communication proxy module configured to add second header information, the local communication proxy module configured to form packets and to facilitate sending, utilizing a second transmission protocol, the packets in real-time over a network to a remote communication proxy module.

2. The communication apparatus of clause 1, wherein the first transmission protocol comprises a transmission control protocol (TCP), and the second transmission protocol comprises a user datagram protocol (UDP).

3. The communication apparatus of clause 1, wherein the first header information comprises: a packet sequence identifier, a packet size, a packet type identifier, and additional information related to a packet type identifier, and
wherein a packet type identifier comprises one of the following: a packet type for connection establishment, a packet type for packet loss recovery, and a packet type for round-trip time (RTT) measurement.

3A. The communication apparatus of clause 1, wherein the first header information comprises: a packet sequence identifier, a packet size, a packet type identifier, and additional information related to a packet type identifier, and
wherein packet type identifiers comprises one or more or all of the following: a packet type for connection establishment, a packet type for packet loss recovery, a packet type for round-trip time (RTT) measurement, a packet type for data, and a packet type for acknowledgement.

4. The communication apparatus of clause 1, wherein the local communication proxy module is configured to receive and sort packets from the remote communication proxy module based on packet sequence identifiers.

4A. The communication apparatus of clause 1, wherein the local communication proxy module is configured to receive a plurality of data through the remote communication proxy module from a remote communication application module at the remote destination, configured to sort the plurality of data according to an order that is the same as an order in which the plurality of data have been sent by the remote communication application module, and configured to facilitate delivering the plurality of data in the same order to the local communication application module.

5. The communication apparatus of clause 1, wherein the local communication proxy module is configured to facilitate sending hole-punching packets to the remote communication proxy module.

6. The communication apparatus of clause 1, wherein the local communication proxy module is configured to facilitate sending hole-punching packets to the remote communication proxy module to establish multiple concurrent connections with the remote destination.

7. The communication apparatus of clause 1, wherein the local communication proxy module is configured to recover lost packets utilizing a forward error correction method to minimize retransmission of packets.

7A. The communication apparatus of clause 1, wherein the local communication proxy module is configured to receive a plurality of data through the remote communication proxy module from a remote communication application module at the remote destination, and configured to facilitate delivering all of the plurality of data from the remote communication application module without losing any of the plurality of data.

8. The communication apparatus of clause 1, wherein the local communication proxy module is configured to XOR n continuous packets and every mth packets until k, where n, m and k are determined based on packet loss and one or more round-trip times (RTTs), and configured to facilitate sending an XOR value in a packet following the packet's corresponding packets.

8A. The communication apparatus of clause 1, wherein the local communication proxy module is configured to XOR n continuous packets and every mth packets until k, where n, m and k are determined based on a configuration, and configured to facilitate sending an XOR value in a packet following the packet's corresponding packets, wherein the configuration is predetermined.

9. The communication apparatus of clause 1, wherein the local communication proxy module is configured to set data prioritization.

10. The communication apparatus of clause 1, wherein the local communication proxy module is configured to determine a data type of a packet and assign a transmission priority to the packet based on the determination.

11. The communication apparatus of clause 1, wherein the local communication proxy module is configured to receive packets, which include first and second header information, from the remote communication proxy module utilizing the second transmission protocol, configured to remove the first and second header information from the received packets, and configured to facilitate sending packets without the removed first and second header information to the local communication application module utilizing the first transmission protocol.

12. The communication apparatus of clause 1, wherein the communication apparatus comprises one or more computers, and
wherein the one or more computers comprises one or more displays, one or more processing systems, and the local communication proxy module.

Figure 18A:
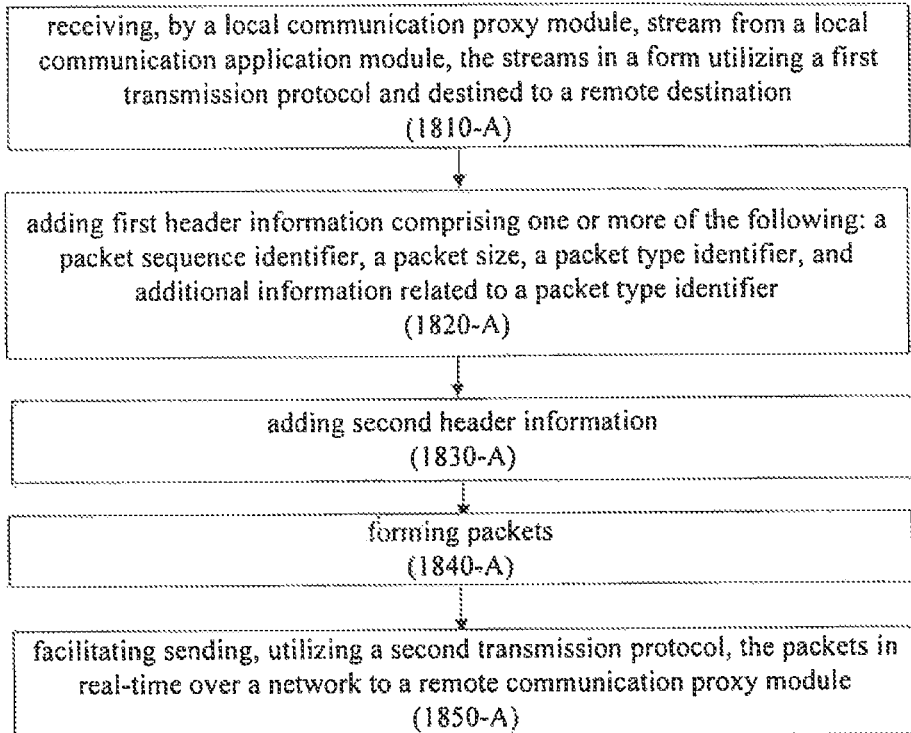
FIG. 18A illustrates an example of an operation of a communication apparatus according to one aspect of the disclosure.

13. A machine-readable medium encoded with instructions for remote communication, the instructions comprising code for:
receiving, by a local communication proxy module, streams from a local communication application module, the streams in a form utilizing a first transmission protocol and destined to a remote destination (e.g., 1810-A of FIG. 18A);
adding first header information comprising one or more of the following: a packet sequence identifier, a packet size, a packet type identifier, and additional information related to a packet type identifier (e.g., 1820-A);
adding second header information (e.g., 1830-A);
forming packets (e.g., 1840-A); and
facilitating sending, utilizing a second transmission protocol, the packets in real-time over a network to a remote communication proxy module (e.g., 1850-A).

14. The machine-readable medium of clause 13, wherein the first transmission protocol comprises a transmission control protocol (TCP), and the second transmission protocol comprises a user datagram protocol (UDP).

15. The machine-readable medium of clause 13, wherein the first header information comprises: a packet sequence identifier, a packet size, a packet type identifier, and additional information related to a packet type identifier, and
wherein a packet type identifier comprises one of the following: a packet type for connection establishment, a packet type for packet loss recovery, and a packet type for round-trip time (RTT) measurement.

16. The machine-readable medium of clause 13, wherein the instructions further comprise code for: receiving and sorting packets from the remote communication proxy module based on packet sequence identifiers.

17. The machine-readable medium of clause 13, wherein the instructions further comprise code for: facilitating sending hole-punching packets to the remote communication proxy module.

18. The machine-readable medium of clause 13, wherein the instructions further comprise code for: facilitating sending hole-punching packets to the remote communication proxy module to establish multiple concurrent connections with the remote destination.

19. The machine-readable medium of clause 13, wherein the instructions further comprise code for: recovering lost packets utilizing a forward error correction method to minimize retransmission of packets.

20. The machine-readable medium of clause 13, wherein the instructions further comprise code for: XORing n continuous packets and every mth packets until k, where n, m and k are determined based on packet loss and one or more round-trip times (RTTs) or based on a configuration; and facilitating sending an XOR value in a packet following the packet's corresponding packets.

21. The machine-readable medium of clause 13, wherein the instructions further comprise code for setting data prioritization.

22. The machine-readable medium of clause 13, wherein the instructions further comprise code for: determining a data type of a packet; and assigning a transmission priority to the packet based on the determination.

23. The machine-readable medium of clause 13, wherein the instructions further comprise code for: receiving packets, which include first and second header information, by the local communication proxy module from the remote communication proxy module utilizing the second transmission protocol; removing the first and second header information from the received packets; and facilitating sending packets without the removed first and second header information to the local communication application module utilizing the first transmission protocol.

24. A method for remote communication, comprising:
receiving, by a local communication proxy module, streams from a local communication application module, the streams in a form utilizing a first transmission protocol and destined to a remote destination;
adding first header information comprising one or more of the following: a packet sequence identifier, a packet size, a packet type identifier, and additional information related to a packet type identifier;
adding second header information;
forming packets; and facilitating sending, utilizing a second transmission protocol, the packets in real-time over a network to a remote communication proxy module.

25. The method of clause 24, wherein the first transmission protocol comprises a transmission control protocol (TCP), and the second transmission protocol comprises a user datagram protocol (UDP).

26. The method of clause 24, wherein the first header information comprises: a packet sequence identifier, a packet size, a packet type identifier, and additional information related to a packet type identifier, and
wherein a packet type identifier comprises one of the following: a packet type for connection establishment, a packet type for packet loss recovery, and a packet type for round-trip time (RTT) measurement.

27. The method of clause 24, further comprising: receiving and sorting packets from the remote communication proxy module based on packet sequence identifiers.

28. The method of clause 24, further comprising: facilitating sending hole-punching packets to the remote communication proxy module.

29. The method of clause 24, further comprising: facilitating sending hole-punching packets to the remote communication proxy module to establish multiple concurrent connections with the remote destination.

30. The method of clause 24, further comprising: recovering lost packets utilizing a forward error correction method to minimize retransmission of packets.

31. The method of clause 24, further comprising: XORing n continuous packets and every mth packets until k, where n, m and k are determined based on packet loss and one or more round-trip times (RTTs) or based on a configuration; and facilitating sending an XOR value in a packet following the packet's corresponding packets.

32. The method of clause 24, further comprising setting data prioritization.

33. The method of clause 24, further comprising: determining a data type of a packet; and assigning a transmission priority to the packet based on the determination.

34. The method of clause 24, further comprising: receiving packets, which include first and second header information, by the local communication proxy module from the remote communication proxy module utilizing the second transmission protocol; removing the first and second header information from the received packets; and facilitating sending packets without the removed first and second header information to the local communication application module utilizing the first transmission protocol.

Figure 18B:
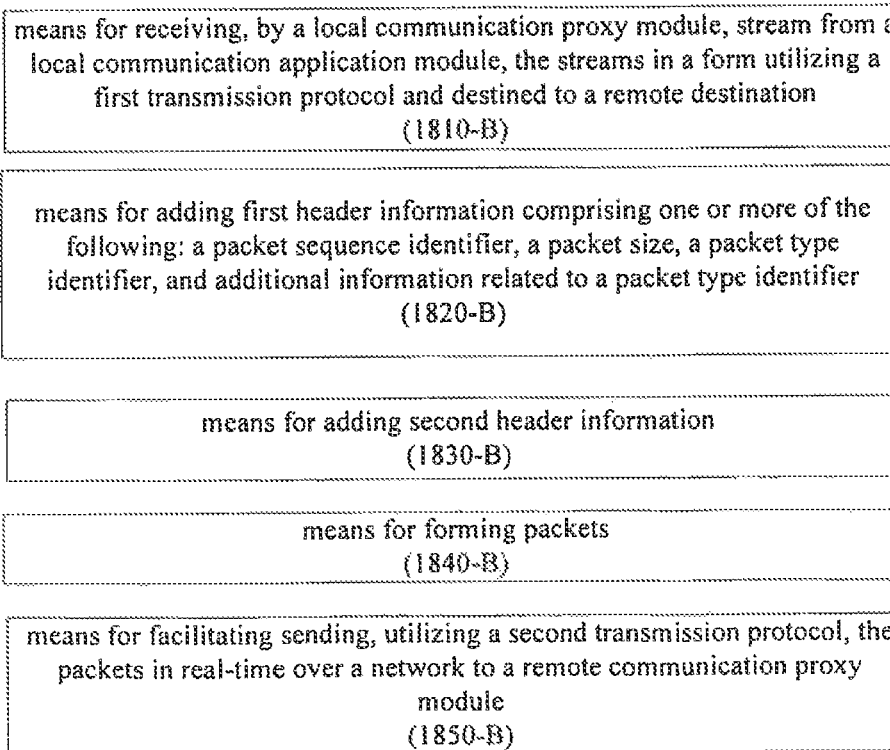
FIG. 18B illustrates an example of a configuration of a communication apparatus according to one aspect of the disclosure.

35. A communication apparatus for remote communication, comprising:
means for receiving, by a local communication proxy module, streams from a local communication application module, the streams in a form utilizing a first transmission protocol and destined to a remote destination (e.g., 1810-B of FIG. 18B);
means for adding first header information comprising one or more of the following: a packet sequence identifier, a packet size, a packet type identifier, and additional information related to a packet type identifier (e.g., 1820-B);
means for adding second header information (e.g., 1830-B);
means for forming packets (e.g., 1840-B); and
means for facilitating sending, utilizing a second transmission protocol, the packets in real-time over a network to a remote communication proxy module (e.g., 1850-B).

36. The communication apparatus of clause 35, wherein the first transmission protocol comprises a transmission control protocol (TCP), and the second transmission protocol comprises a user datagram protocol (UDP).

37. The communication apparatus of clause 35, wherein the first header information comprises: a packet sequence identifier, a packet size, a packet type identifier, and additional information related to a packet type identifier, and
wherein a packet type identifier comprises one of the following: a packet type for connection establishment, a packet type for packet loss recovery, and a packet type for round-trip time (RTT) measurement.

38. The communication apparatus of clause 35, further comprising: means for receiving and sorting packets from the remote communication proxy module based on packet sequence identifiers.

39. The communication apparatus of clause 35, further comprising: means for facilitating sending hole-punching packets to the remote communication proxy module.

40. The communication apparatus of clause 35, further comprising: means for facilitating sending hole-punching packets to the remote communication proxy module to establish multiple concurrent connections with the remote destination.

41. The communication apparatus of clause 35, further comprising: means for recovering lost packets utilizing a forward error correction method to minimize retransmission of packets.

42. The communication apparatus of clause 35, further comprising: means for XORing n continuous packets and every mth packets until k, where n, m and k are determined based on packet loss and one or more round-trip times (RTTs) or based on a configuration; and means for facilitating sending an XOR value in a packet following the packet's corresponding packets.

43. The communication apparatus of clause 35, further comprising: means for setting data prioritization.

44. The communication apparatus of clause 35, further comprising: means for determining a data type of a packet; and means for assigning a transmission priority to the packet based on the determination.

45. The communication apparatus of clause 35, further comprising: means for receiving packets, which include first and second header information, by the local communication proxy module from the remote communication proxy module utilizing the second transmission protocol; means for removing the first and second header information from the received packets; and means for facilitating sending packets without the removed first and second header information to the local communication application module utilizing the first transmission protocol.

46. The communication apparatus of clause 35, comprising one or more computers, wherein the one or more computers comprises: means for displaying information; means for processing information; the means for receiving; the means for adding first header information; the means for adding second header information; the means for forming packets; and the means for facilitating sending.

In one aspect of the disclosure, a communication apparatus, a communication application module, a transparent communication proxy module, and a communication proxy module may refer to modules 100, 170, 180, 110, 120, 130, 150, and 160, as shown in FIG. 1 or the modules shown in FIG. 2. The subject technology, however, is not limited to these exemplary modules shown in various figures of this disclosure. In other examples, a communication apparatus, a communication application module, a transparent communication proxy module, and communication proxy module may be represented by other types of modules, structures, blocks, components, devices or systems.

Those of skill in the art would appreciate that the various illustrative blocks, modules, elements, components, methods, and algorithms described herein may be implemented as electronic hardware, computer software, or combinations of both. For example, module 110, 120, 130, 150 and/or 160 in FIG. 1 may be implemented as electronic hardware, computer software, or combinations of both. In one aspect, a module (e.g., module 110, 120, 130, 150, 160, 210, 220, 230, 250, and/or 260 in FIGS. 1 and 2) may be an apparatus since the module(s) may include instructions encoded or stored on a machine-readable medium, on a computer-readable medium, on another device, or on a portion thereof. In one aspect, a module(s) may be software (e.g., an application). In another aspect, a module(s) may be hardware (e.g., a FPGA or a PLD configured to perform the functions described, a pre-programmed general-purpose computer, or a special purpose electronic or optical device).

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

In one aspect, when a claim recites a first module configured to perform a first function and a second module configured to perform a second function, the scope of such a claim may cover a module configured to perform both the first function and the second function.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for remote communication, comprising:
    receiving a first indication that a connection is established between a local communication proxy module and a remote communication proxy module;
    based on the first indication, making a determination to use a second transmission protocol with the remote communication proxy module, wherein the second transmission protocol is an accelerated protocol;
    receiving, at the local communication proxy module, a first stream from a local communication application module using a first transmission protocol, wherein the local communication proxy module and the local communication application module are executing on a first computer, wherein the remote communication proxy module is executing on a second computer that is accessible via a network from the first computer; and
    sending, using the second transmission protocol, the first stream over the network to the remote communication proxy module,
    wherein the local communication proxy module is configured to:
    conceal characteristics of the network from the local communication application module, and
    operate transparently to the local communication application module.

2. The method of claim 1, wherein using the second transmission protocol includes transmitting a series of data packets in a window of a variable size, the variable size being a function of an available bandwidth of the network and a round-trip time, wherein the variable size is periodically determined.

3. The method of claim 1, wherein the local communication proxy module is configured for a layer below a presentation layer in an Open Systems Interconnection Reference model (OSI model), and the remote communication proxy module is configured for a layer below the presentation layer.

4. The method of claim 1, further comprising:
receiving a second stream from the remote communication proxy module using the second transmission protocol;
caching the second stream; and
sending the second stream to the local communication application module using the first transmission protocol.

5. The method of claim 1, wherein making the determination to use the second transmission protocol includes receiving a second indication.

6. The method of claim 1, wherein the first transmission protocol is a non-accelerated protocol.

7. An article of manufacture comprising a non-transitory computer-readable medium storing instructions, that, when executed by a processor, cause the processor to:
receive a first indication that a connection is established between a local communication proxy module and a remote communication proxy module;
based on the first indication, make a determination to use a second communication protocol with the remote communication proxy module, wherein the second communication protocol is an accelerated protocol;
receive, at the local communication proxy module, a first stream from a local communication application module using a first transmission protocol, wherein the local communication proxy module and the local communication application module are executing on a first computer, wherein the remote communication proxy module is executing on a second computer that is accessible via a network from the first computer; and
send, utilizing a second transmission protocol, the first stream over the network to the remote communication proxy module,
wherein the local communication proxy module is configured to:
conceal characteristics of the network from the local communication application module, and
operate transparently to the local communication application module.

8. The article of manufacture of claim 7, wherein the instructions to use the second transmission protocol include instructions to transmit a series of data packets in a window of a variable size, the variable size being a function of an available bandwidth of the network and a round-trip time, wherein the variable size is periodically determined.

9. The article of manufacture of claim 7, further comprising instructions to:
receive a second stream from the remote communication proxy module using the second transmission protocol;
cache the second stream; and
send the second stream to the local communication application module using the first transmission protocol.

10. The article of manufacture of claim 7, wherein the instructions to make the determination to use the second transmission protocol include instructions to receive a second indication.

11. The article of manufacture of claim 7, wherein the first transmission protocol is a non-accelerated protocol.

12. An information handling system comprising:
a processor subsystem having access to a memory subsystem, wherein the memory subsystem stores instructions executable by the processor subsystem, that, when executed by the processor subsystem, cause the processor subsystem to:
receive a first indication that a connection is established between a local communication proxy module and a remote communication proxy module;
based on the first indication, make a determination to use a second communication protocol with the remote communication proxy module, wherein the second communication protocol is an accelerated protocol;
receive, at the local communication proxy module, a first stream from a local communication application module using a first transmission protocol, wherein the local communication proxy module and the local communication application module are executing on the information handling system, wherein the remote communication proxy module is executing on a second information handling system that is accessible via a network from the information handling system; and
send, utilizing a second transmission protocol, the first stream over the network to the remote communication proxy module,
wherein the local communication proxy module is configured to:
conceal characteristics of the network from the local communication application module, and
operate transparently to the local communication application module.

13. The information handling system of claim 12, wherein the instructions to use the second transmission protocol include instructions to transmit a series of data packets in a window of a variable size, the variable size being a function of an available bandwidth of the network and a round-trip time, wherein the variable size is periodically determined.

14. The information handling system of claim 12, further comprising instructions to:
receive a second stream from the remote communication proxy module using the second transmission protocol;
cache the second stream; and
send the second stream to the local communication application module using the first transmission protocol.

15. The information handling system of claim 12, wherein the instructions to make the determination to use the second transmission protocol include instructions to receive a second indication.

16. The information handling system of claim 12, wherein the first transmission protocol is a non-accelerated protocol.

17. The information handling system of claim 12, wherein the local communication proxy module is configured for a layer below a presentation layer in an Open Systems Interconnection Reference model (OSI model), and the remote communication proxy module is configured for a layer below the presentation layer.

* * * * *